(12) United States Patent
Gibbs

(10) Patent No.: US 8,025,540 B2
(45) Date of Patent: Sep. 27, 2011

(54) AMPHIBIAN

(75) Inventor: Alan Timothy Gibbs, London (GB)

(73) Assignee: Gibbs Technologies Ltd., Warwickshire (GB)

( * ) Notice: Subject to any disclaimer, the term of this patent is extended or adjusted under 35 U.S.C. 154(b) by 0 days.

(21) Appl. No.: 11/895,604

(22) Filed: Aug. 24, 2007

(65) Prior Publication Data

US 2008/0108257 A1    May 8, 2008

(30) Foreign Application Priority Data

Aug. 24, 2006  (GB) .................. 0616845.4

(51) Int. Cl.
   *B60F 3/00*    (2006.01)
(52) U.S. Cl. ................... 440/12.5; 440/12.51
(58) Field of Classification Search ............. 440/12.5, 440/12.51
   See application file for complete search history.

(56) References Cited

U.S. PATENT DOCUMENTS

| | | | | |
|---|---|---|---|---|
| 3,741,146 | A | * | 6/1973 | Durrell, Jr. ............ 440/12.53 |
| 4,241,686 | A | | 12/1980 | Westphalen |
| 4,597,353 | A | | 7/1986 | Takezono |
| 5,632,221 | A | * | 5/1997 | Trenne et al. ............ 440/12.5 |
| 5,690,046 | A | * | 11/1997 | Grzech, Jr. ............ 440/12.5 |
| RE036,901 | E | | 10/2000 | Roycroft et al. |
| RE36,901 | E | * | 10/2000 | Roycroft et al. ........... 440/12.52 |
| 6,505,694 | B2 | | 1/2003 | Maguire |
| 6,540,569 | B1 | | 4/2003 | Gong |
| 6,886,837 | B2 | | 5/2005 | Gibbs |
| 6,945,832 | B2 | | 9/2005 | Roycroft |
| 6,994,358 | B2 | | 2/2006 | Roycroft |
| 7,207,851 | B1 | | 4/2007 | Gibbs et al. |
| 7,234,982 | B2 | | 6/2007 | Longdill et al. |
| 2002/0098748 | A1 | | 7/2002 | Roycroft |
| 2004/0035624 | A1 | * | 2/2004 | Fecteau et al. ............ 180/210 |
| 2004/0168623 | A1 | * | 9/2004 | Kirk ....................... 114/55.57 |
| 2005/0034646 | A1 | | 2/2005 | Royle |
| 2006/0234567 | A1 | | 10/2006 | Longdill et al. |
| 2007/0006788 | A1 | | 1/2007 | Lindsey |

FOREIGN PATENT DOCUMENTS

| | | |
|---|---|---|
| AU | 700280 | 12/1998 |
| DE | 10344957 | 4/2005 |
| GB | 2392415 | 3/2004 |
| GB | 2401829 | 11/2004 |
| WO | 8807453 | 10/1988 |
| WO | 0212005 | 2/2002 |
| WO | 02060707 | 8/2002 |
| WO | 2006040563 | 4/2006 |
| WO | 2006043088 | 4/2006 |
| WO | 2006067458 | 6/2006 |

\* cited by examiner

*Primary Examiner* — Stephen Avila
(74) *Attorney, Agent, or Firm* — Fulwider Patton LLP; Gunther O. Hanke, Esq.

(57) ABSTRACT

An amphibian with a planing hull having three wheel stations, two at the front of the vehicle and one centrally located at the rear of the vehicle. The amphibian is propelled on land by at least one wheel and in water by at least one impeller or propeller.

11 Claims, 39 Drawing Sheets

AMPHIBIAN

The present invention relates to an amphibian and, in particular, to an amphibian having a three wheel configuration.

A number of road wheel and seating arrangement layouts have been proposed and built for amphibians. The most popular layout, as for road vehicles, is to have four wheels and sit-in seating provided across the amphibian in one or more rows. This convention provides stability and ease of communication respectively. However, it also sets constraints on the dimensions, weight, performance and manoeuvrability of the amphibian.

Two wheeled amphibians are also known, for example, from Buchanan (GB 2,254,831). The size of hull needed to ensure flotation on water gives a bloated appearance to the amphibian, reduces stability and manoeuvrability on road, and hinders access to mechanical parts for servicing. Indeed, such amphibians tend to be compromised both on land and on water. For example, Buchanan provides extensible bellows on both sides of his amphibian body, to act as stabilizers at low speed on water.

Three wheeled road vehicles are known, the convention being to have a single front wheel and two driven rear wheels. This allows a small turning circle, and uninterrupted space for passengers and/or goods at the rear of the vehicle. However, this layout is notoriously unstable on land. On the other hand, the three wheeled Morgan sports cars, which had two wheels at the front and one at the back, are remembered with affection over fifty years after going out of production.

Three wheeled amphibians are known, for example from Grzech (U.S. Pat. No. 5,690,046), who uses a single front wheel. The two rear wheels are covered on water by complex hinged panels, which may stop working if damaged in collisions or if their mechanisms were clogged by water, or by fine debris, e.g. sand. Salt water may of course lead to corrosion. It is noted that Grzech does not provide a full description of the operation of these covers. Grzech shows hinged panels which are hinged in one dimension, but need to be hinged in two dimensions.

Baker (WO 99/24273) discloses a three wheeled amphibian whose wheels, including a single rear wheel, are not retractable. The glazing, roof, and doors of Baker's amphibian add weight, cost, and complexity, and enclose the driver and passengers in a conventional sit-in vehicle architecture. Similarly, the driver and passenger sit side-by-side, meaning that the driver is offset from the amphibian centre line. This in turn necessitates handed steering, which increases complexity of production in a small and fragmented niche market. When only the driver is aboard, there are potential problems in amphibian handling due to offset weight distribution. The side-by-side front seating also sets a minimum width for the amphibian.

A further amphibian is disclosed by Maguire (U.S. Pat. No. 6,505,694). Essentially, this is a snowmobile adapted to float. It has two front wheels and a rear endless track drive mounted on the centre line of the amphibian. Marine propulsion is effected by the track drive which is retractable within the bodywork when the amphibian is on water. Marine propulsion by track drives has been found to be painfully slow even with exposed tracks; retracted tracks are even less efficient. Maguire's amphibian is also compromised by these tracks on hard surfaces. Track drives limit speed and manoeuvrability on metalled roads. A hard track made of steel will damage the road, a soft track will be damaged by the road. Maguire's amphibian will stress its track particularly badly when turning, as shear loads in opposite directions will be applied to opposite ends of each cleat or lag.

The present invention provides an amphibian as set forth in the appended claims.

In a first aspect, the present invention provides an amphibian for use in land and marine modes comprising:
a planing hull;
three wheel stations, two of the three wheel stations being front wheel stations provided one on each side of and in the front half of the amphibian, and the third wheel station being a rear wheel station provided in a central region in the rear half of the amphibian;
at least one wheel provided at each wheel station, each wheel being movable between a protracted land mode position and a retracted marine mode position;
land propulsion means to propel the amphibian on land in the land mode, the land propulsion means comprising at least one of the wheels; and
marine propulsion means to propel the amphibian on water in the marine mode, the marine propulsion means comprising at least two impellers or propellers provided one on each side of the rear wheel station.

In a second aspect, the present invention provides an amphibian for use in land and marine modes comprising:
a planing hull;
three wheel stations, two of the three wheel stations being front wheel stations provided one on each side of and in the front half of the amphibian, and the third wheel station being a rear wheel station provided in a central region in the rear half of the amphibian;
at least one wheel provided at each wheel station, each wheel being movable between a protracted land mode position and a retracted marine mode position;
land propulsion means to propel the amphibian on land in the land mode, the land propulsion means comprising at least one of the wheels; and
marine propulsion means to propel the amphibian on water in the marine mode, the marine propulsion means comprising at least one impeller or propeller, wherein: the land propulsion means is independent of the marine propulsion means.

In a third aspect, the present invention provides an amphibian for use in land and marine modes comprising:
a planing hull;
at least three wheels arranged in a three wheeled vehicle configuration, two of the wheels being front wheels provided one on each side of and in the front half of the amphibian, and a third wheel being a rear wheel provided in a central region in the rear half of the amphibian, each wheel being movable between a protracted land mode position and a retracted marine mode position;
land propulsion means to propel the amphibian on land in the land mode, the land propulsion means comprising at least one of the wheels; and
marine propulsion means to propel the amphibian on water in the marine mode, the marine propulsion means comprising at least one impeller or propeller, wherein:
the land propulsion means is independent of the marine propulsion means.

In a fourth aspect, the present invention provides an amphibian for use in land and marine modes comprising:
a planing hull;
three wheels, two of the wheels being front wheels provided one on each side of and in the front half of the amphibian, and the third wheel being a rear wheel provided in a central region in the rear half of the amphibian, each wheel being movable between a protracted land mode position and a retracted marine mode position;

land propulsion means to propel the amphibian on land in the land mode, the land propulsion means comprising at least one of the wheels; and marine propulsion means to propel the amphibian on water in the marine mode, the marine propulsion means comprising at least one impeller or propeller, wherein:

the land propulsion means is independent of the marine propulsion means.

In a fifth aspect, the present invention provides an amphibian for use in land and marine modes comprising:

a planing hull;

three wheel stations, two of the three wheel stations being front wheel stations provided one on each side of and in the front half of the amphibian, and the third wheel station being a rear wheel station provided in a central region in the rear half of the amphibian;

at least one wheel provided at each wheel station, each wheel being movable between a protracted land mode position and a retracted marine mode position;

a prime mover which in the land mode of the amphibian provides direct or indirect drive to at least one of the wheels;

marine propulsion means to propel the amphibian on water in the marine mode, the marine propulsion means comprising at least two impellers or propellers provided one on each side of the rear wheel station.

In a sixth aspect, the present invention provides an amphibian for use in land and marine modes comprising:

a planing hull;

three wheels, two of the three wheels being front wheels provided one on each side of and in the front half of the amphibian, and the third wheel being a rear wheel provided in a central region in the rear half of the amphibian, each wheel being movable between a protracted land mode position and a retracted marine mode position;

land propulsion means to propel the amphibian on land in the land mode, the land propulsion means comprising at least one of the wheels; and marine propulsion means to propel the amphibian on water in the marine mode, the marine propulsion means comprising at least two impellers or propellers provided one on each side of the rear wheel station.

In a seventh aspect, the present invention provides an amphibian for use in land and marine modes comprising:

a planing hull;

three wheels, two of the three wheels being front wheels provided one on each side of and in the front half of the amphibian, and the third wheel being a rear wheel provided in a central region in the rear half of the amphibian, each wheel being movable between a protracted land mode position and a retracted marine mode position;

land propulsion means to propel the amphibian on land in the land mode, the land propulsion means comprising at least one of the wheels; and marine propulsion means to propel the amphibian on water in the marine mode, the marine propulsion means comprising at least one impeller or propeller, wherein:

the land propulsion means is independent of the marine propulsion means.

In an eighth aspect, the present invention provides an amphibian for use in land and marine modes comprising:

a planing hull;

three wheel stations, two of the three wheel stations being front wheel stations provided one on each side of and in the front half of the amphibian, and the third wheel station being a rear wheel station provided in a central region in the rear half of the amphibian;

at least one wheel provided at each wheel station, each wheel being movable between a protracted land mode position and a retracted marine mode position;

land propulsion means to propel the amphibian on land in the land mode, the land propulsion means comprising at least one of the wheels; and marine propulsion means to propel the amphibian on water in the marine mode, the marine propulsion means comprising at least one impeller or propeller, wherein:

the marine propulsion means is driven independently of the land propulsion means.

In a ninth aspect, the present invention provides an amphibian for use in land and marine modes comprising:

a planing hull;

three wheel stations, two of the three wheel stations being front wheel stations provided one on each side of and in the front half of the amphibian, and the third wheel station being a rear wheel station provided in a central region in the rear half of the amphibian;

at least one wheel provided at each wheel station, each wheel being movable between a protracted land mode position and a retracted marine mode position;

land propulsion means to propel the amphibian on land in the land mode, the land propulsion means comprising at least one of the wheels;

marine propulsion means to propel the amphibian on water in the marine mode, the marine propulsion means comprising at least one impeller or propeller; and a prime mover, wherein:

the marine propulsion means is driven by the prime mover independently of the land propulsion means.

In a tenth aspect, the present invention provides an amphibian comprising at least three retractable wheels, at least two of the retractable wheels being retractable about an axis substantially parallel to, or offset by an angle $\alpha$ of up to 40 degrees from, a longitudinal axis of the amphibian, and at least one of the retractable wheels being retractable about an axis substantially parallel to, or offset by an angle $\beta$ of up to 40 degrees from, a transverse axis of the amphibian.

Thus, an amphibian is provided with good handling on water and inherent stability on land. It is capable of operation on land and on water with minimal operational compromise on either medium.

The applicant has combined the benefits of two spaced apart wheels at the front of the amphibian and a central wheel at the rear to optimise on land performance, but which is counter-intuitive to optimising performance on water due to the inherent track width at the front of the amphibian, with a narrowing pointed hull at the front provided between the front wheels, which hull becomes wider rearwards along its length to optimise on water performance, but which hull is counter-intuitive to optimising on land performance due to the shape of the hull suggesting a single central front wheel and two spaced apart wheels at the rear.

The present invention provides, in a further aspect, a powertrain for an amphibian as set forth in the appended claims. This provides a compact layout of a powertrain for an amphibian.

For the avoidance of doubt, reference herein to a rider or a driver means the person controlling the amphibian.

Grzech describes a centrally mounted water jet unit, which ejects water between the two rear wheels. The disclosed water jet unit would be incompatible with a single rear wheel, for packaging reasons.

Baker describes an amphibian propelled in water by vanes attached to the rear wheel. The rear wheel must remain immersed in order to thrust the amphibian forward.

This increases the drag of the amphibian in water, since half of the wheel and tyre are always under the water when the amphibian is operated in marine mode.

Grzech provides for retraction of a single front wheel by long-travel hydraulic suspension forks, with road steering disconnection by splines on the forks. This design is not readily adaptable to a pair of front wheels.

Baker uses water skis which can be rotated beneath the front wheels to allow planing on water. This prevents the amphibian from leaning into turns on water, reducing possible cornering speed.

Both Grzech (with articulated wheel covers) and Baker (with mudguards rotating to become water skis) teach covering of wheels over water. The mechanisms necessary to move such covers can be difficult to maintain. Mechanisms and, where used, electric motors are exposed to a number of aggressive substances such as salt water and sand, which are liable to erode, clog, corrode, or distort moving parts. The operation of the covers may also be adversely affected by distortion of the covers and/or their mechanisms resulting from collisions, even with minor obstacles such as rocks under water. Furthermore, the covers may be visible on the outside of the amphibian, and thus will need a class "A" finish for marketing reasons. Such a high gloss finish will be very vulnerable to scratching and chipping, leading to rapid deterioration in the appearance of the amphibian.

Surprisingly, the present applicant has found in trials of prototype amphibians that such covers are not necessary to ensure good marine handling. Furthermore, exposed wheels have the advantage that the tyres can act as fenders. The tyres are especially effective in absorbing minor bumps if the wheels are retracted at an angle to the vertical.

Preferred embodiments of the present invention will now be described, by way of example only, with reference to the accompanying drawings in which.

Figure 1:
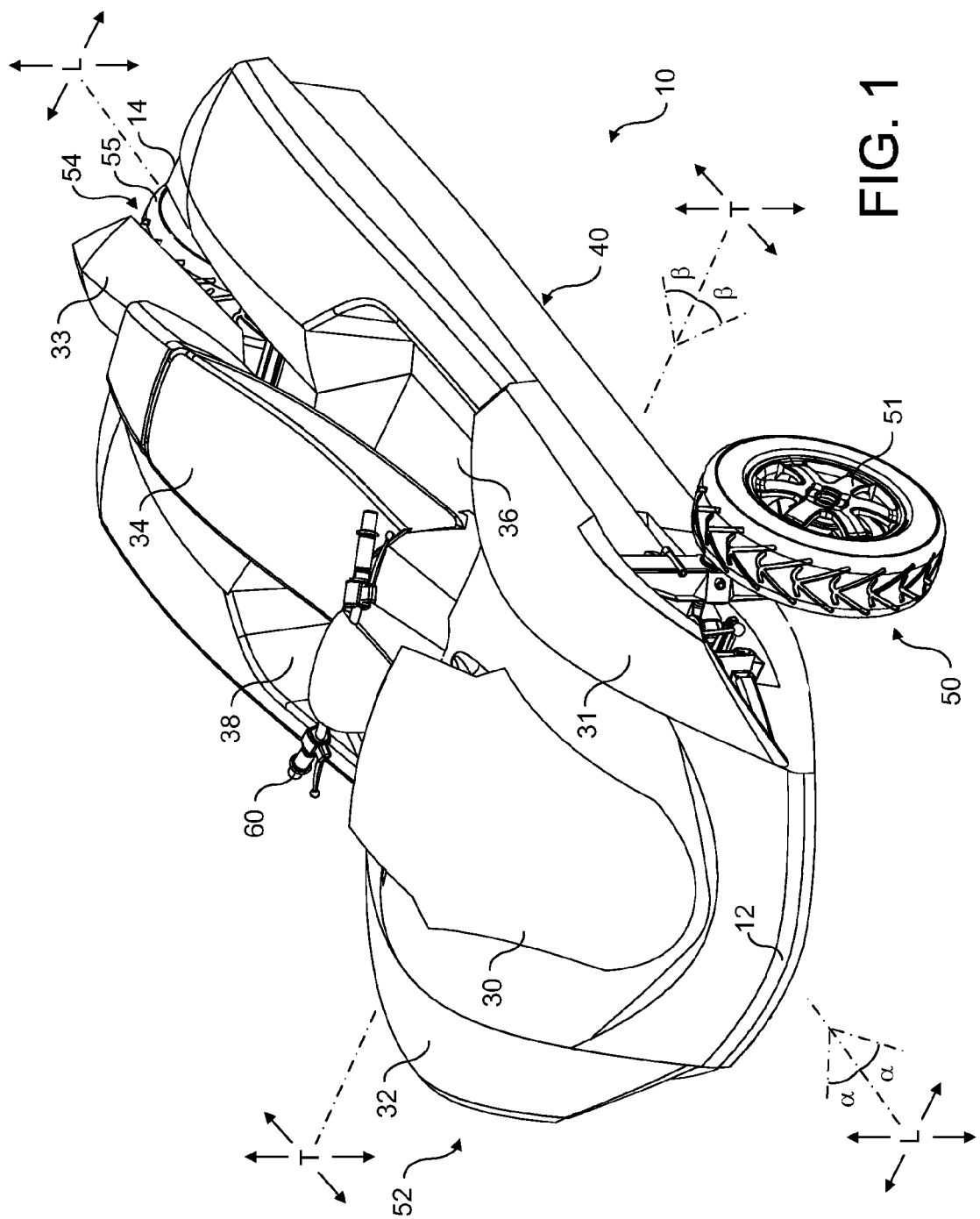
FIG. 1 is a perspective view from above of an amphibian according to a first embodiment of the present invention, with the wheels protracted for use in land mode.
Figure 2:
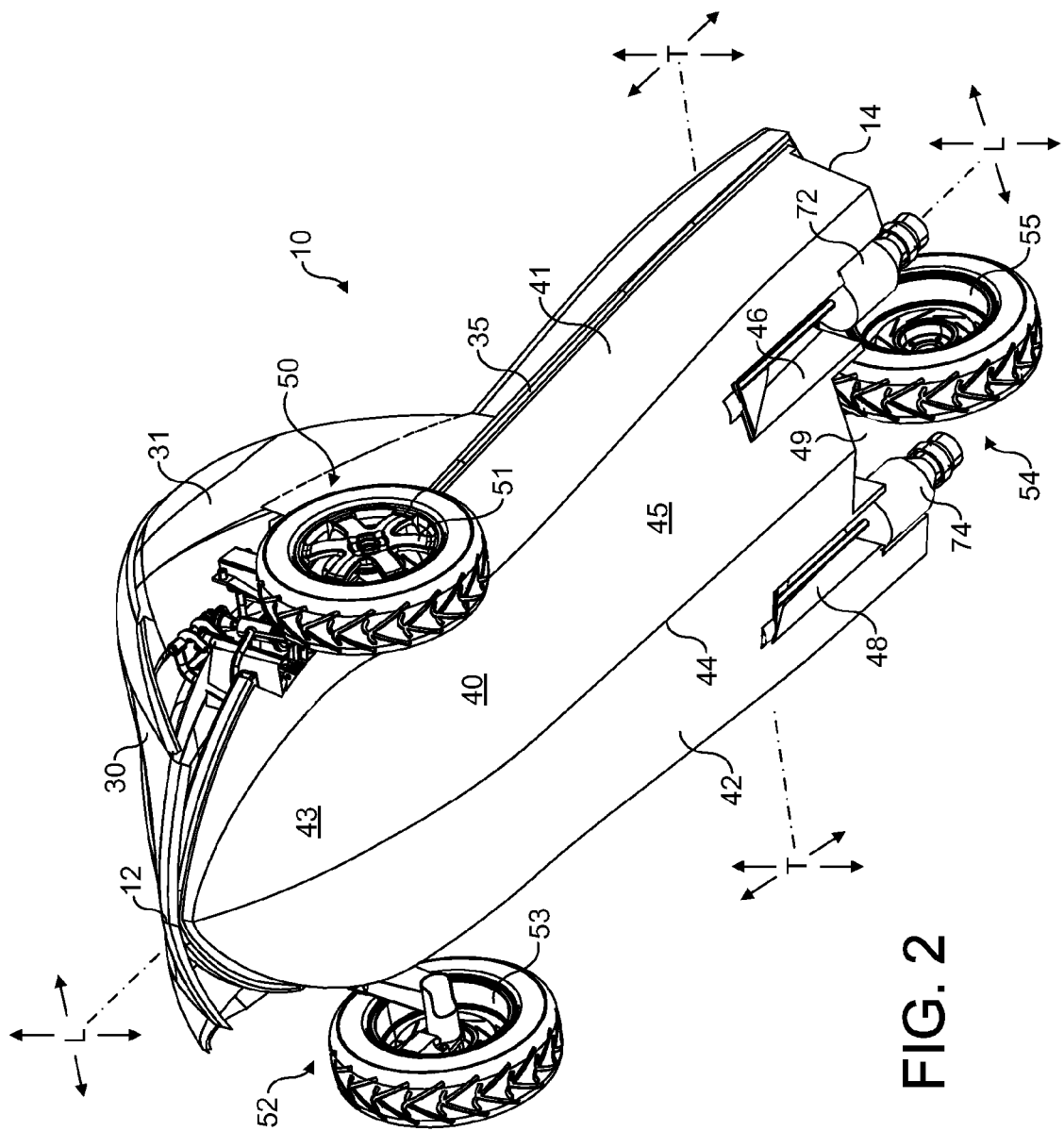
FIG. 2 is a perspective view from below of the amphibian of FIG. 1.
Figure 3:
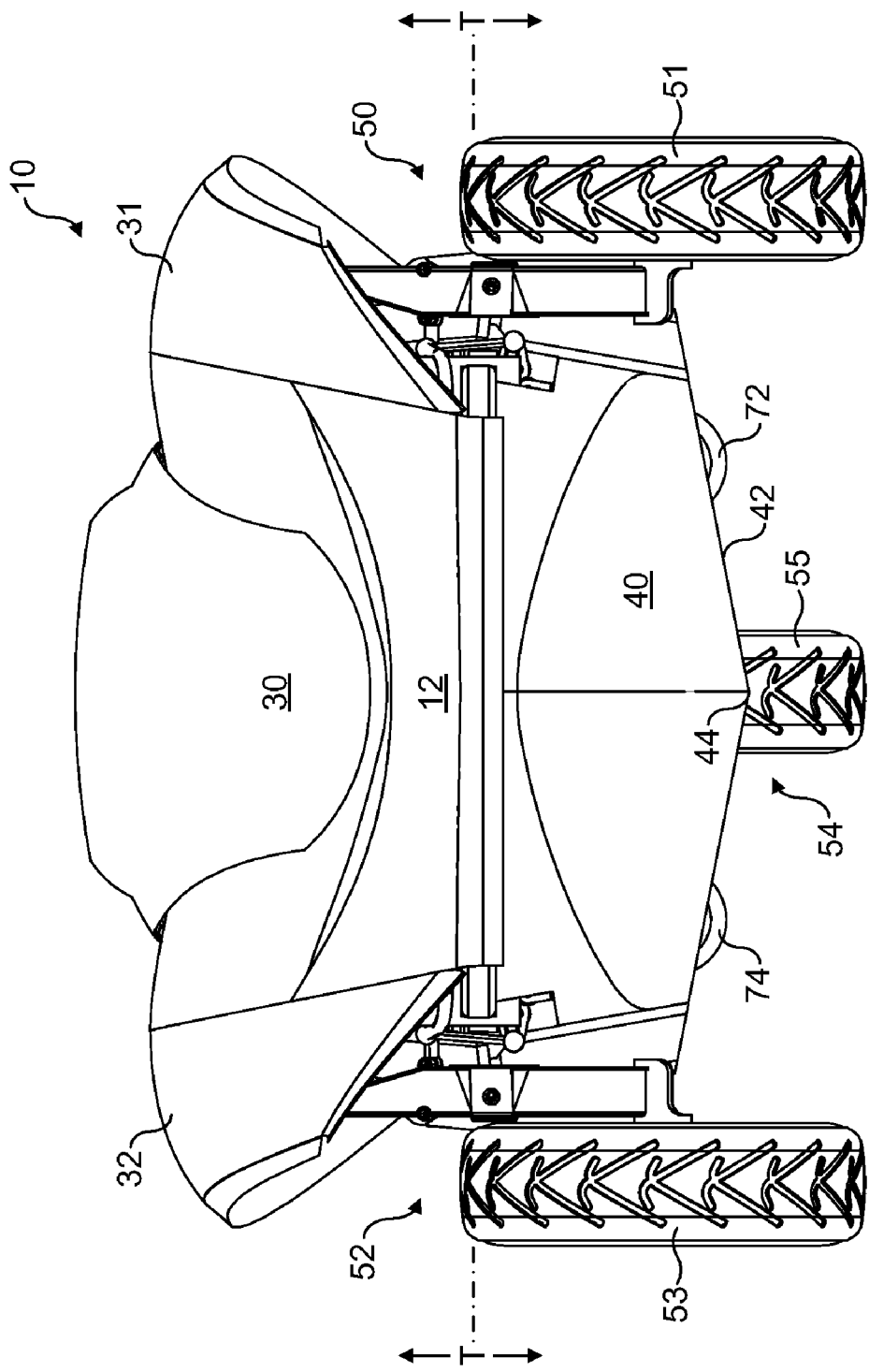
FIG. 3 is a front elevation view of the amphibian of FIG. 1.
Figure 4:
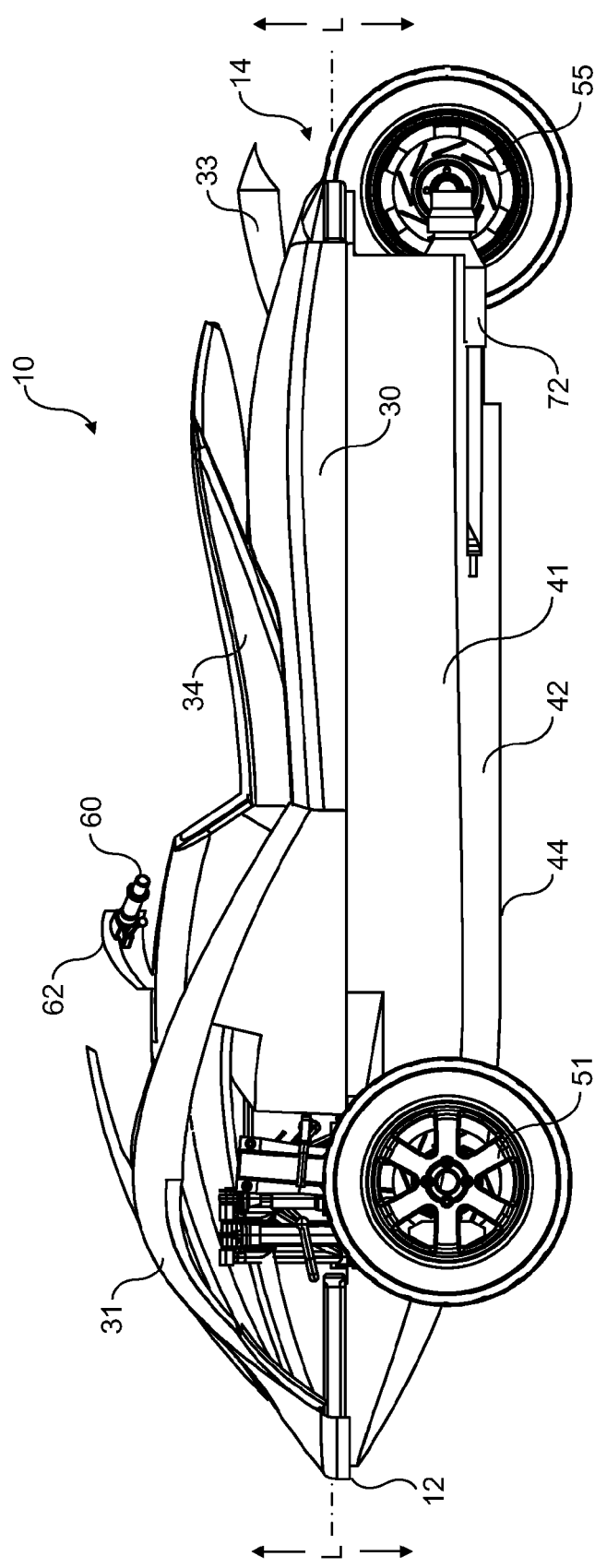
FIG. 4 is a side elevation view of the amphibian of FIG. 1.
Figure 5:
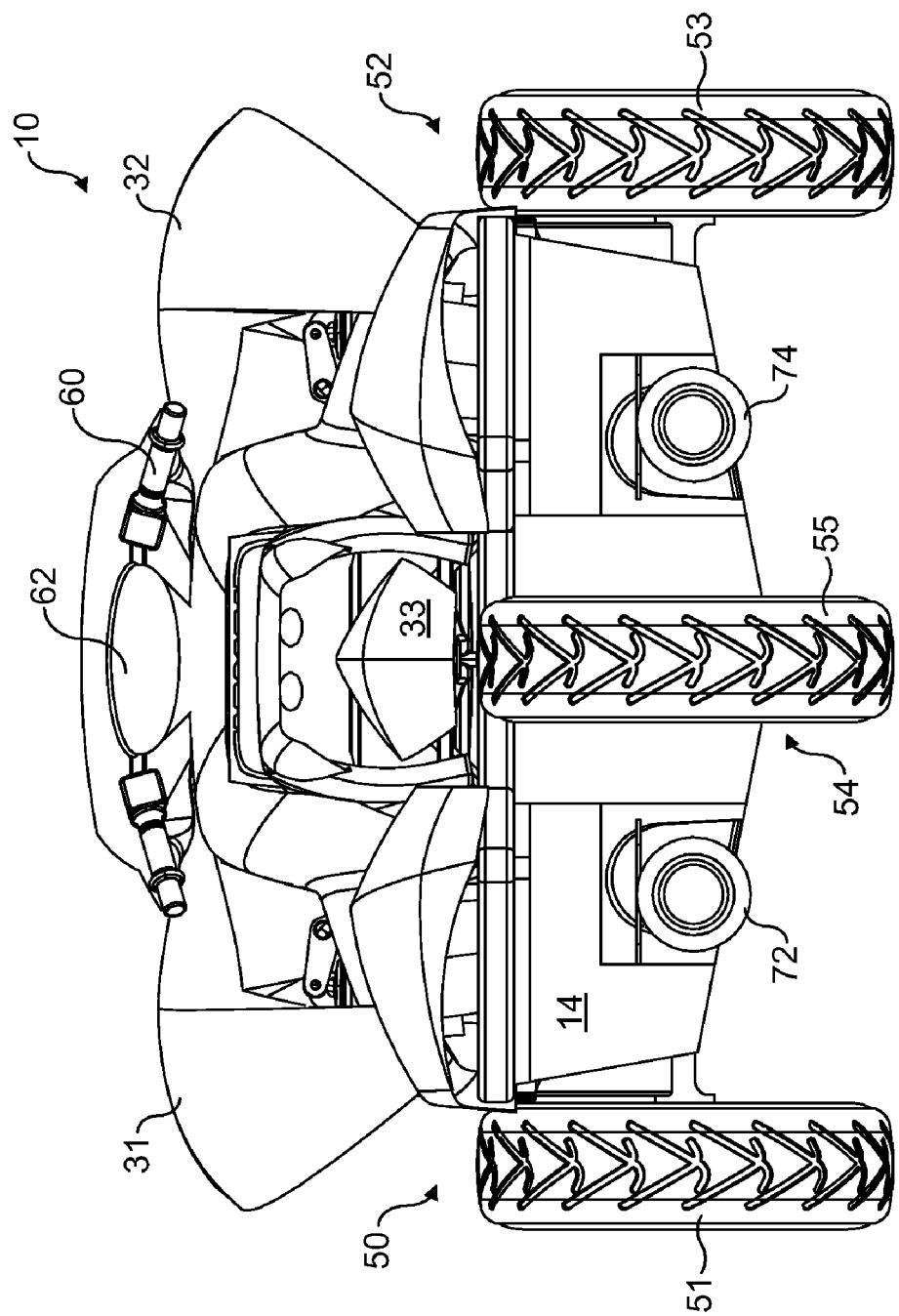
FIG. 5 is a rear end elevation view of the amphibian of FIG. 1.
Figure 6:
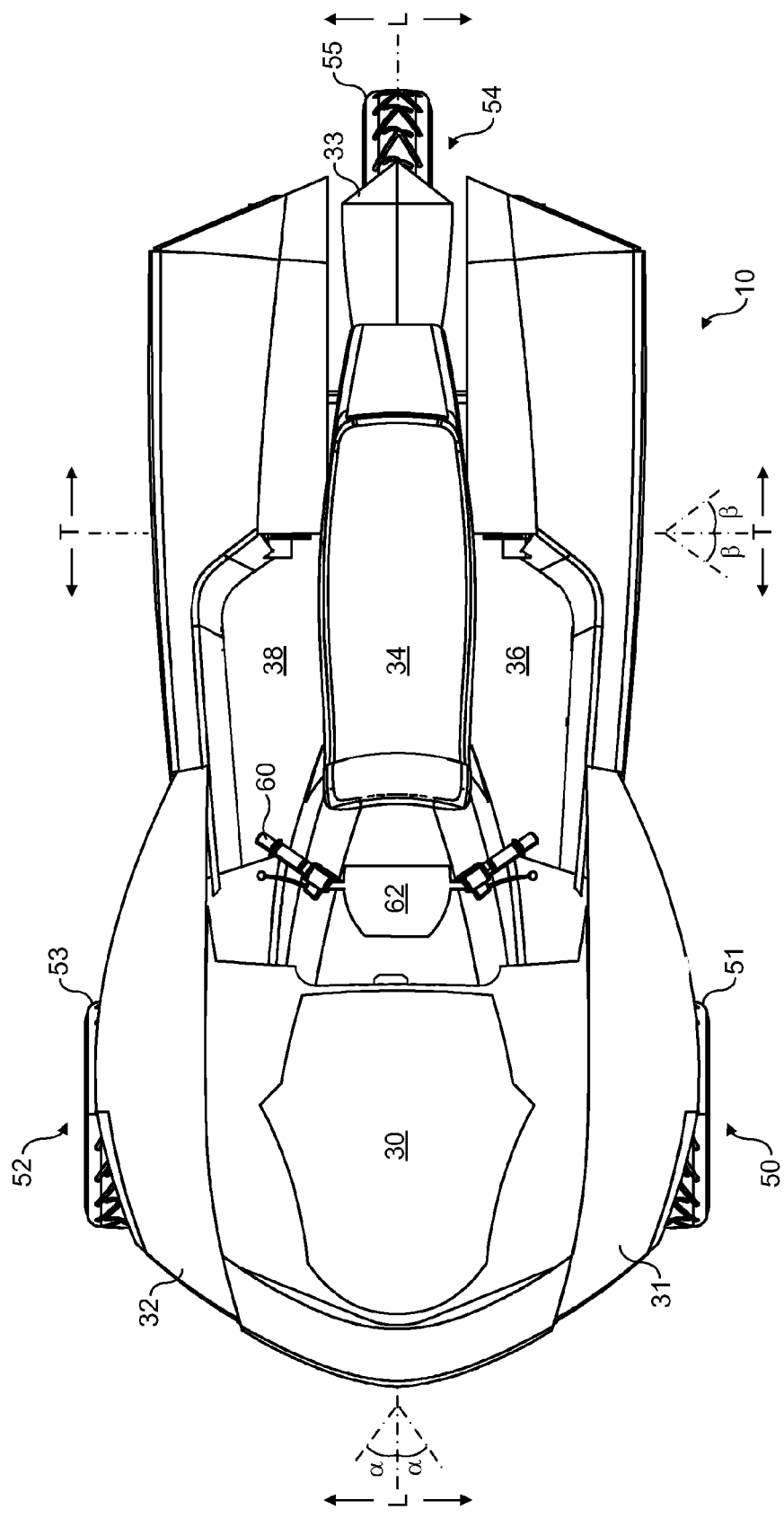
FIG. 6 is a top plan view of the amphibian of FIG. 1.
Figure 7:
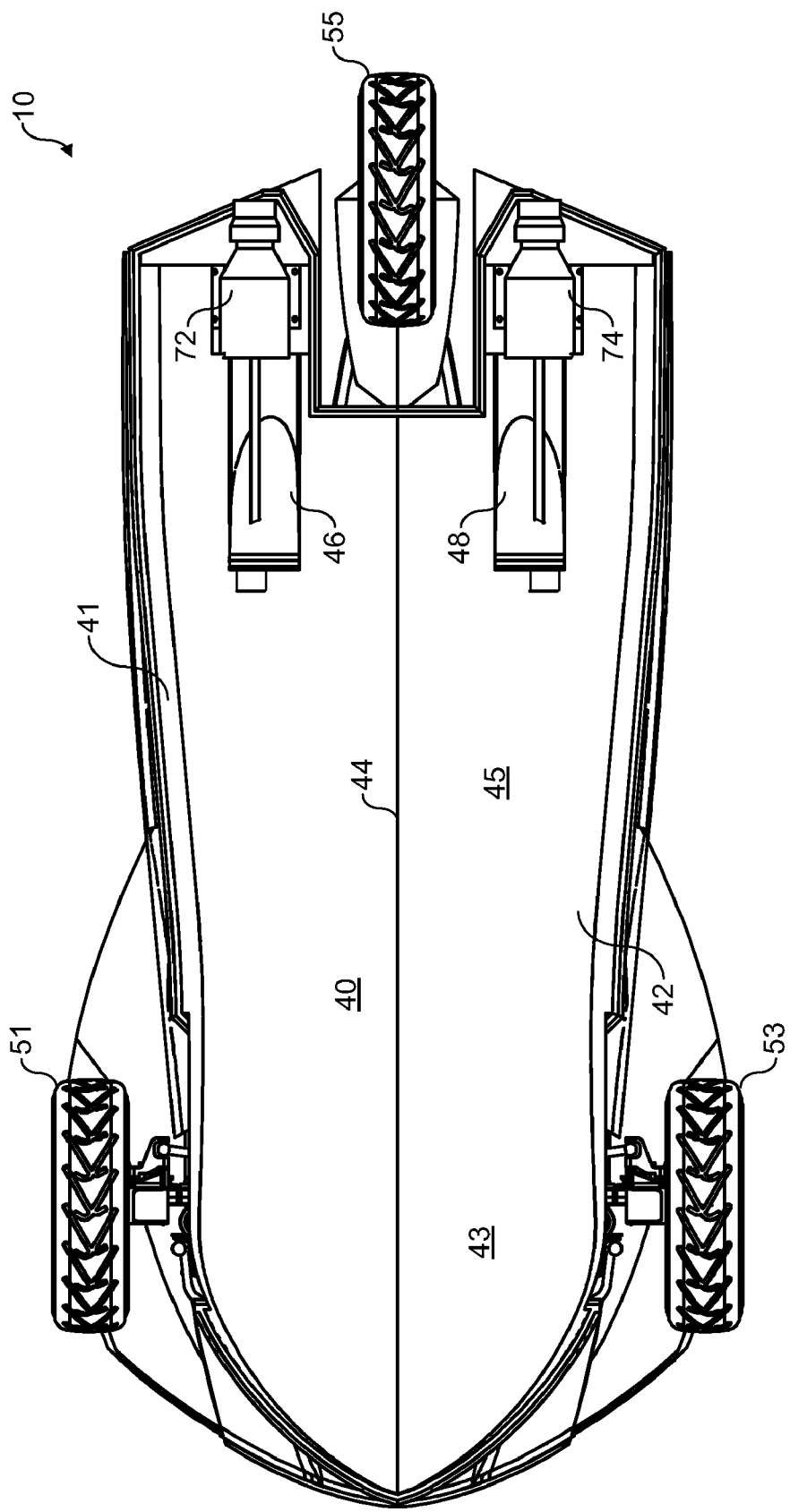
FIG. 7 is a bottom plan view of the amphibian of FIG. 1.
Figure 8:
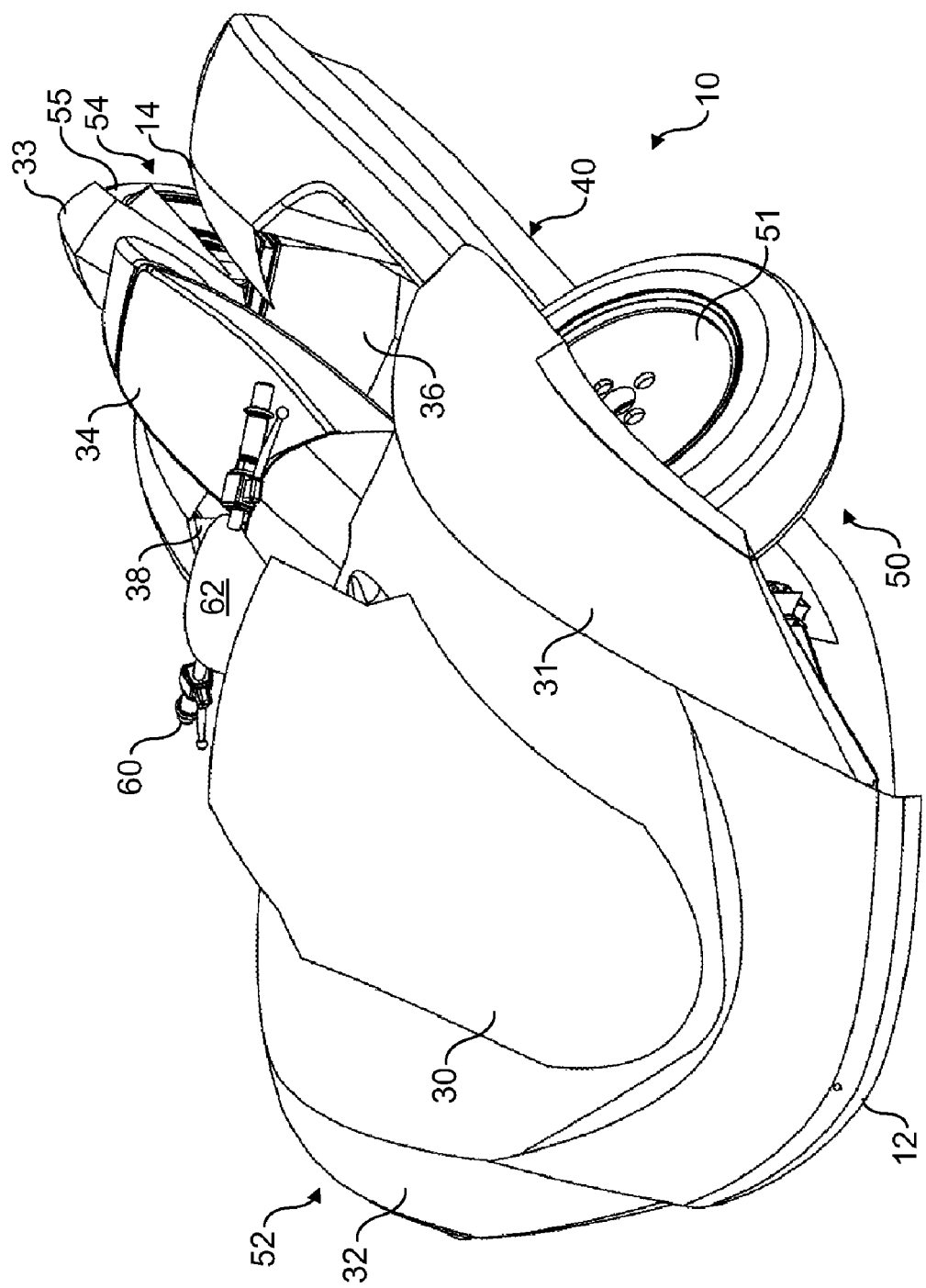
FIG. 8 is the same perspective view of the amphibian of FIG. 1, but with the wheels retracted for use in marine mode.
Figure 9:
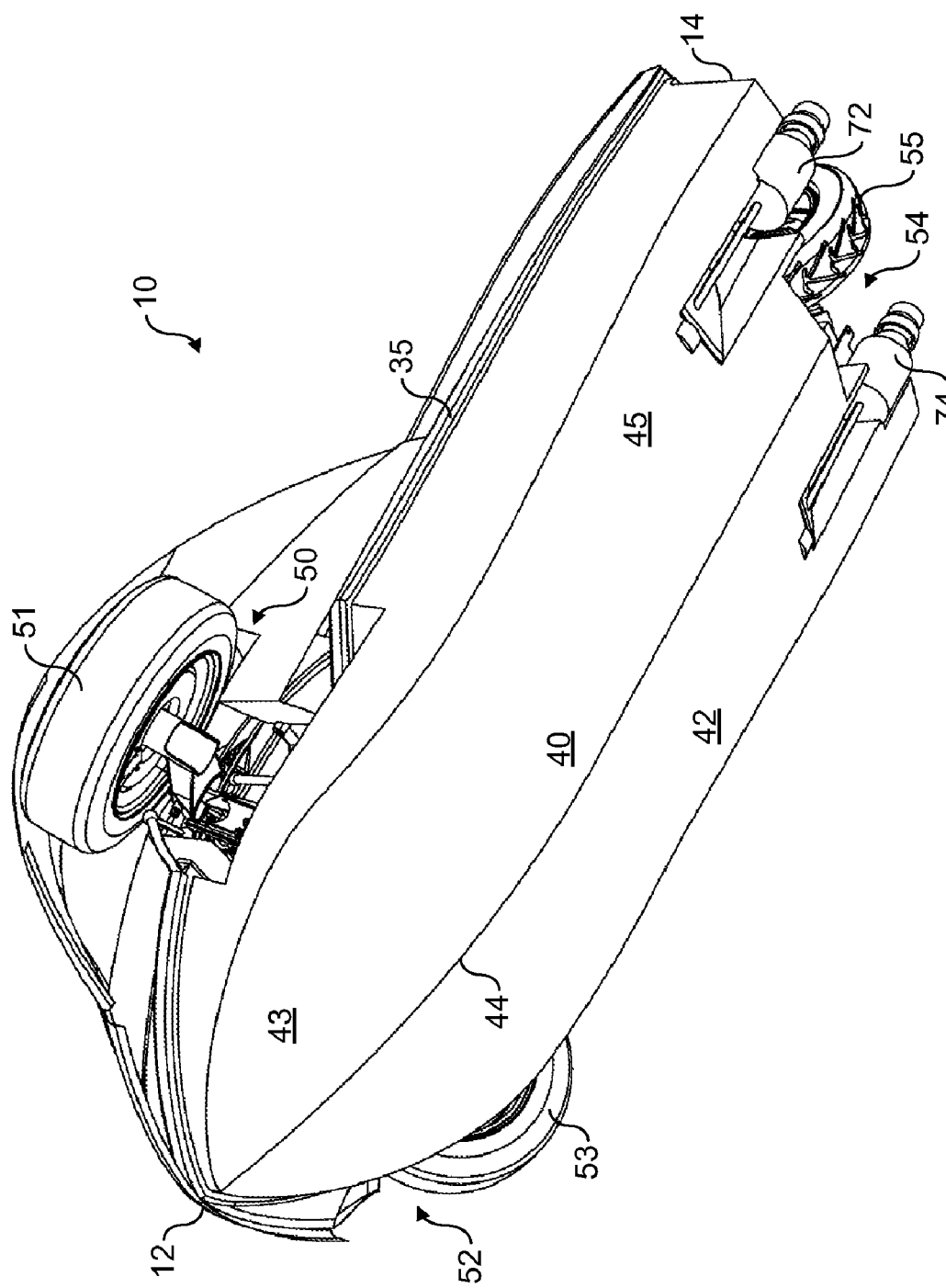
Figure 10:
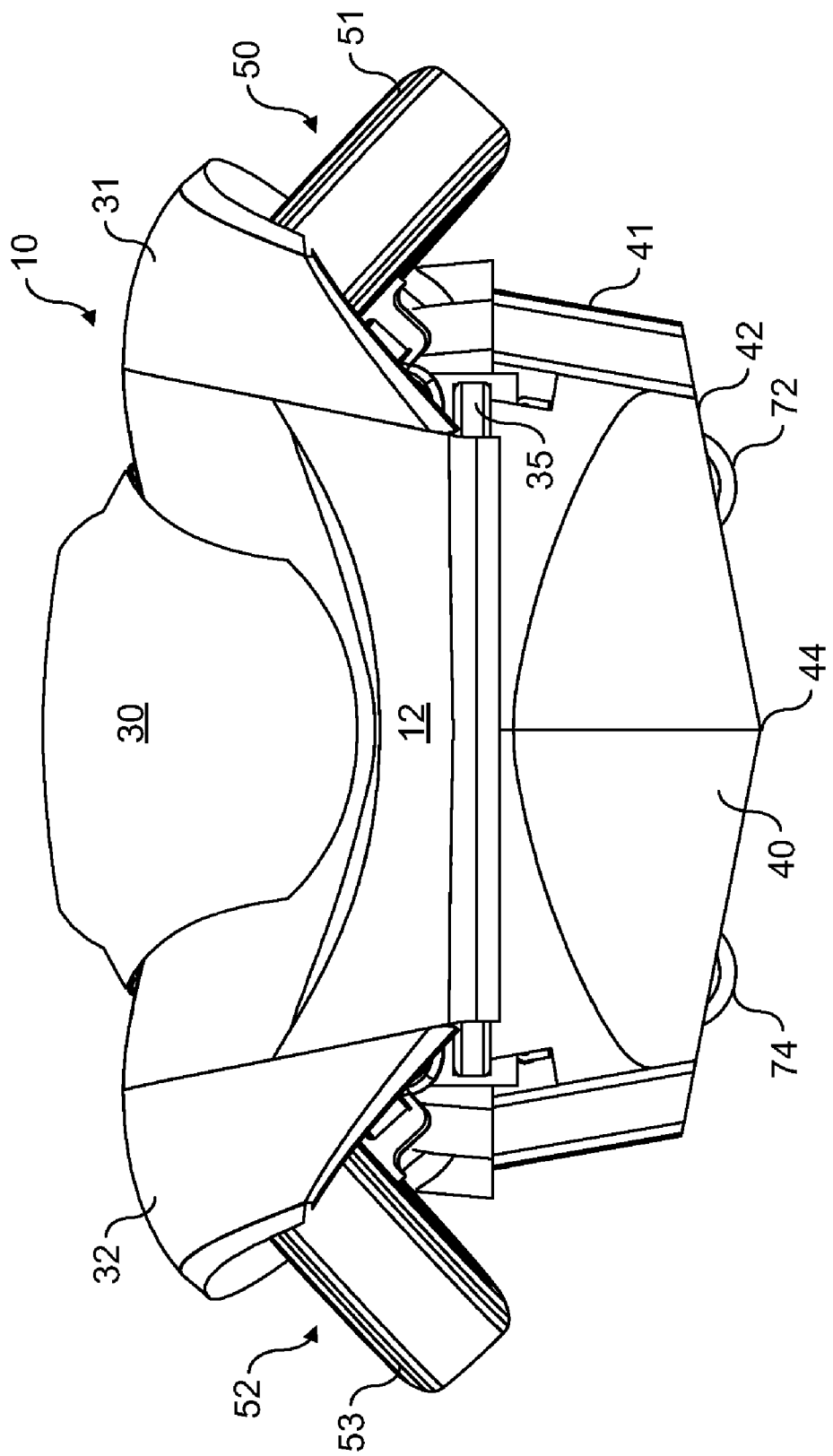
Figure 11:
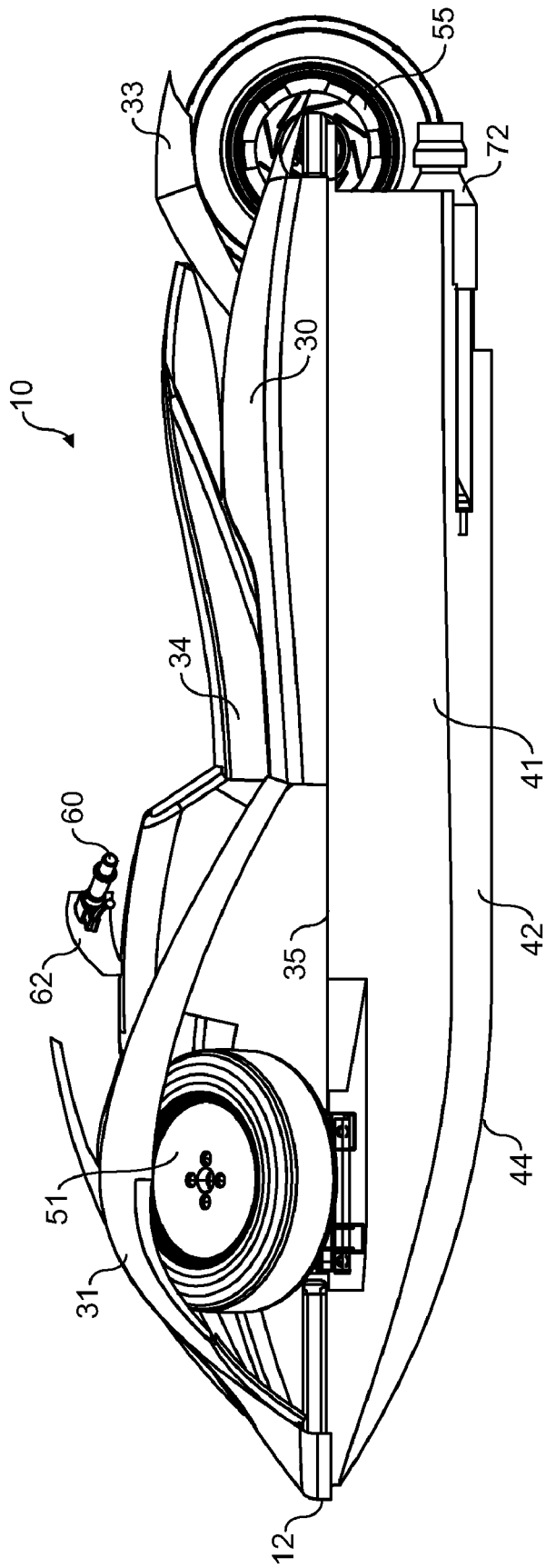
Figure 12:
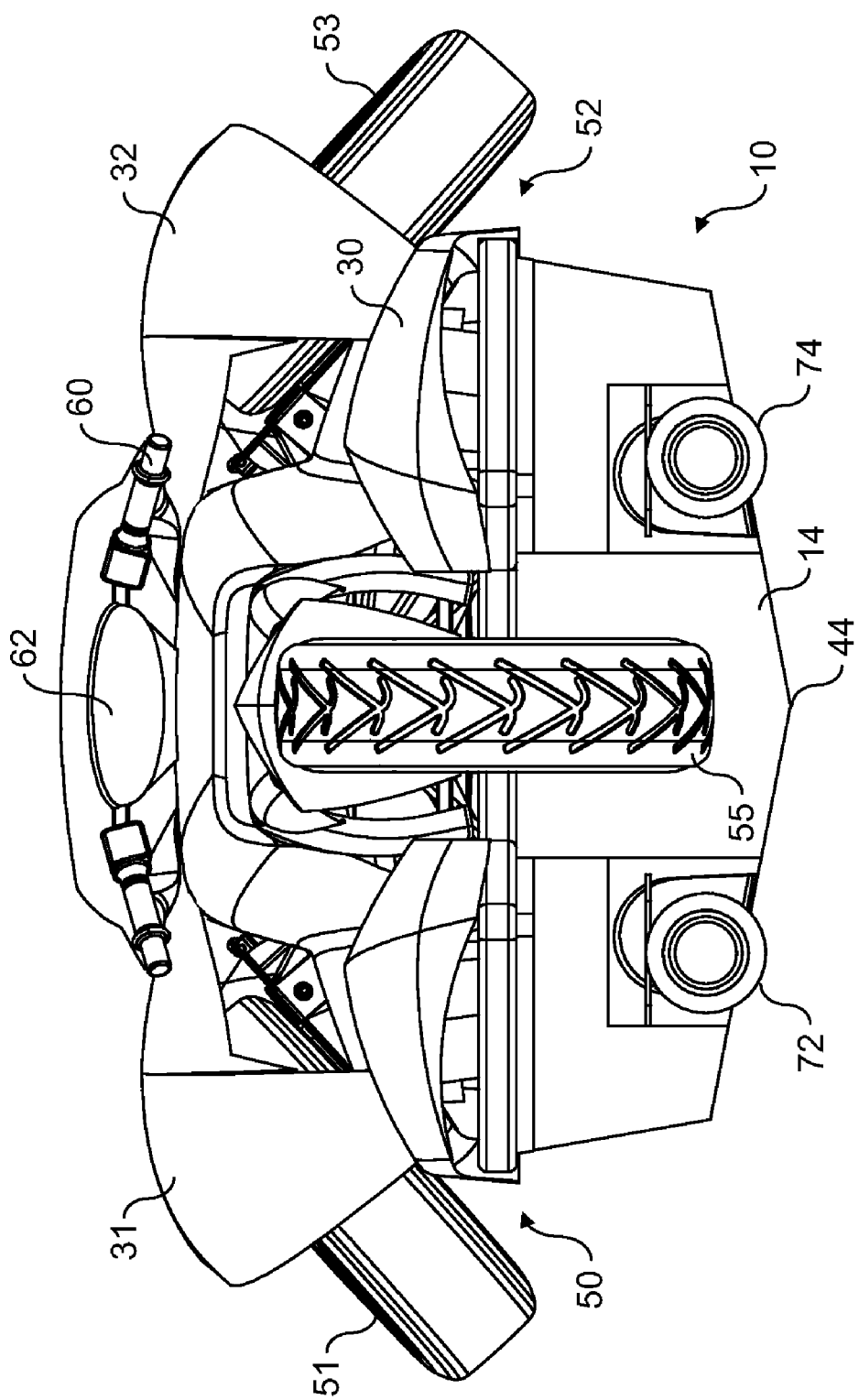
Figure 13:
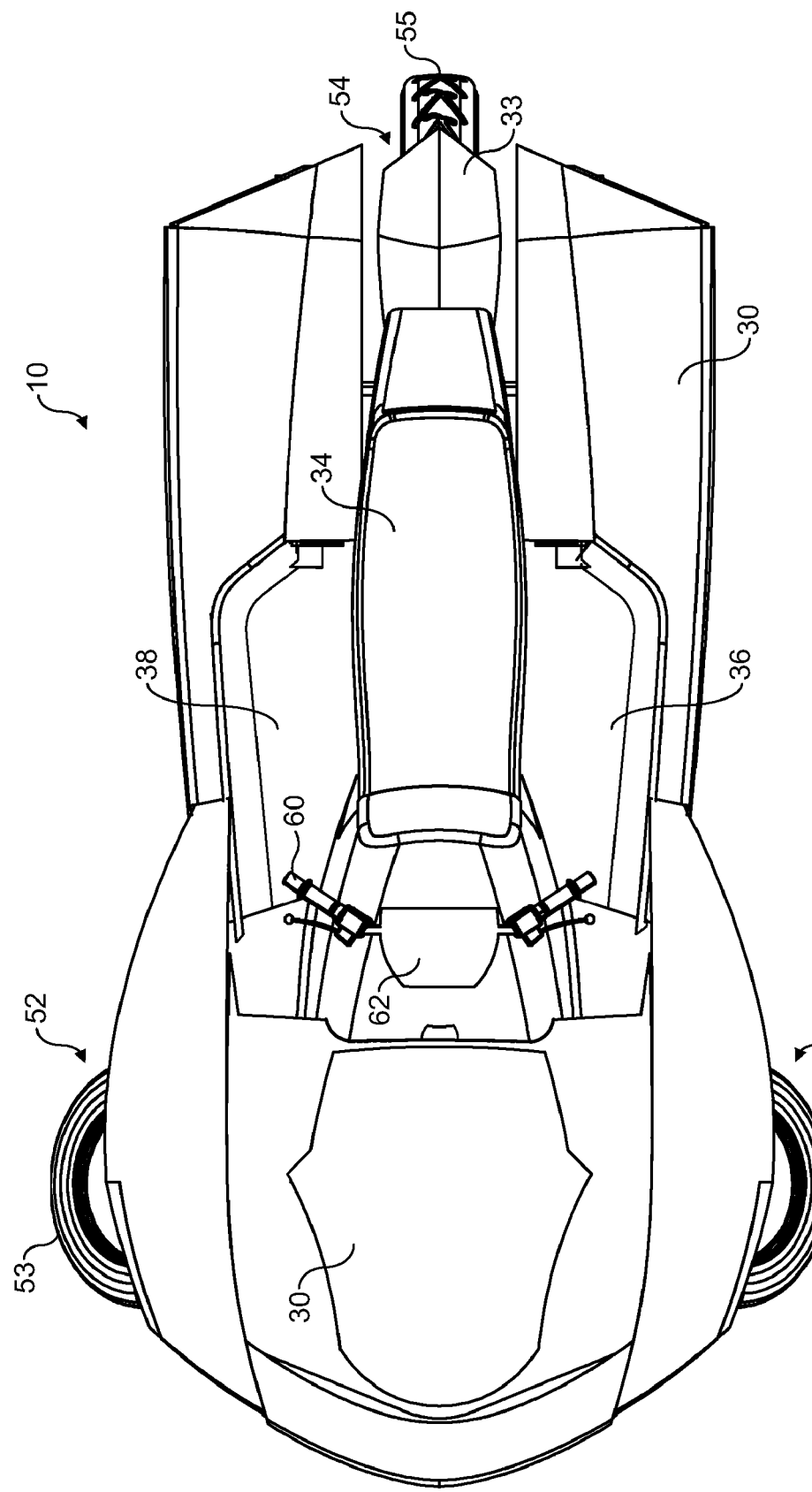
Figure 14:
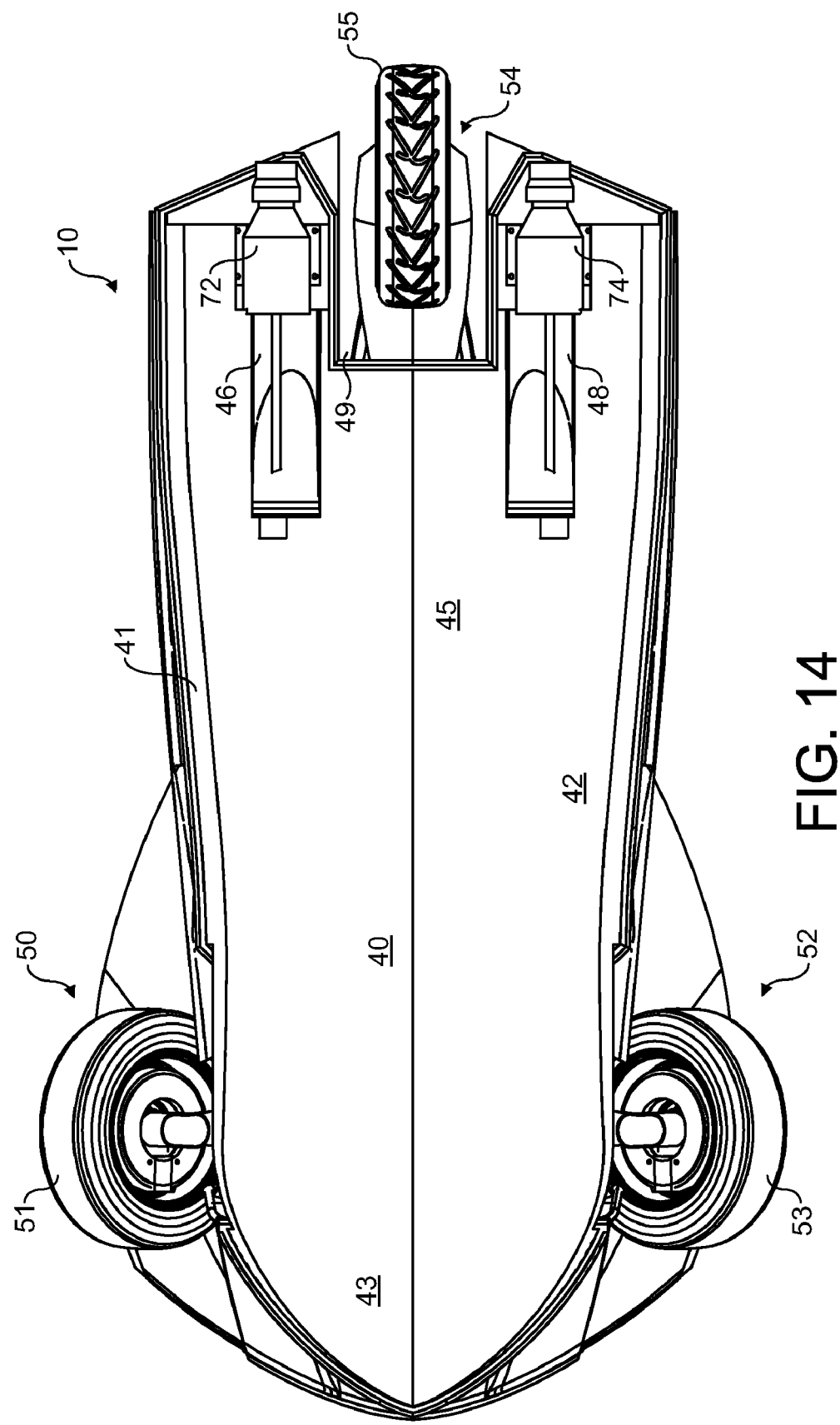
Figure 15:
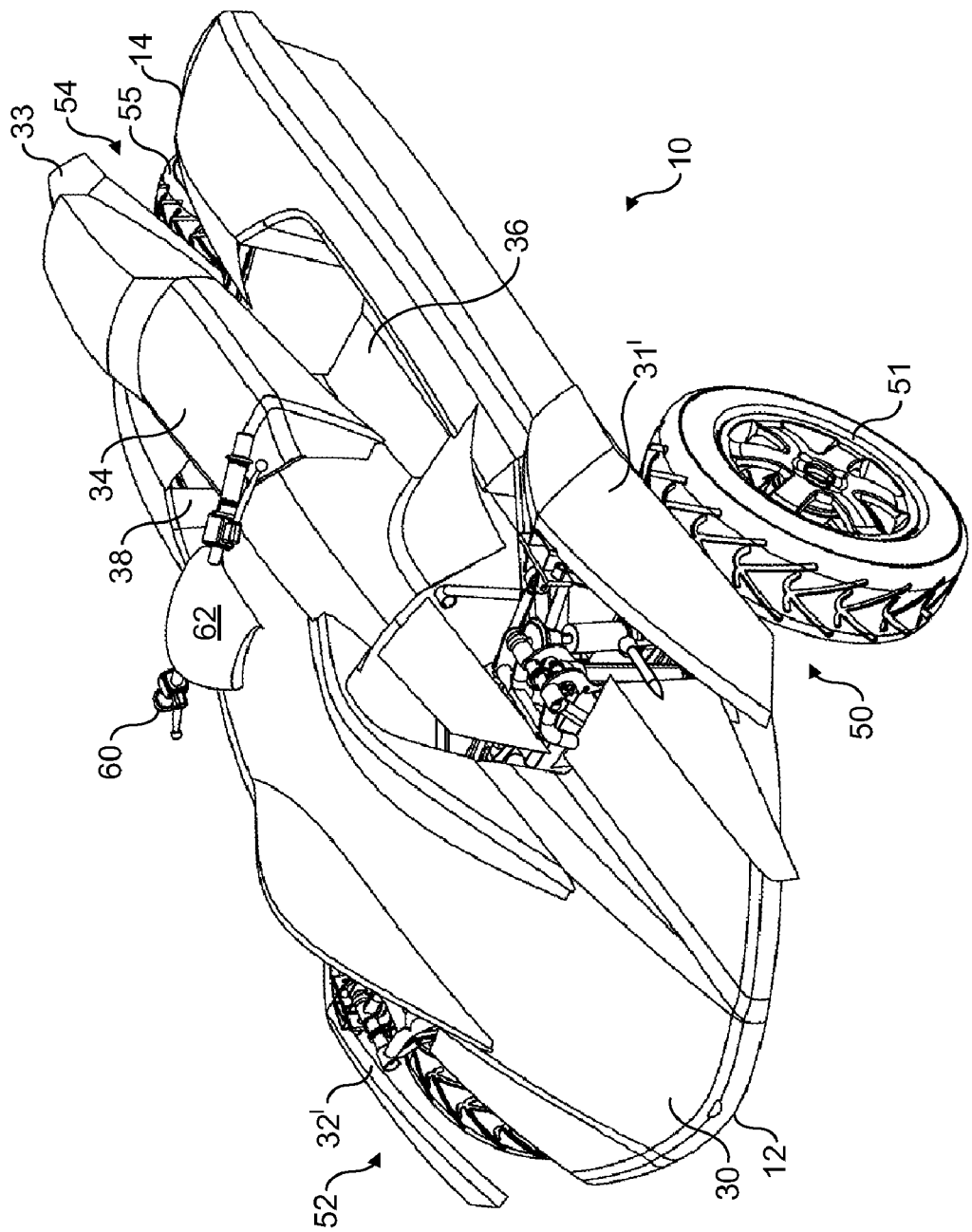
Figure 16:
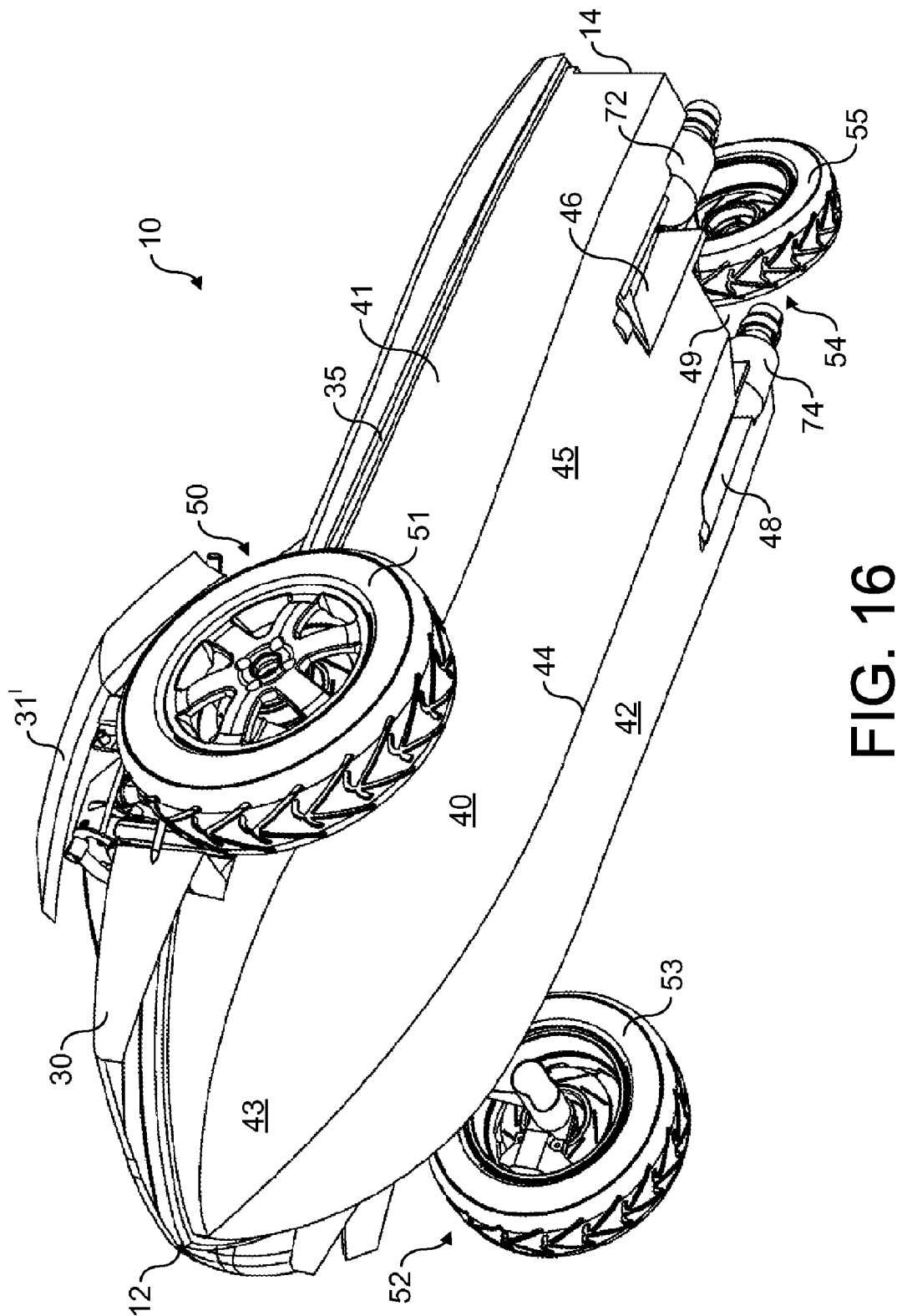
Figure 17:
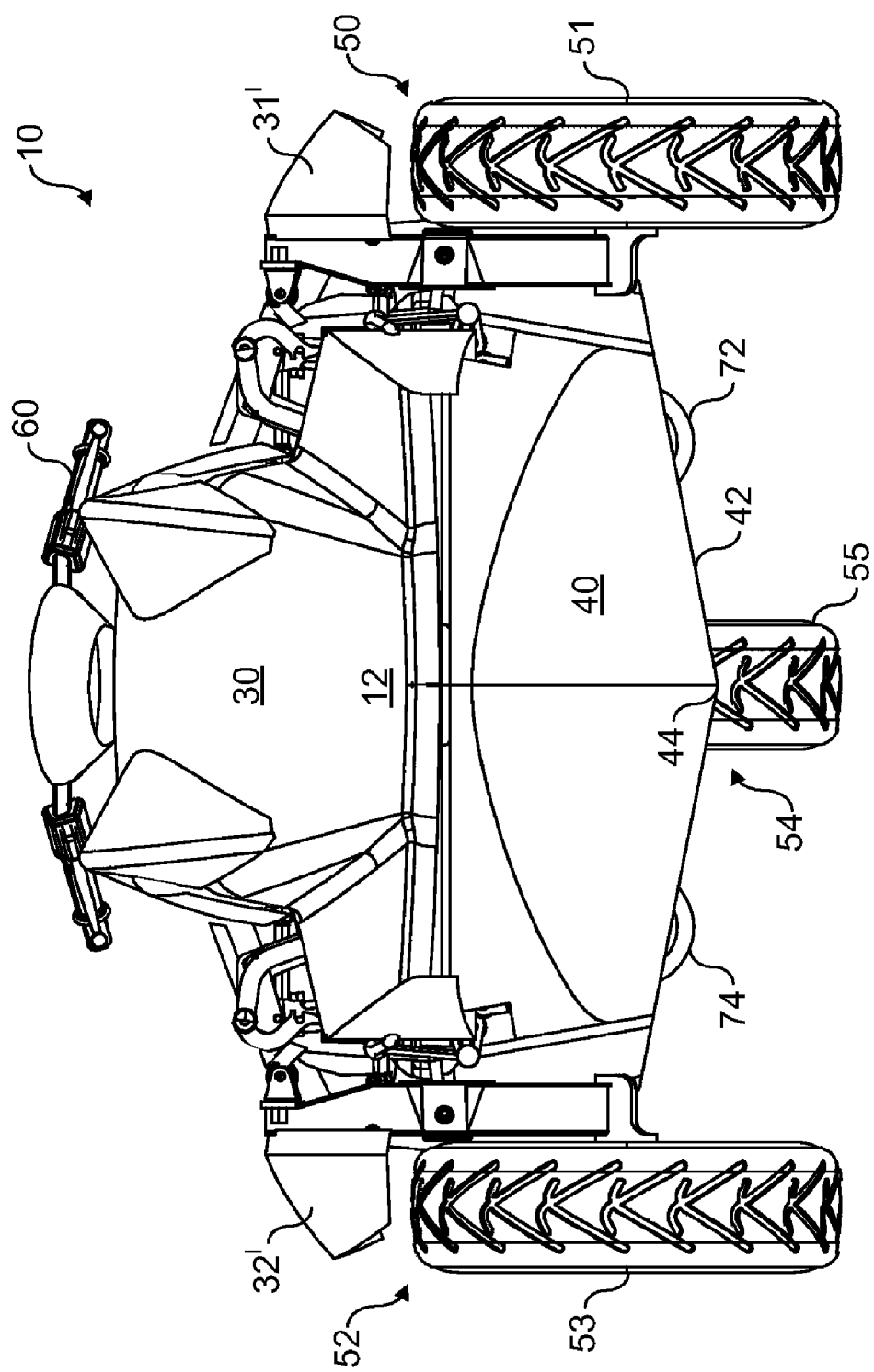
Figure 18:
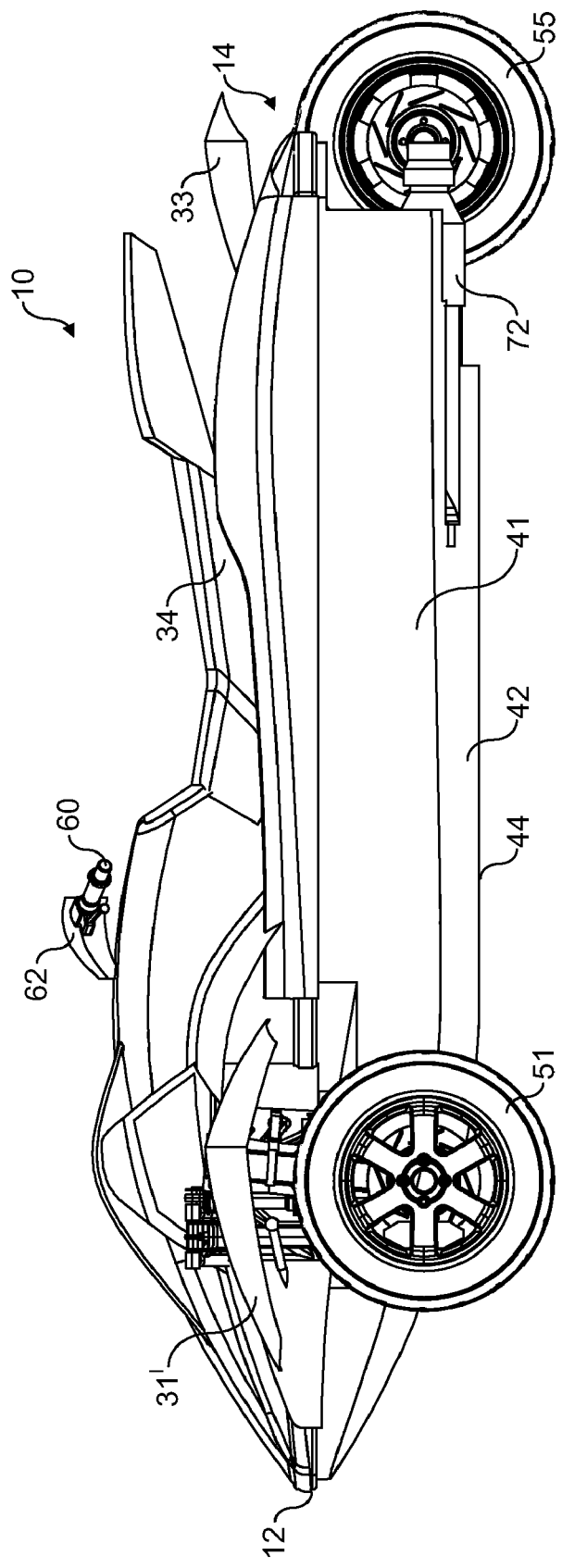
Figure 19:
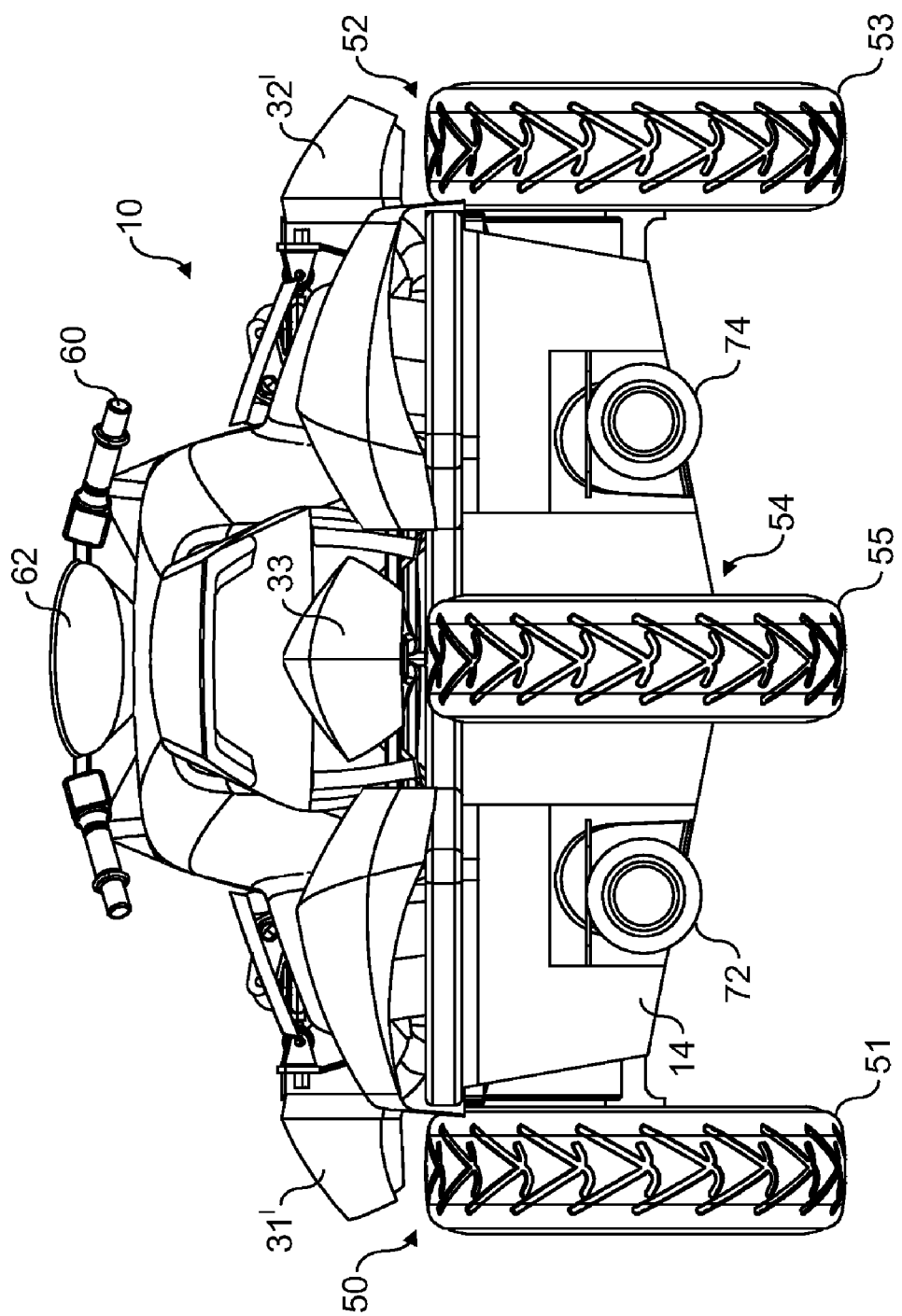
Figure 20:
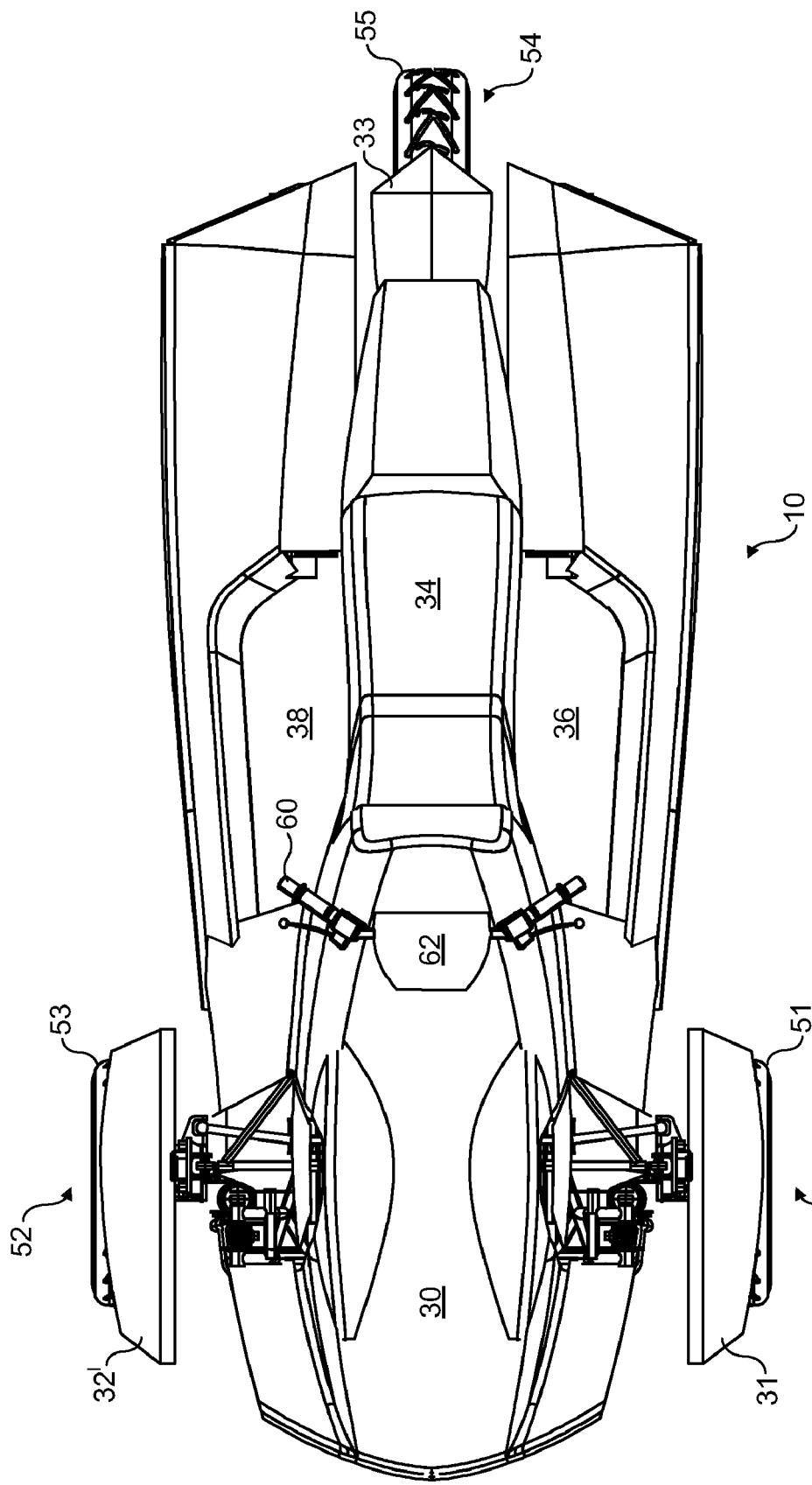
Figure 21:
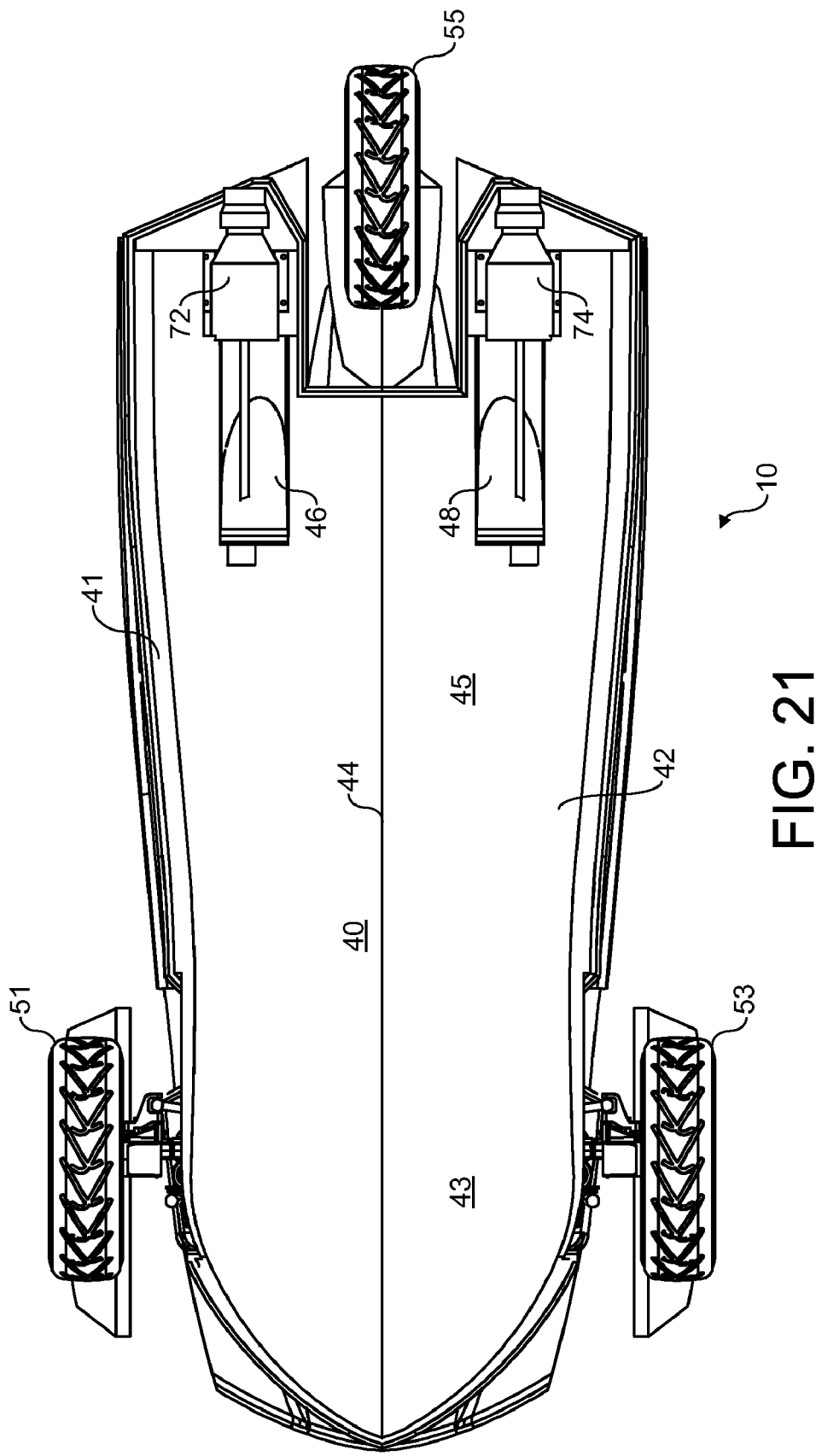
Figure 22:
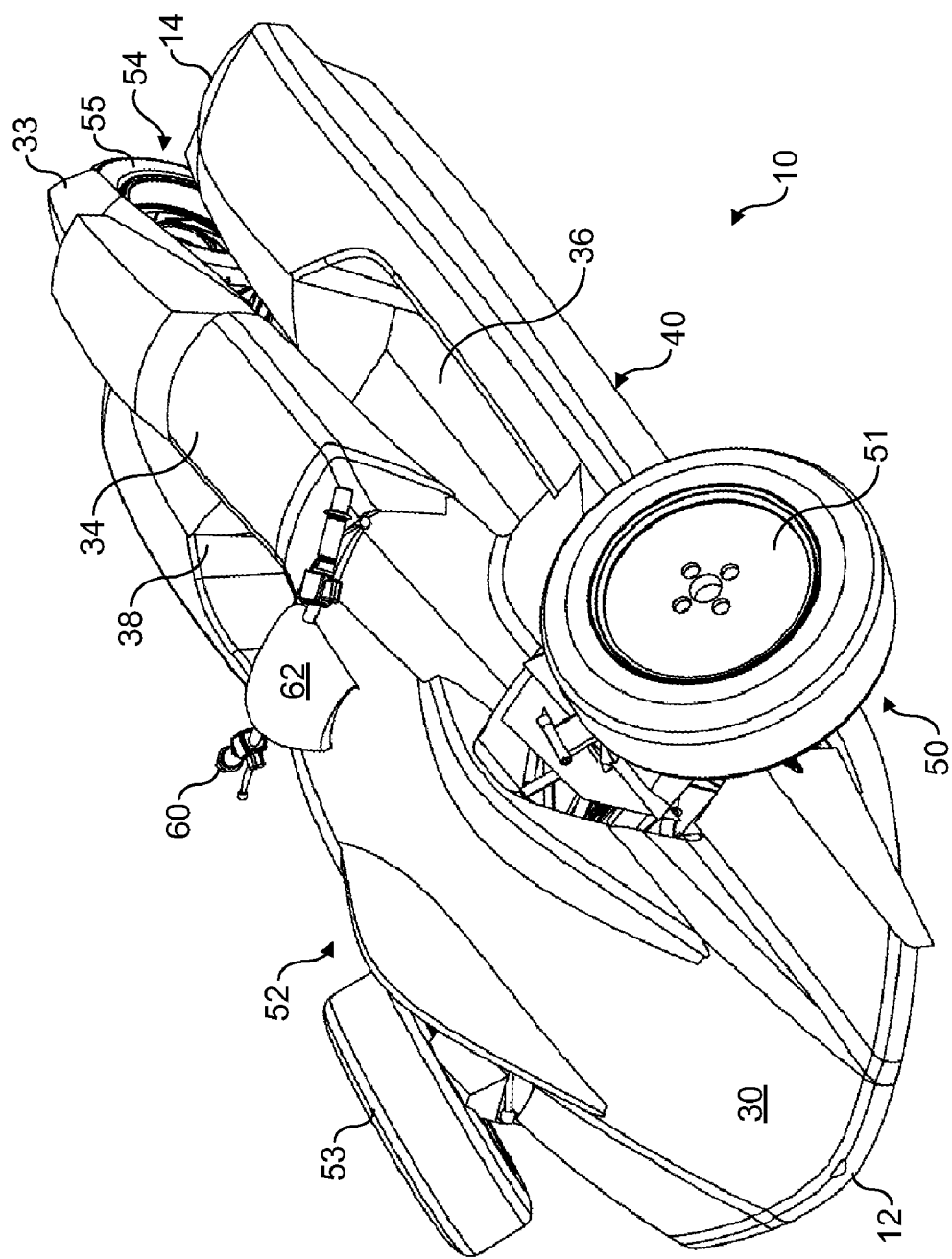
Figure 23:
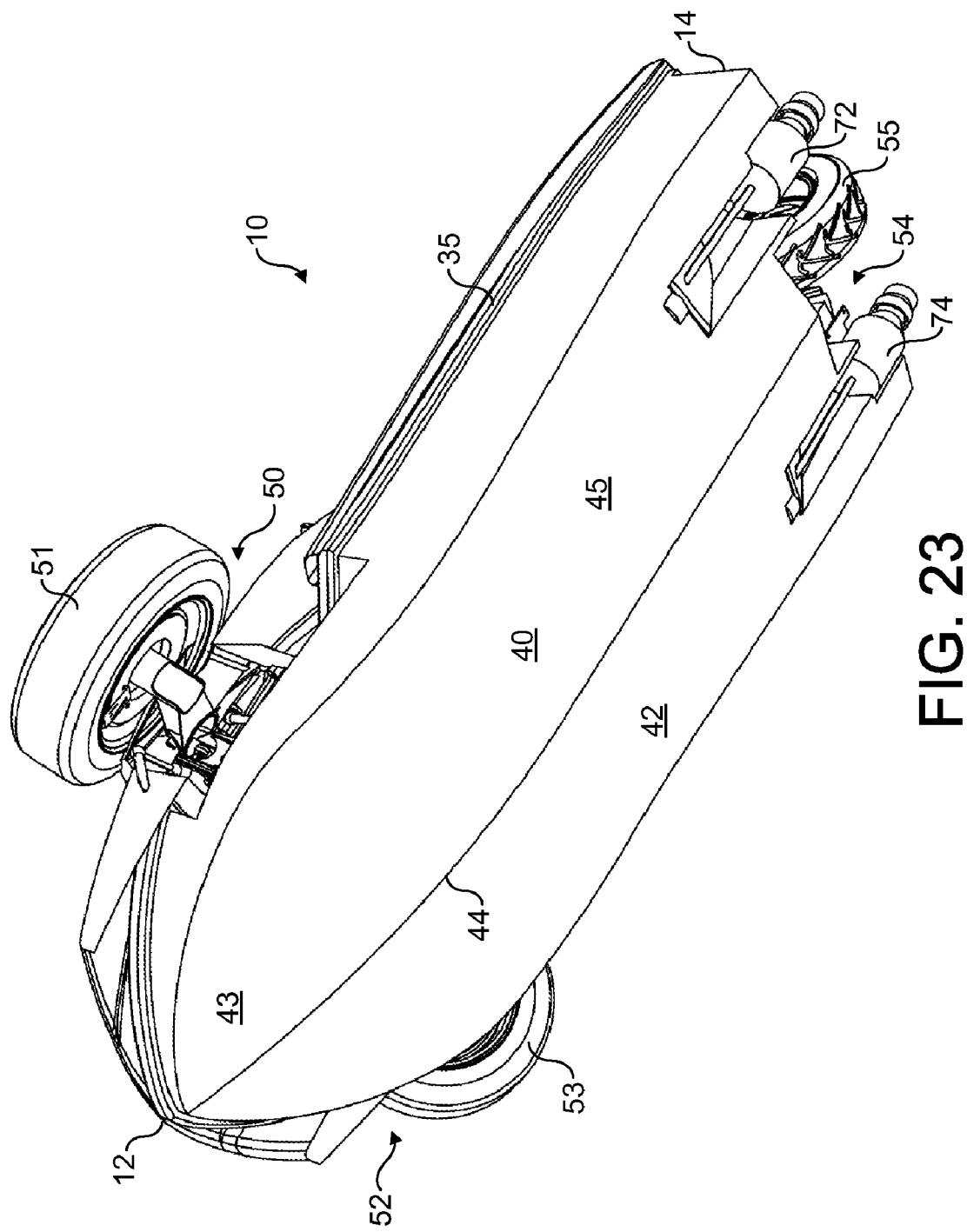
Figure 24:
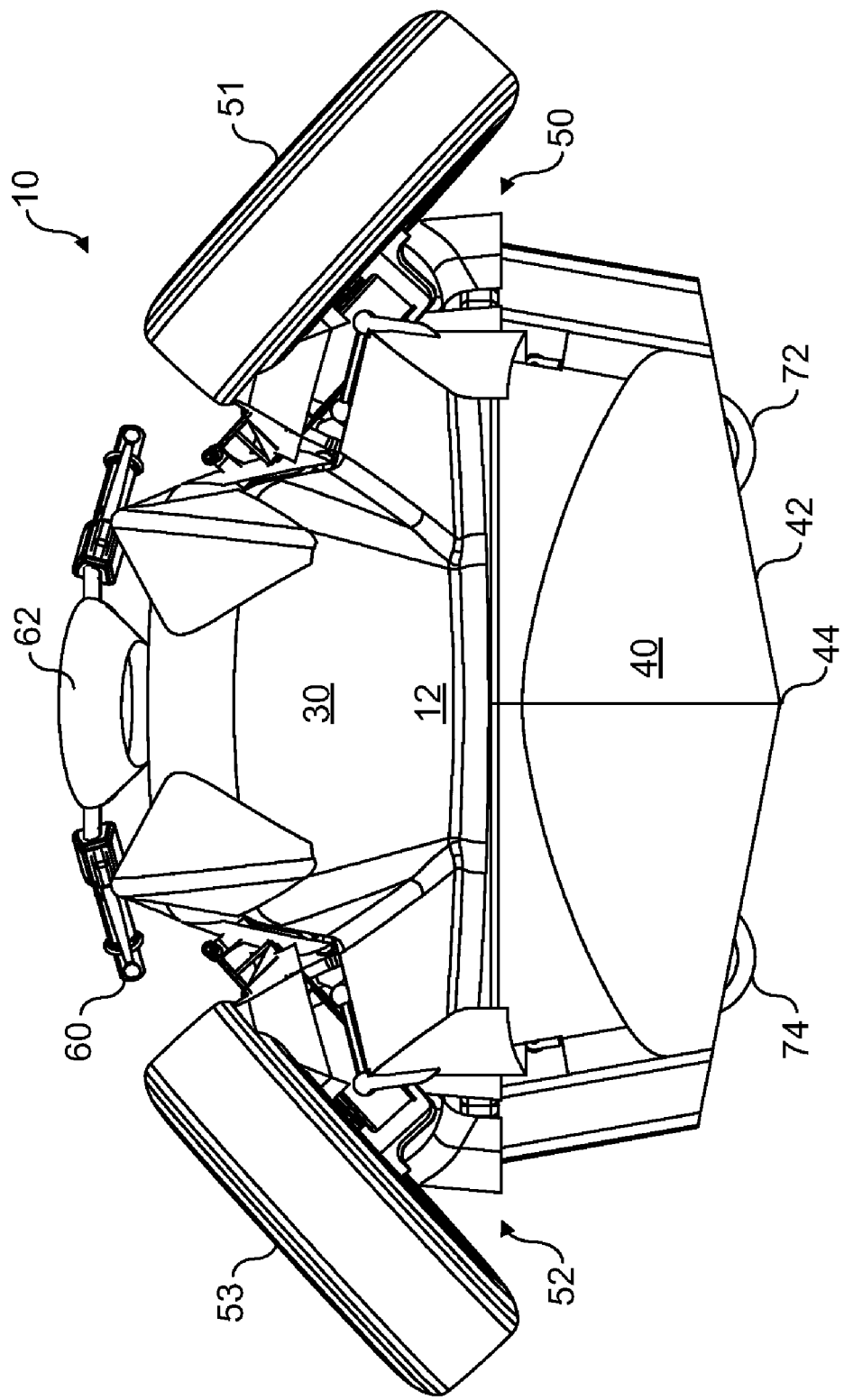
Figure 25:
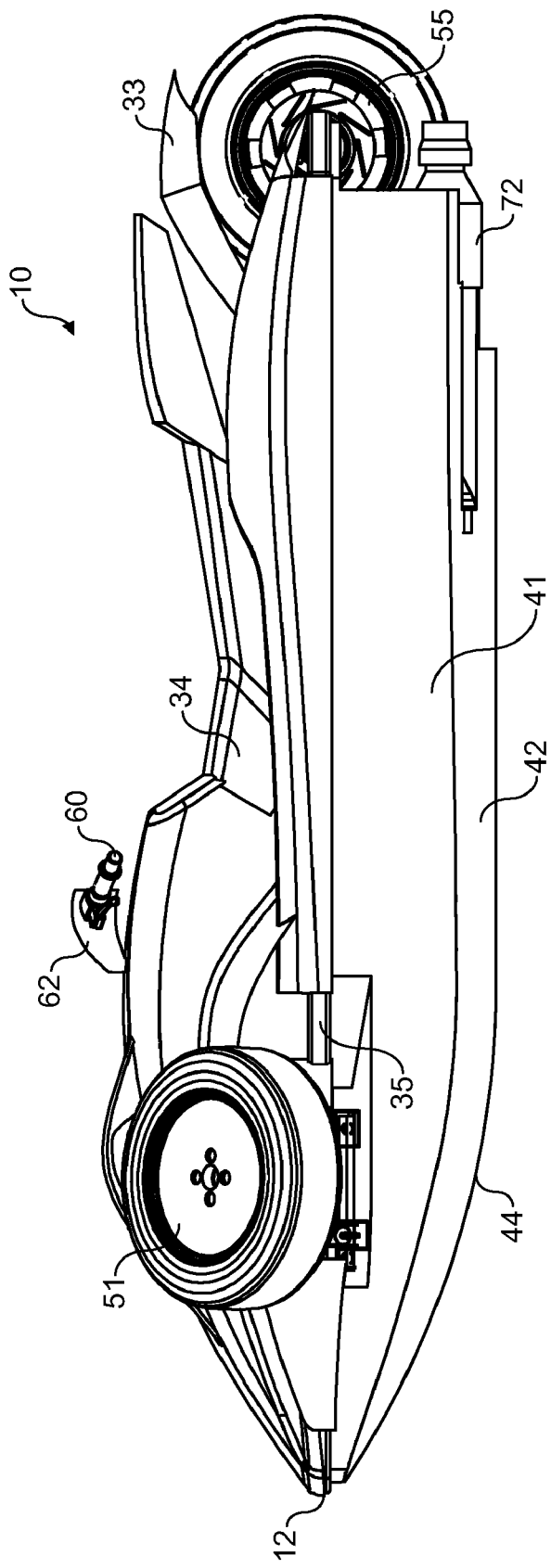
Figure 26:
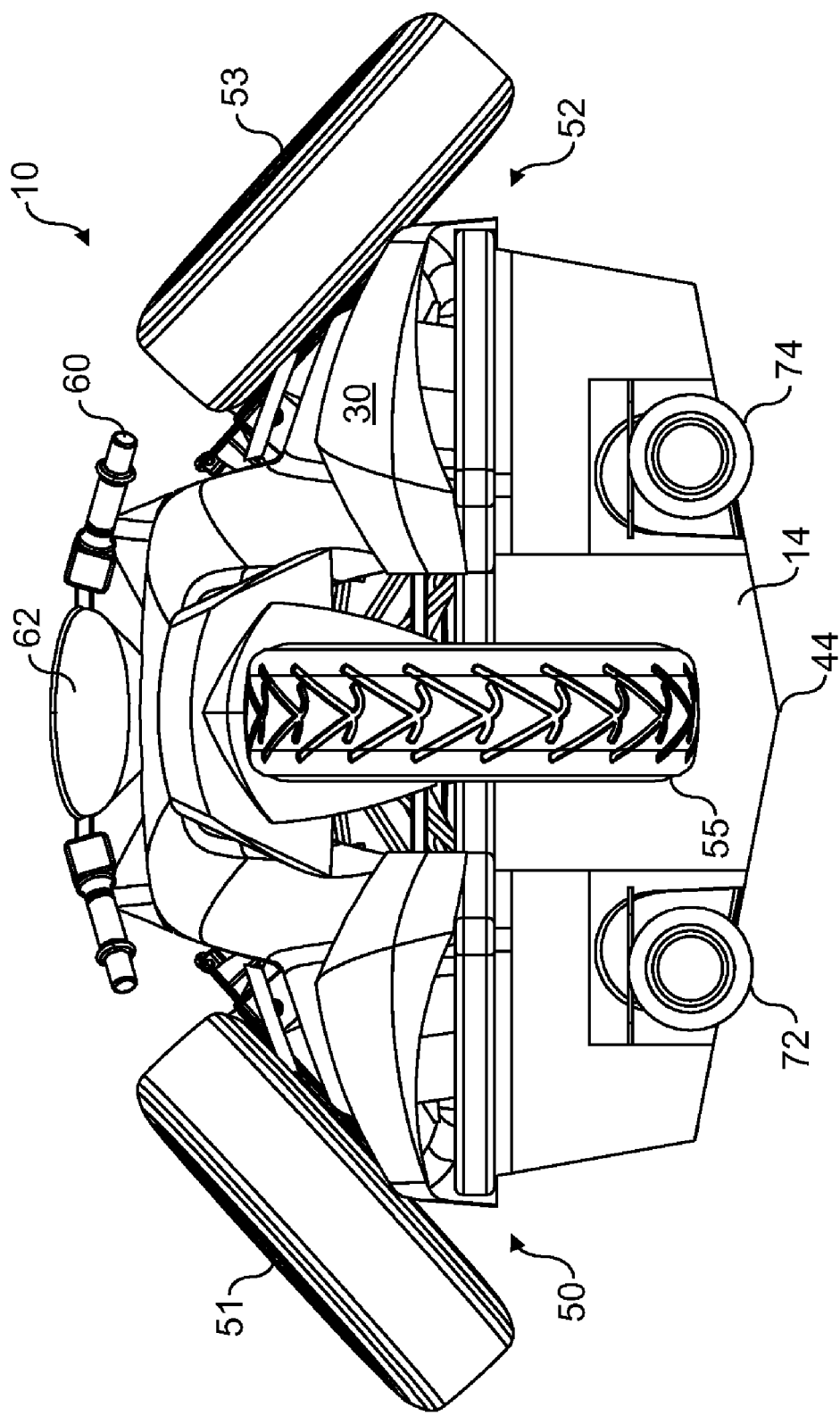
Figure 27:
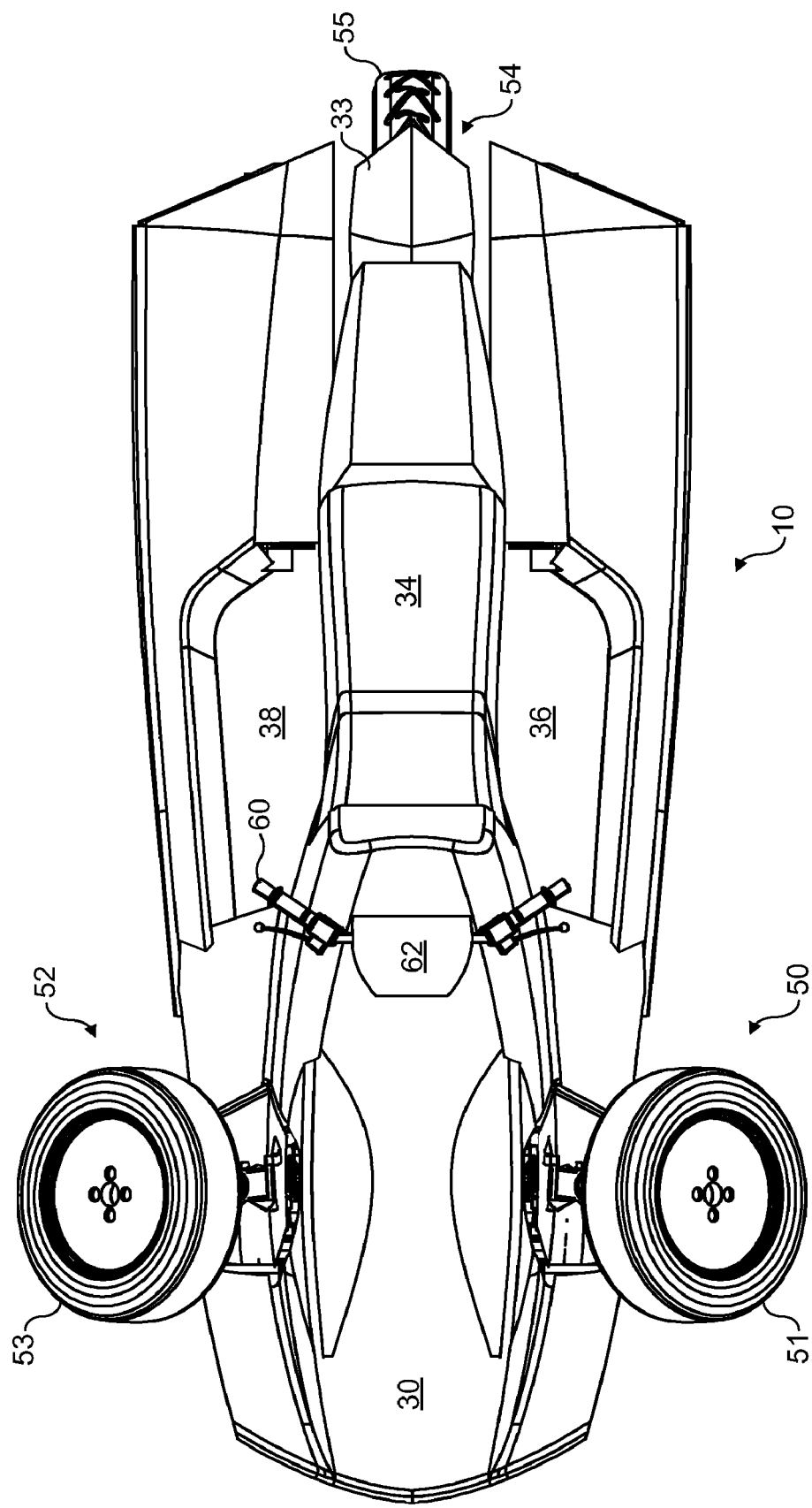
Figure 28:
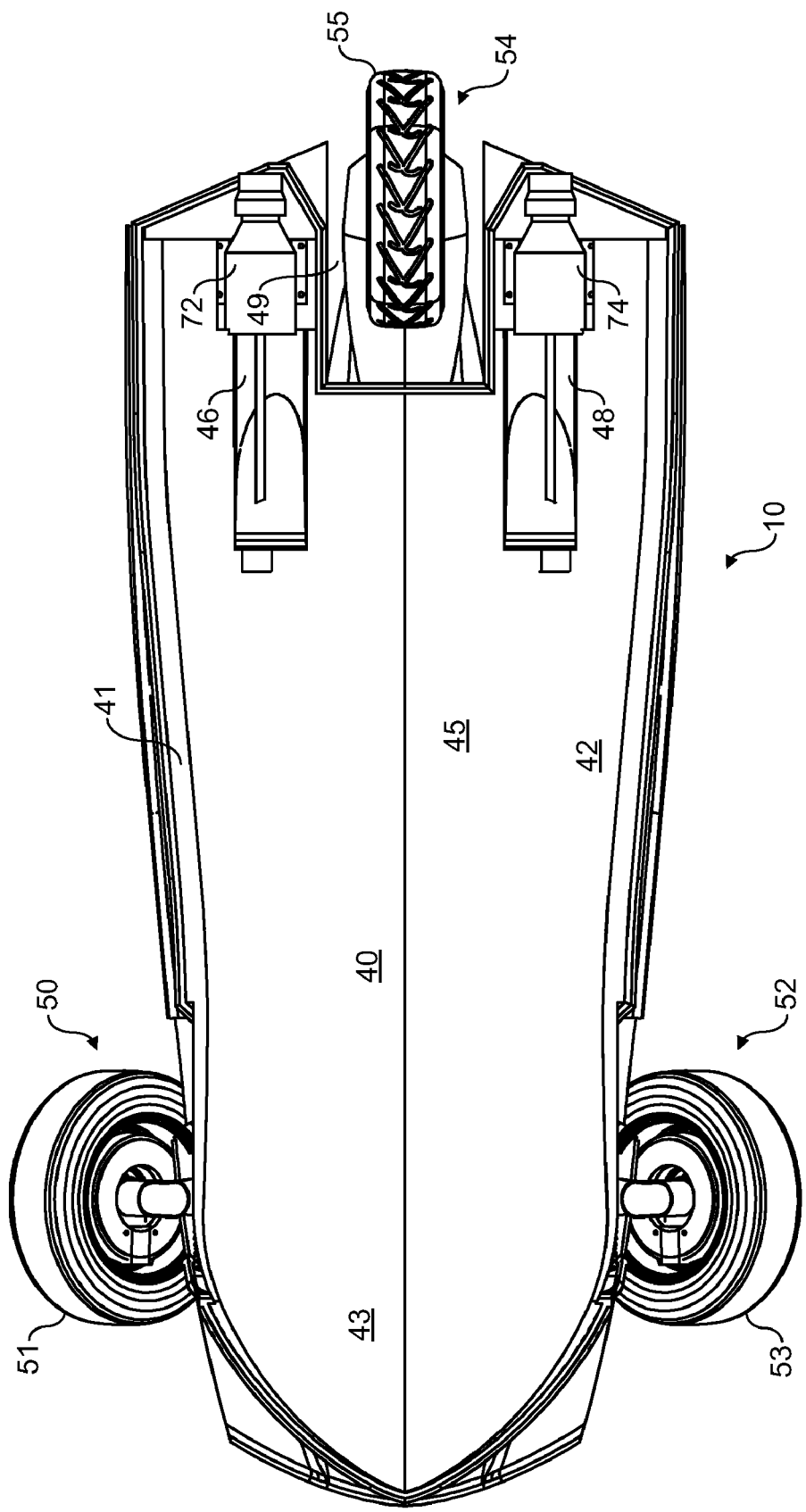
Figure 29:
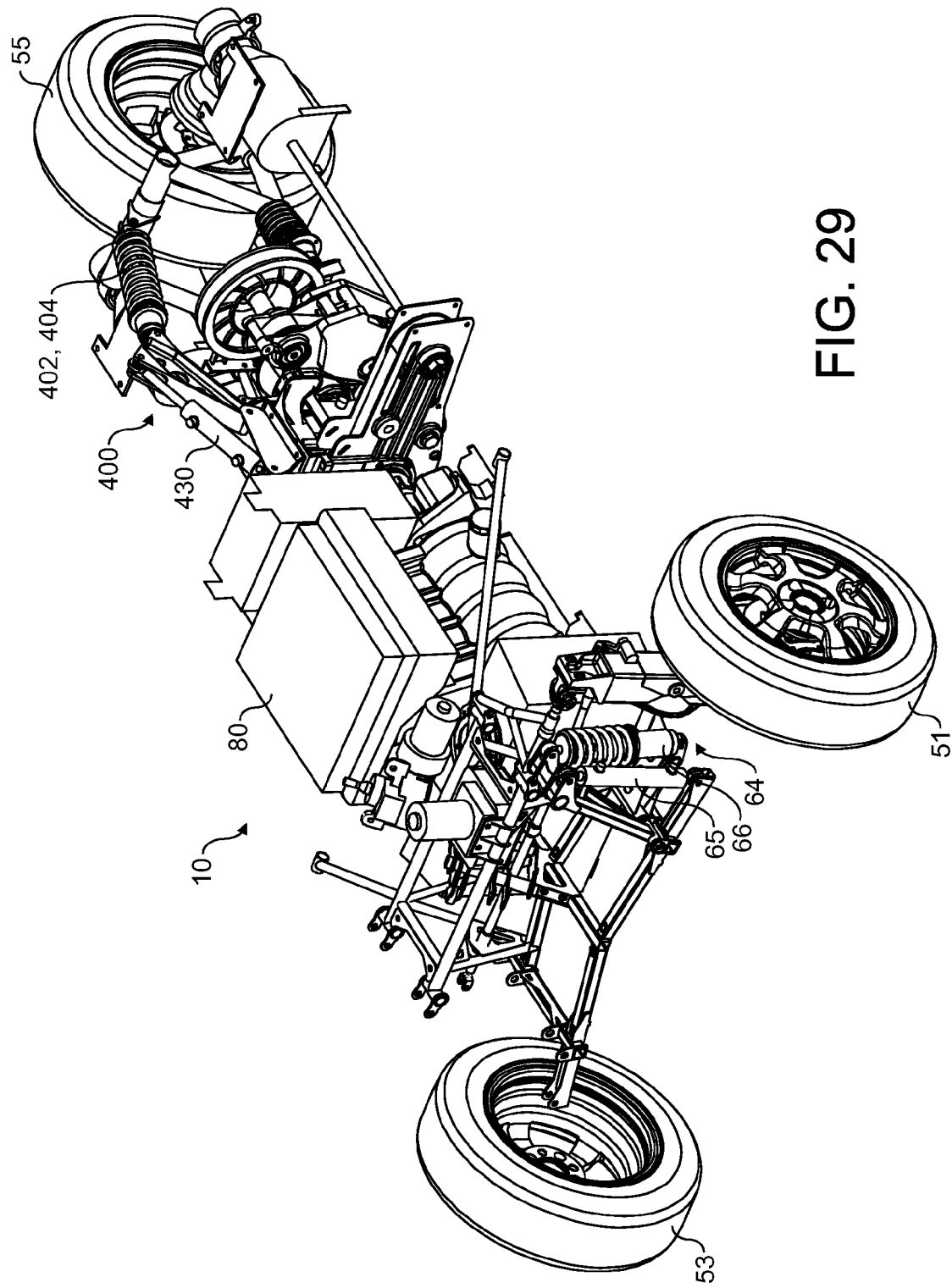
Figure 30:
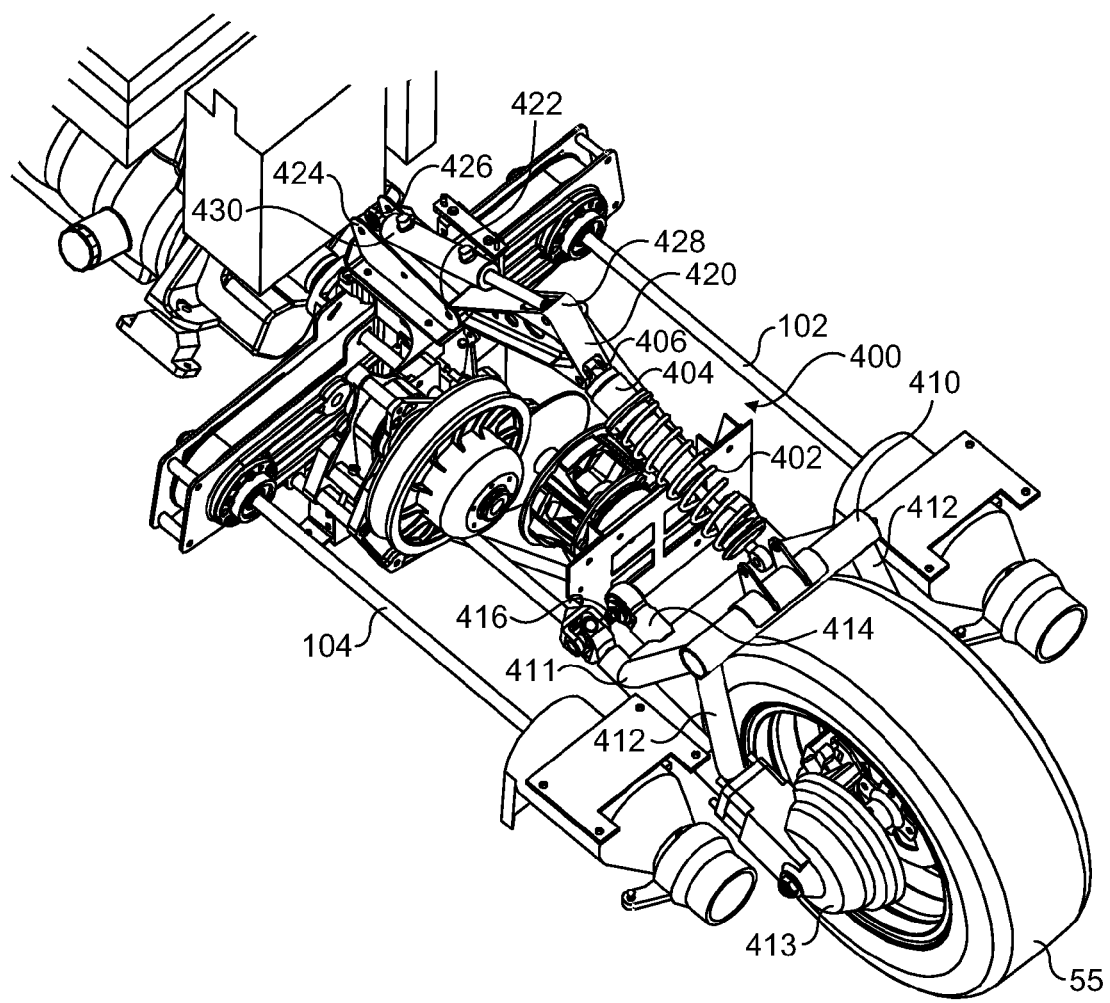
Figure 31:
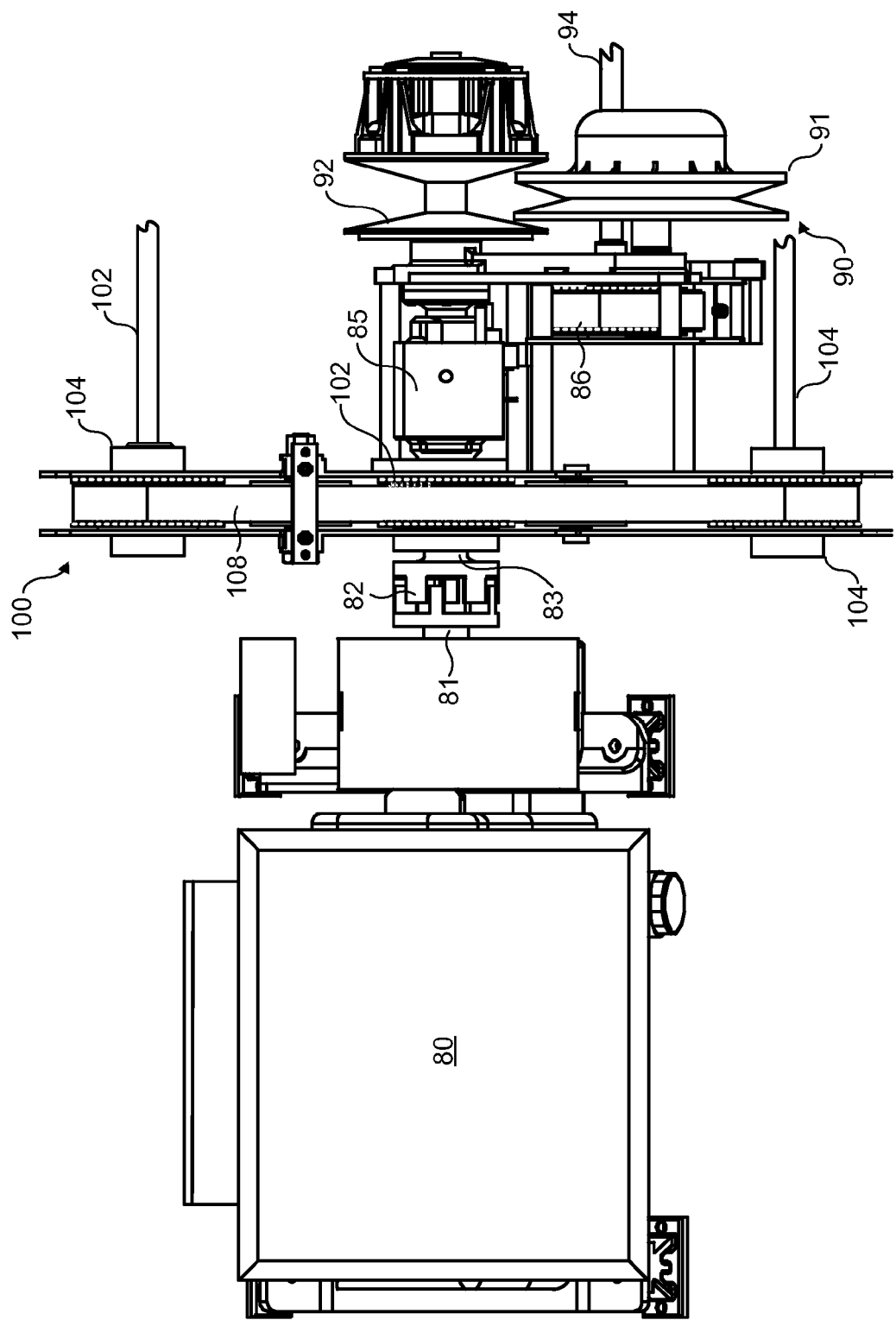
Figure 32:
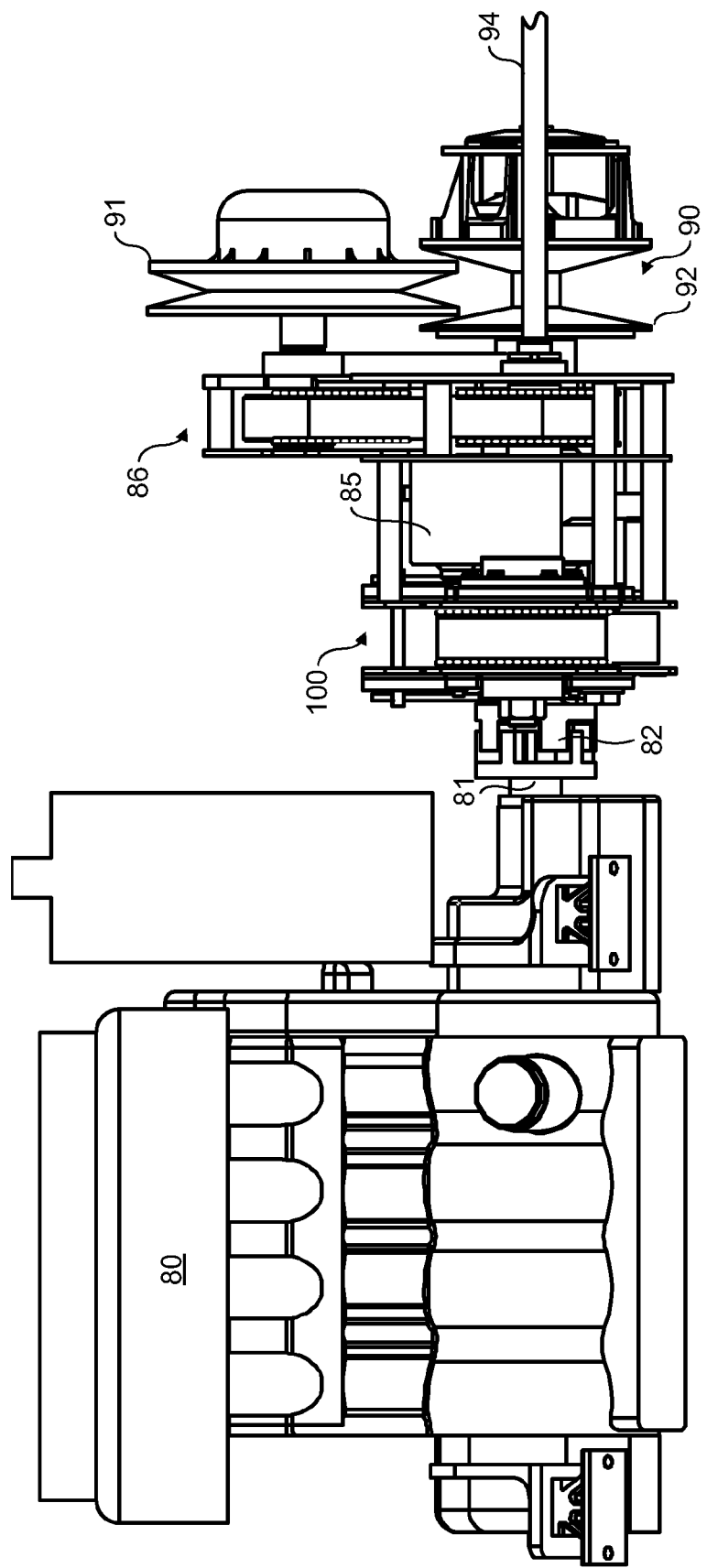
Figure 33:
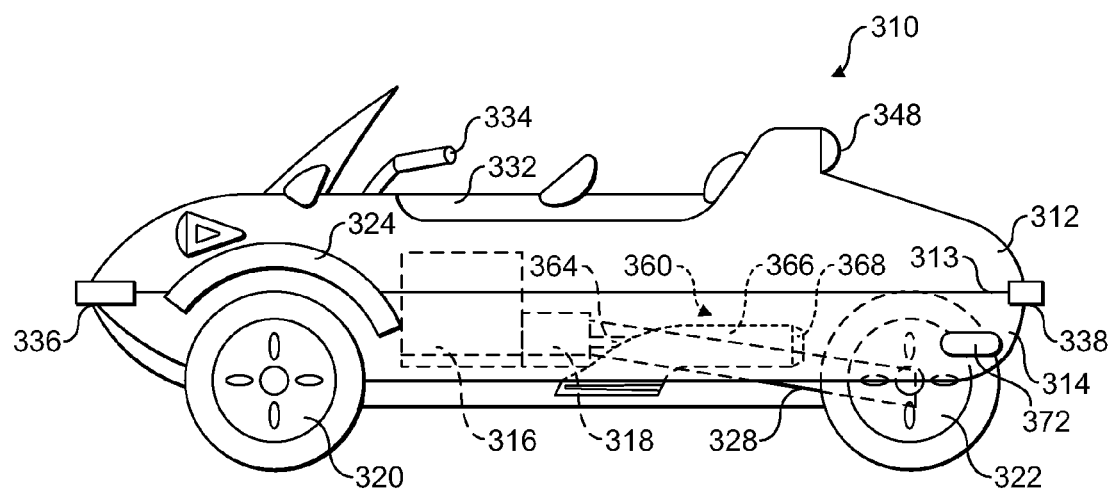
Figure 34:
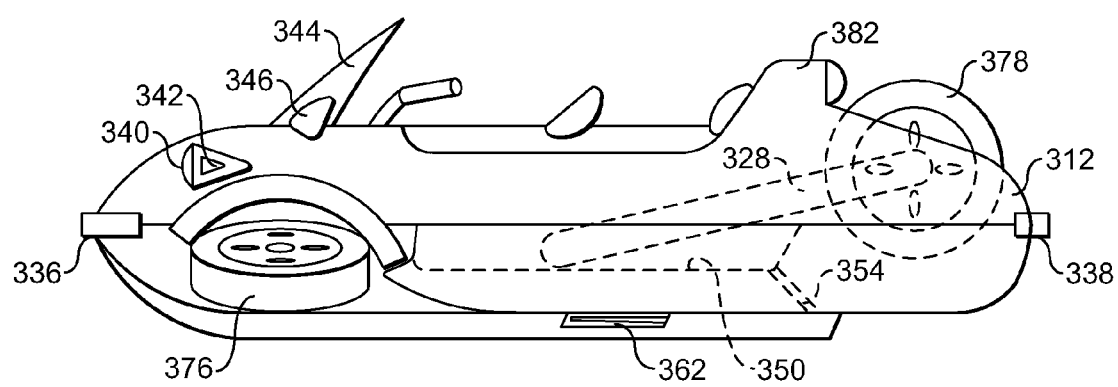
Figure 35:
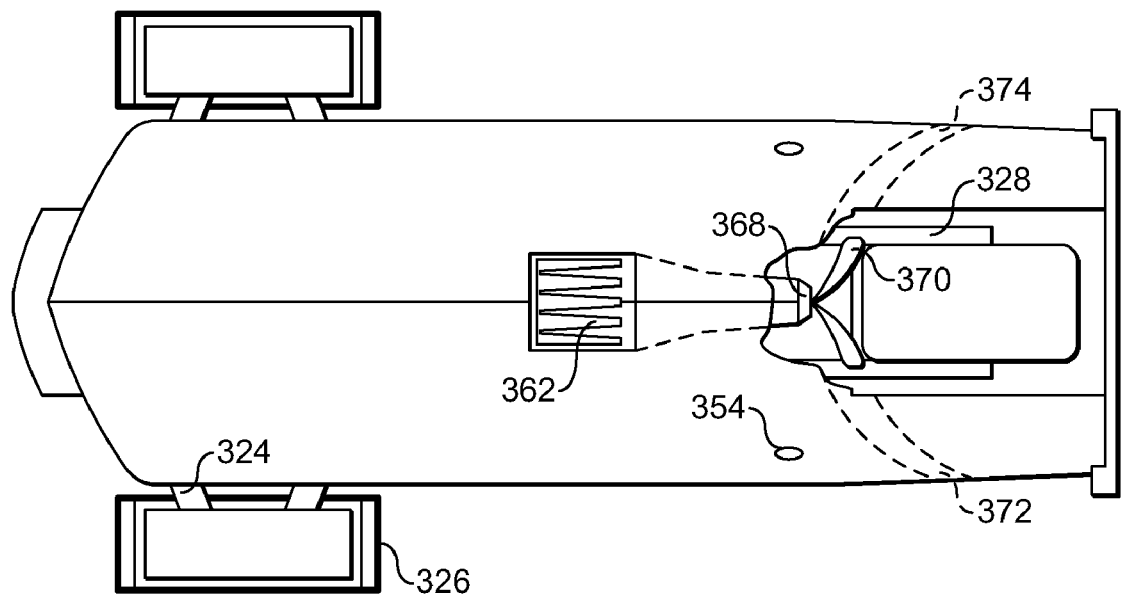
Figure 36:
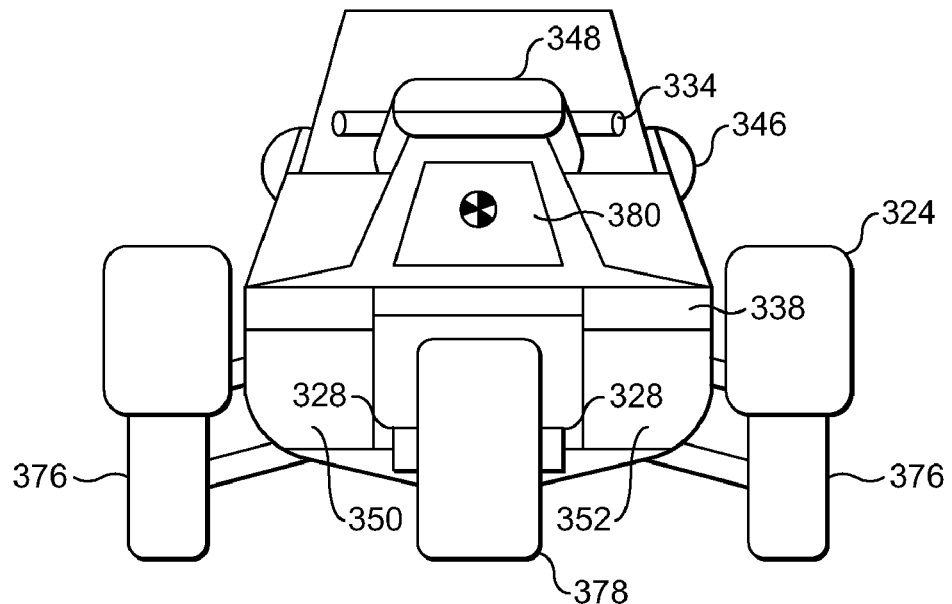
Figure 37:
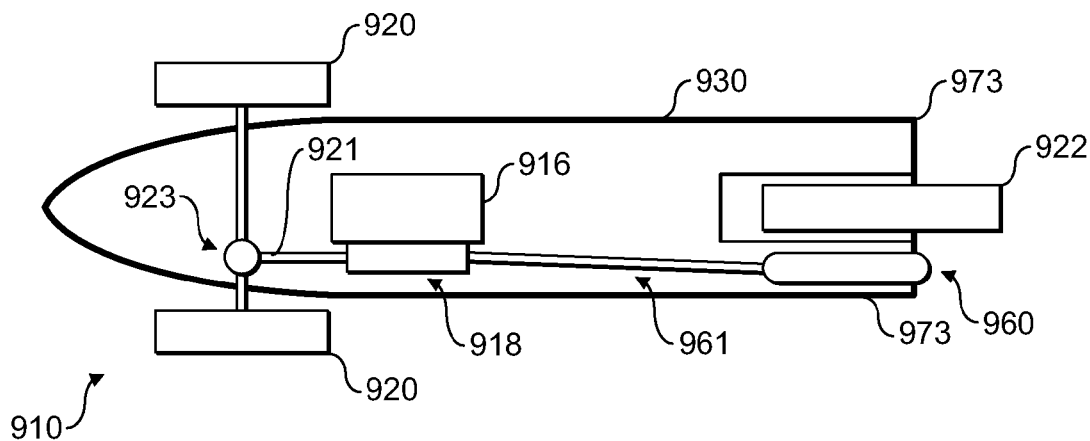
Figure 38:
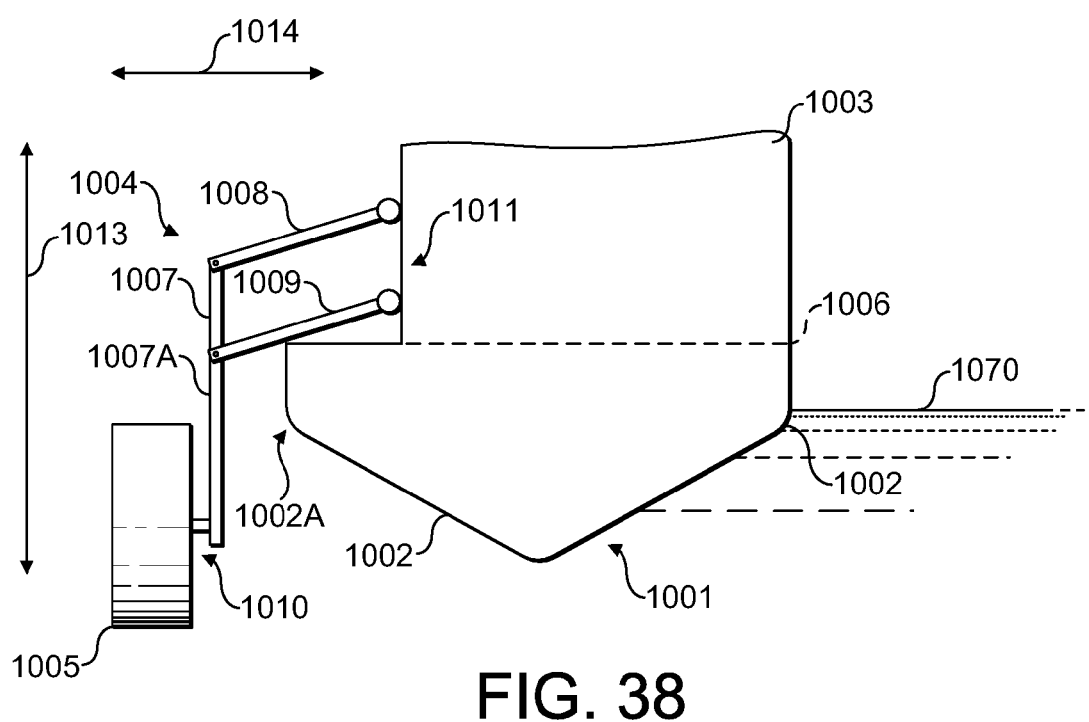
Figure 39:
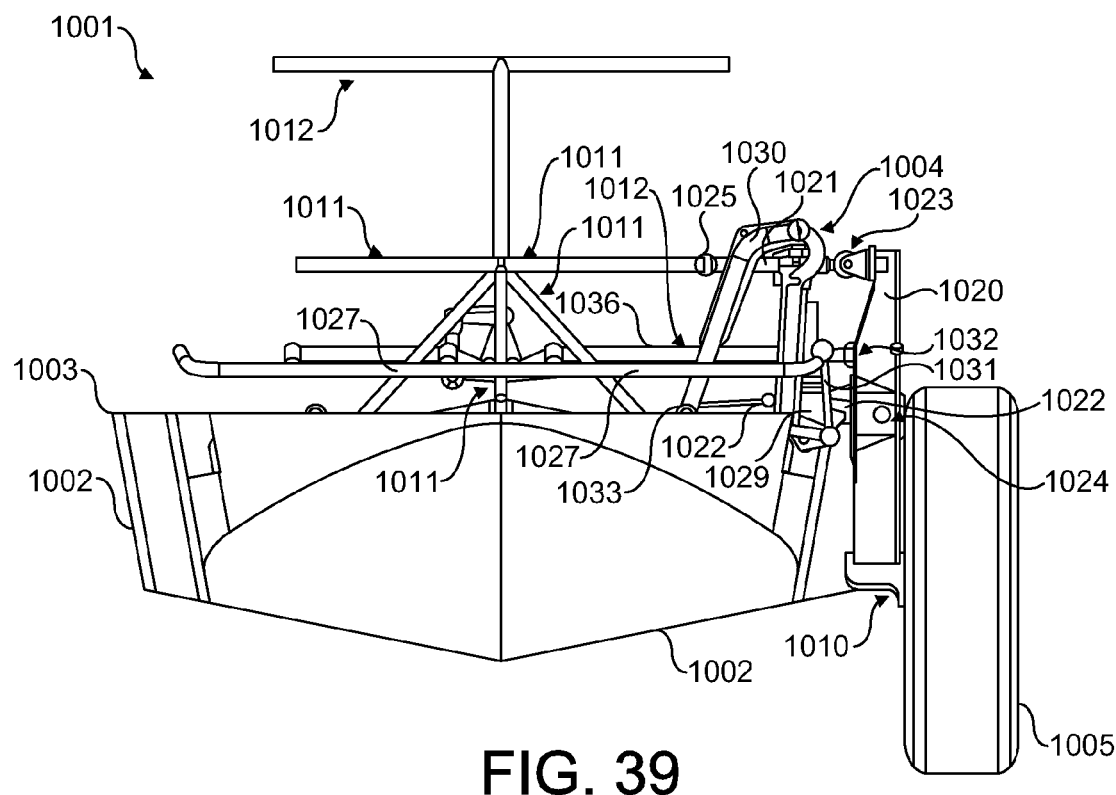
Figure 40:
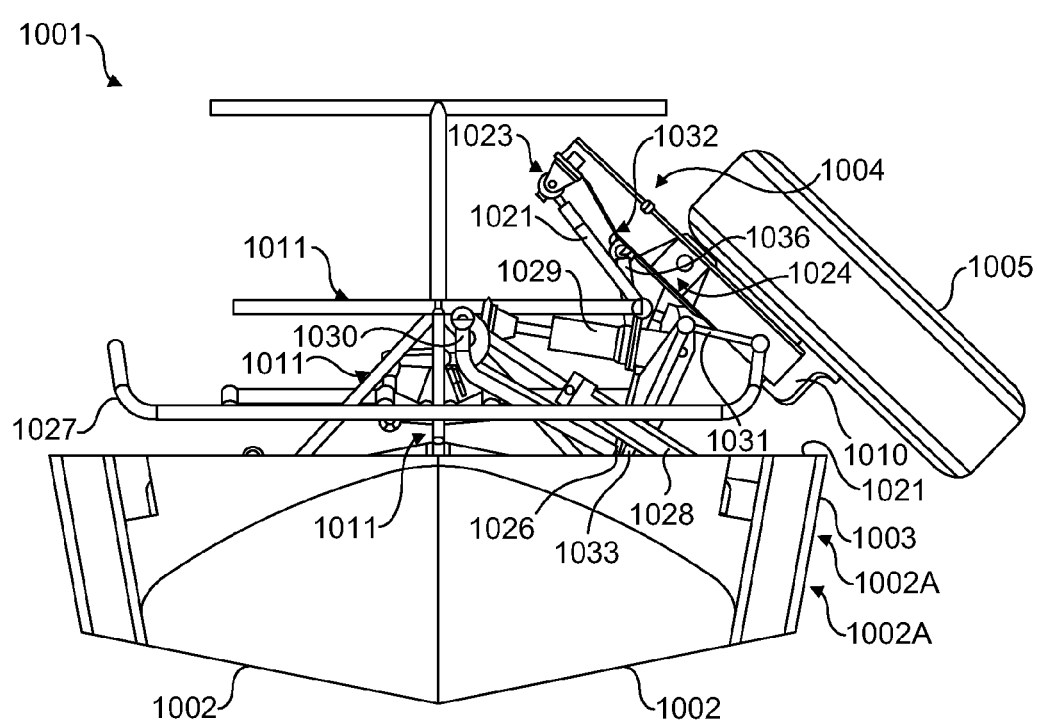
Figure 41A:
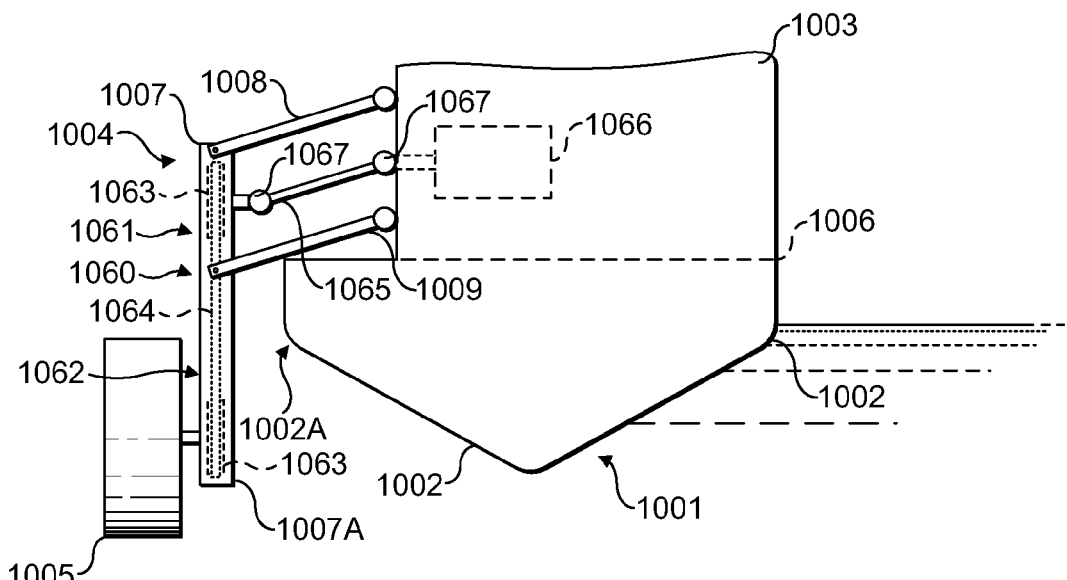
Figure 41B:
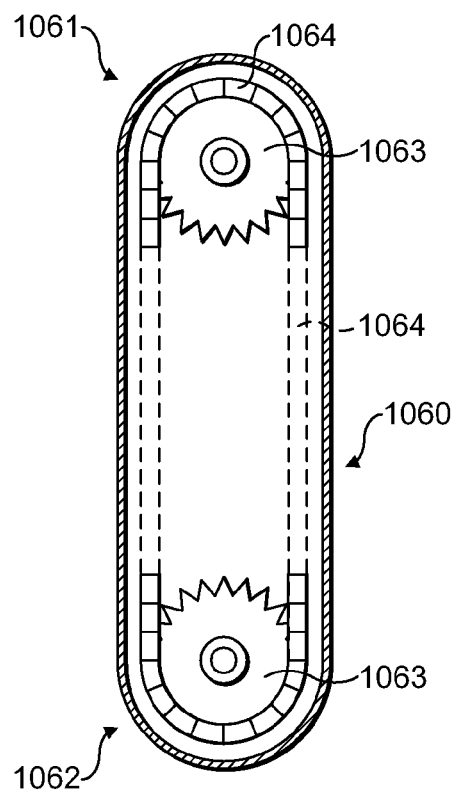
Figure 42A:
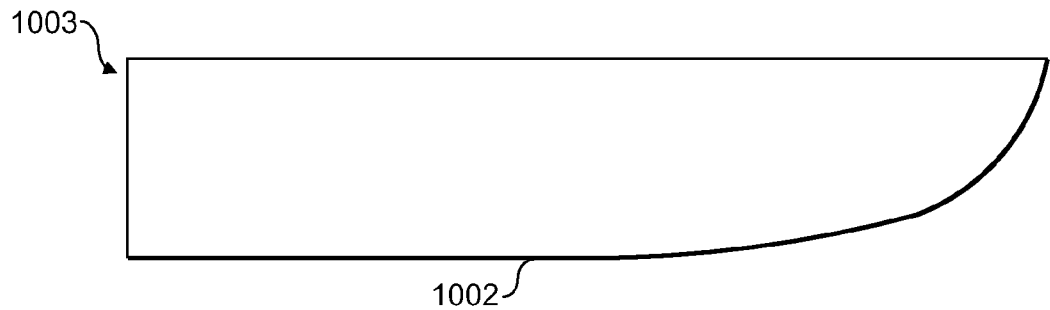
Figure 42B:
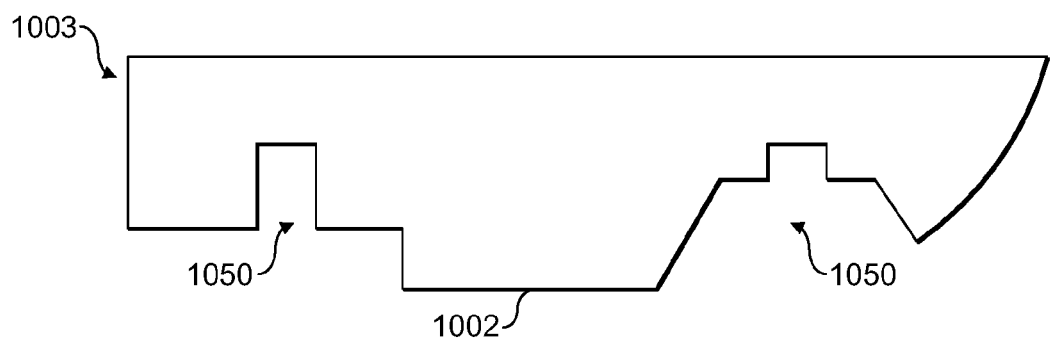
Figure 43:
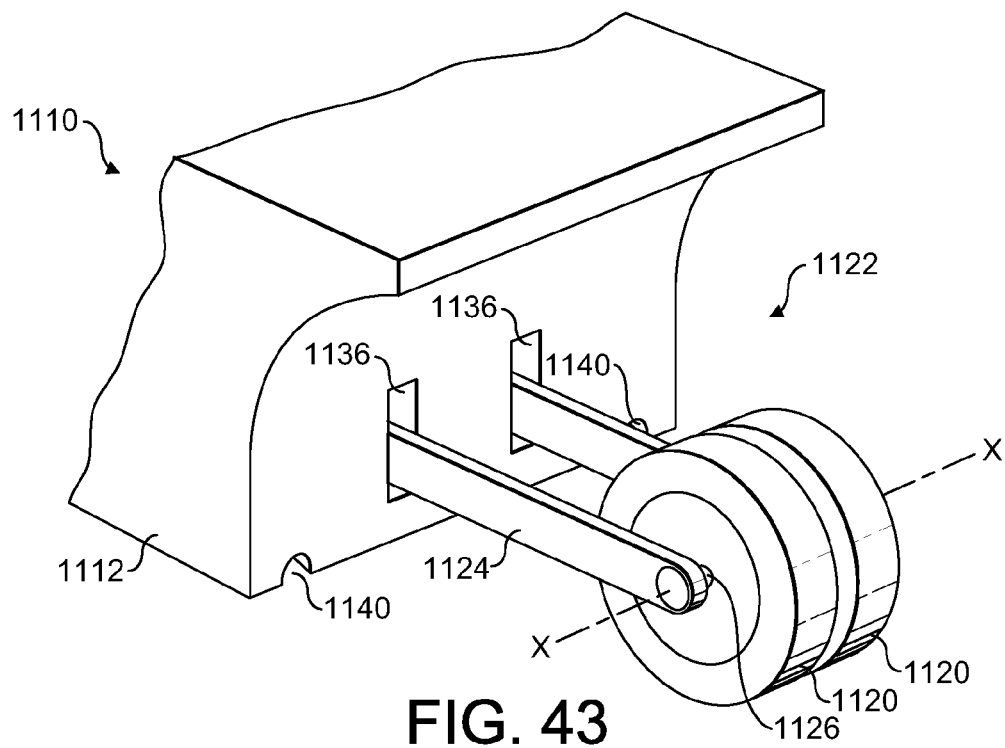
Figure 44:
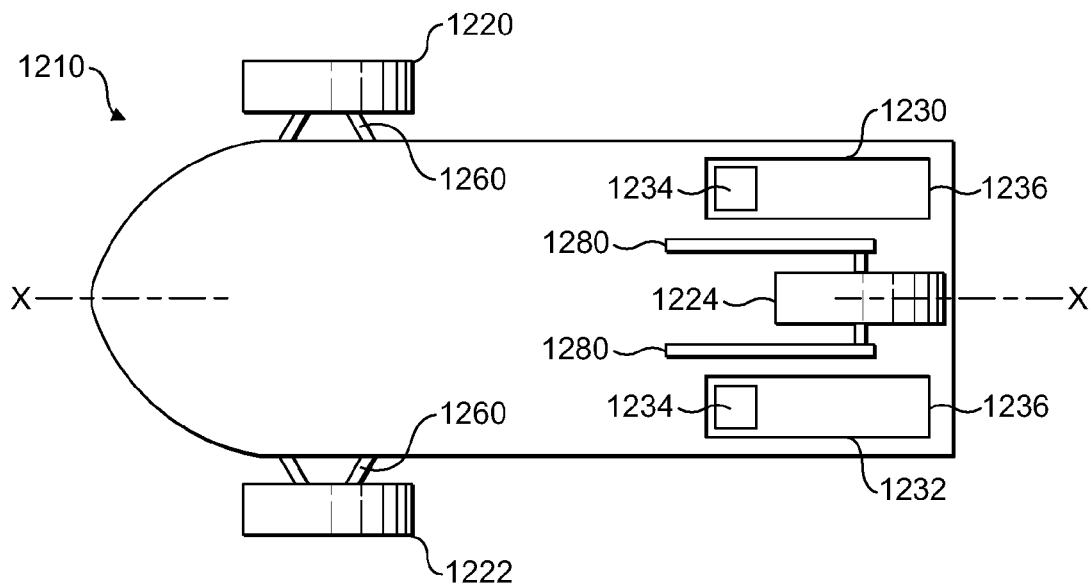
Figure 45:
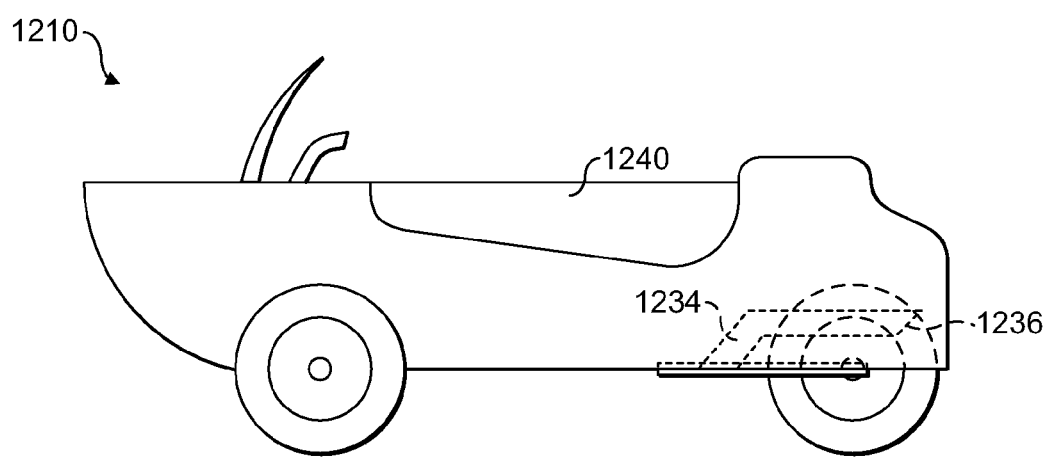

FIGS. 9 to 14 correspond to the views shown in FIGS. 2 to 7 save that the views shown in FIGS. 9 to 14 show the amphibian with the wheels retracted for use in marine mode;

FIG. 15 is a perspective view from above of an amphibian according to a second embodiment of the present invention, with the wheels protracted for use in land mode;

FIG. 16 is a perspective view from below of the amphibian of FIG. 15;

FIG. 17 is a front elevation view of the amphibian of FIG. 15;

FIG. 18 is a side elevation view of the amphibian of FIG. 15;

FIG. 19 is a rear end elevation view of the amphibian of FIG. 15;

FIG. 20 is a top plan view of the amphibian of FIG. 15;

FIG. 21 is a bottom plan view of the amphibian of FIG. 15;

FIG. 22 is the same front perspective view of the amphibian of FIG. 15, but with the wheels retracted for use in marine mode;

FIGS. 23 to 28 correspond to the views shown in FIGS. 16 to 21 save that the views shown in FIGS. 23 to 28 show the amphibian with the wheels retracted for use in marine mode;

FIG. 29 is a schematic perspective view from above of a rolling chassis of the amphibian of FIGS. 1 to 28;

FIG. 30 is a schematic perspective view from above of a powertrain layout and retractable rear wheel suspension assembly of the amphibian of FIGS. 1 to 28;

FIG. 31 is a schematic top plan view of the powertrain layout of FIG. 30;

FIG. 32 is a schematic side elevation view of the powertrain layout of FIG. 30;

FIG. 33 is a schematic side elevation view of an amphibian according to a third embodiment of the present invention, in a land mode operation state;

FIG. 34 is a schematic side elevation view of the amphibian of FIG. 33, in a marine mode operation state;

FIG. 35 is a schematic underneath plan view of the amphibian of FIG. 33, in a land mode operation state;

FIG. 36 is a schematic rear elevation view of the amphibian of FIG. 33, in a land mode operation state;

FIG. 37 is a schematic underneath plan view of an amphibian and powertrain layout according to a fourth embodiment of the present invention;

FIG. 38 is a schematic simplified partial-cross-sectional view of an amphibian according a fifth embodiment of the present invention;

FIG. 39 is a schematic partial-front view of an amphibian according to a sixth embodiment of the present invention, showing a wheel in a protracted vehicle-supporting position;

FIG. 40 is a schematic partial-front view of an amphibian according to FIG. 39, showing a wheel in a retracted position;

FIG. 41A is a schematic simplified partial cross-sectional view of an amphibian according to the present invention, having a step-down drive;

FIG. 41B is a schematic partial cross-sectional view of the step-down drive of FIG. 41A;

FIGS. 42A and 42B are schematic cross-sectional plan views of portions of hulls of amphibians;

FIG. 43 is a rear perspective view of a seventh embodiment of amphibian according to the present invention;

FIG. 44 is a schematic top plan view of an eighth embodiment of amphibian according to the present invention; and FIG. 45 is a schematic side elevation view of the amphibian of FIG. 44.

Referring first to FIGS. 1 to 7, there can be seen an amphibian 10 in its land mode having a forward bow end 12 and a rear stern end 14.

The amphibian 10 has three wheel receiving stations 50, 52, 54. Two are front wheel stations 50, 52 provided one on either side at the front of the amphibian 10, while the third is a rear wheel station 54 provided in a central region at the rear of the amphibian 10. At least one road wheel 51, 53, 55 is provided at each wheel station 50, 52, 54. Each wheel 51, 53, 55 is connected to the remainder of the amphibian 10 by any suitable wheel suspension system which includes a wheel retraction mechanism for moving the wheels 51, 53, 55 between a lowered state for land use and a raised state for marine use. The front wheels 51 and 53 are steerable and handlebars 60 are provided to enable steering of these wheels. Alternatively, a steering wheel may be employed in place of handlebars. The rear wheel 55 is driven to propel the amphibian 10 on land. Alternatively, or in addition, one or both front wheels 51, 53 may be driven (i.e. the amphibian may be one, two, three or all wheel drive). Jet drive units 72, 74 (see FIG. 2) provide propulsion in marine use.

The structure of the amphibian 10 comprises an upper deck section 30 and a lower hull section 40. The upper deck structure 30 is sealed to the lower hull section 40 around a peripheral planar edge 35 which is above the water line when the amphibian 10 is fully displaced in water. The complete upper deck section 30 is detachable from the lower hull section 40 as a single unit, and/or as separate panels. This permits ease of access to internal components of the amphibian 10 for servicing, etc.

Air inlet openings (not shown) provide an entry for cooling air (which may or may not be fan-assisted) for use by the cooling systems of the amphibian 10. Air entrained via these inlets is eventually exhausted via outlets (not shown). Between the air inlets and air outlets, a dorade system is installed to prevent the ingress of water. The dorade system facilitates righting of the amphibian on water by use of a labyrinthine air inlet passage system to prevent the ingress of water should the amphibian 10 be inverted in use in the marine mode.

Sit-astride seating 34 is provided for a driver and passengers of the amphibian 10. Step through openings (not shown) may be provided in the sit-astride seating 34 to aid a rider/driver and/or passenger(s) getting on and off the amphibian 10. Footwell areas 36, 38 are provided one on either side of the sit-astride seating 34, each shrouded by bodywork positioned laterally outside of the footwell areas 36, 38 to provide protection. These footwell areas 36, 38 may be provided with means to bail automatically any water shipped in use of the amphibian 10.

Front wheel arches 31, 32 and rear wheel arch 33 are provided so as to afford protection from spray. An instrument panel 62 is provided ahead of the steering controls to convey relevant parameters of the amphibian 10 to the rider/driver. Additionally, rear view mirrors (not shown) may be provided as a visual aid to the rider/driver. Furthermore, navigation lights may also be provided within or on the upper deck structure 30 in accordance with the local legislative requirements.

The upper deck structure 30 forms an integral part of the entire structure of the amphibian 10. It is a structural component and not merely cladding. Typically it will take the form of a composite structure (e.g. glass fibres or carbon fibres set in resin) although any suitable manufacturing method may be employed. Where localised areas of strength are required in the upper deck structure 30, extra layers or mats of fibres may be laid down during manufacture. The deck 30 will be formed with localised reinforced areas in order to provide a complete force transmitting path extending around the amphibian 10 in a complete circle in a plane orthogonal to a longitudinal axis of the amphibian 10, in order to provide resistance to torsional loads on the amphibian 10.

Referring in particular now to FIGS. 2 to 4 and 7, the underside of the hull 40 can be seen extending from the front bow section 12 to the rear stern section 14. Starting from the planar interface 35 with the upper deck section 30, there is a wall 41 extending around a periphery of the amphibian 10 down to a lower hull surface 42. The overall displacement of the hull 40 provides stability when the amphibian 10 is operated at high speed in marine mode, in particular because of the volume of hull 40 spaced laterally from the centre line of the amphibian 10. As such, when cornering sharply, for example, an increase in righting force is experienced as the angle of lean increases. The bodywork provided laterally of the footwell areas 36, 38 in particular provide righting forces spaced from the amphibian 10 centre line. Any or all such hull volumes can be provided with buoyancy inserts to give residual buoyancy.

It will be appreciated that no cutouts are provided in the hull 40 in the region of the front wheel stations 50, 52. Indeed, with reference in particular to FIG. 14, it will be appreciated that the only discontinuities 46, 48 and 49 in the hull are those provided at the rear of the hull 40 to accommodate the rear wheel station 54 and jet drives 72, 74. These discontinuities 46, 48 and 49 have little effect on the performance of the hull 40. As such, it has been possible to avoid the use of any cover device to reconstruct the lines of the hull 40 when the wheel assemblies are retracted for use in marine mode.

A vee-hull section 44 is formed in the central lower surface 42 of the hull 40 and this can form or be provided with a keel which runs from the bow 12 along the length of the amphibian 10. Strakes or other hydrodynamic aids (not shown) may be integrated in or provided on the hull 40. At the rear of the hull 40, water intake areas 46, 48 are incorporated for the jet drive marine propulsion units 72, 74 of the amphibian 10. In addition, a recess 49 is provided to accommodate the rear wheel 55.

The design of the hull 40 is critical in determining the performance achieved when the amphibian 10 is operated in the marine mode. The present applicant has spent considerable time and effort in the design of the hull 40 which has resulted in a rather surprising shape as compared to that usually expected for a planing water craft or amphibian. The hull 40 comprises a narrow uninterrupted (no cutouts) bow section 43 having a dead rise angle of substantially 23 degrees along its length, followed by a widening rearward section 45 having a dead rise angle of substantially 18 degrees along its length. This compares with traditional planing hulls which start at the bow section with a very steep dead rise angle and these dead rise angles become more shallow along the length of the hull towards the stern, typically ending at 5 degrees or less of dead rise angle. Prior art amphibians have hulls provided with substantial cutouts or discontinuities to accommodate retractable wheel and suspension assemblies, these cutouts or discontinuities being provided with hull covers or entire slidable panels to reconstruct the lines of the hull for use of the amphibian in marine mode.

Since the sit-on seating 34 of the amphibian 10 is arranged longitudinally, the amphibian 10 is narrower than a passenger car. Aligning the engine longitudinally along the amphibian gives a body shape which is narrower in beam and deeper. Rather than adopting the flat planing hull common in the prior art, the applicant has adopted a greater dead rise angle for the agile marine handling this provides, accepting that this gives a need for a suspension with a lot of travel to give adequate ground clearance on land.

Whereas before amphibians such as that of Grzech strove to keep the track width of the wheels within the beam of the amphibian, the applicant has realised that better land mode operation can be achieved if the track width of the front wheels 51, 53 of the amphibian 10 amphibian is greater than the beam of the hull 40. The approach adopted by the applicant does mean that wheels must be retracted through a large angle in order to be clear of the amphibian waterline in marine use, but the strategy does provide for a amphibian capable both on land and on water.

Even with the small footprint of the hull 40 of the amphibian 10, the hull design 40 is capable of propelling the amphibian 10 up onto the plane with little difficulty in fast time periods. Furthermore, on-water performance of the amphibian 10 is not compromised and adequate ground clearance is available when operating the amphibian 10 in land mode.

The amphibian 10 has an overall length in the range of from 3.600 m to 4.200 m, more preferably in the range of 3.800 m to 4.050 m, most preferably of substantially 3.950 m, an overall width in the range of from 1.730 m to 2.000 m, more preferably in the range of 1.800 m to 1.900 m, most preferably of substantially 1.850 m, and an overall height in the range of from 1.200 m to 2.000 m, more preferably in the range of 1.300 m to 1.500 m, most preferably of substantially 1.400 m. The wheelbase length of the amphibian 10 is in the range of from 2.300 m to 3.700 m, more preferably in the range of 2.400 m to 3.000 m, most preferably substantially 2.580 m and the track width of the front wheels 51, 53 is in the range of from 1.400 m to 1.900 m, more preferably in the range of 1.600 to 1.700, most preferably substantially 1.655 m. The length of the hull 40 is in the range of from 3.000 m to 4.200 m, more preferably in the range of 3.300 m to 3.900 m, most preferably substantially 3.600 m. The maximum beam of the hull 40 is in the range of from 1.100 m to 2.000 m, more preferably in the range of 1.200 m to 1.600 m, most preferably substantially 1.380 m, and beam of the hull 40 between the front wheels 51, 53 in the front region 43 is less than the track width.

Referring now to FIGS. 8 to 14, these Figures correspond to the views shown in FIGS. 1 to 7 respectively, save that each shows the amphibian 10 with its wheels retracted for use in marine mode.

Referring next to FIGS. 15 to 28, there is shown a second embodiment of amphibian 10 according to the present invention. This second embodiment is broadly similar to the first, save that it is a smaller scale version and comprises a 'mudguard' type design of wheel arch for front wheel arches 31', 32'. Like reference numerals designate like components throughout. The hull 40 comprises a narrow uninterrupted (no cutouts) bow section 43 having a dead rise angle of substantially 16 degrees along its length, followed by a widening rearward section 45 having a dead rise angle of substantially 12 degrees along its length.

The amphibian 10 has an overall length in the range of from 2.700 m to 3.800 m, more preferably in the range of 3.000 m to 3.600 m, most preferably of substantially 3.323 m, an overall width in the range of from 1.200 m to 1.800 m, more preferably in the range of 1.400 m to 1.700 m, most preferably of substantially 1.600 m, and an overall height in the range of from 1.100 m to 1.700 m, more preferably in the range of 1.300 m to 1.500 m, most preferably of substantially 1.400 m. The wheelbase length of the amphibian 10 is in the range of from 1.500 m to 3.000 m, more preferably in the range of 1.900 m to 2.600 m, most preferably substantially 2.330 m and the track width of the front wheels 51, 53 is in the range of from 1.000 m to 1.800 m, more preferably in the range of 1.200 m to 1.600 m, most preferably substantially 1.430 m. The length of the hull 40 is in the range of from 2.400 m to 3.600 m, more preferably in the range of 2.700 m to 3.300 m, most preferably substantially 3.000 m. The maximum beam of the hull 40 is in the range of from 0.900 m to 1.500 m, more preferably in the range of 1.050 m to 1.350 m, most preferably substantially 1.200 m, and beam of the hull 40 between the front wheels 51, 53 in the front region 43 is less than the track width.

Referring now to FIG. 29, there is illustrated, schematically, a rolling chassis showing certain internal components of the amphibian 10. A prime mover 80 can be seen which is a multi-cylinder internal combustion engine. Alternatively, any prime mover 80 such as electric, hydraulic, pneumatic, hybrid or otherwise may be beneficially employed. Wheel suspension and retraction assemblies, powertrain, driveline and transmission components can be seen, and these are more fully described below with reference also to FIGS. 30 to 32.

The powertrain comprises an output shaft 81 leading drive from the engine 80 via a torsional damper 82 to a driveshaft 83. Driveshaft 83 provides drive, via a forward-neutral-reverse gearbox 85, continuously variable transmission (CVT) 90 (see pulleys 91, 92) and reduction drive 86, to a land mode output shaft 94. Land mode output shaft 94 relays drive via a bevel gear set (not shown) located in the rear wheel hub 413 to the rear wheel 55 during land use of the amphibian 10. Driveshaft 83 also provides drive, via a belt drive system 100, to two marine mode output shafts 102, 104. Belt drive system 100 comprises an input/driver toothed wheel 102, two output/driven toothed wheels 104, 106 and a toothed belt 108. Marine mode output shafts 102, 104 relay drive to the jet drive units 72, 74 during marine (and, optionally, land) use of the amphibian 10. The jet drive units 72, 74 may be permanently connected to the engine 80 to be driven thereby at all times, whilst the rear wheel 55 is driven (connected to the engine 80) only in its lowered (protracted) land use position. The forward-neutral-reverse gearbox 85, CVT transmission 90, reduction drive 86 and belt drive system 100 could of course be replaced in other embodiments by a conventional automatic gearbox or a manual gearbox, or other powertrain and/or transmission systems and arrangements, as required.

Steering input is from handlebars 60. Various mechanisms may be used to transfer movement from the handlebars 60 to front steered wheels 51, 53. For example, the applicant's co-pending application published as US 2006/0178,058 A1 discloses a steering system for a small amphibian with handlebars, wherein road steering is automatically disengaged as the retractable suspension is retracted for use of the amphibian on water. However, this is essentially a cam-operated steering system, without gearing. If steering loads are sufficiently high that gearing and power assistance are required, a steering system according to the applicant's patent GB 2,400,082B may be used. This patent discloses an adaptation of a power-assisted rack and pinion automotive steering system to an amphibian, arranged such that the power assistance also applies to marine steering. This is helpful in damping out the water feedback forces on the jet steering nozzle or nozzles which might otherwise cause painful and/or irritating feedback to the rider through the steering control.

The seating 34 in the amphibian 10 is provided substantially above the amphibian powertrain, with the handlebars 60 located in the front half of the length of the amphibian. This gives a good driving position for both marine and land use.

The front left-hand wheel suspension and retraction assembly 64 (the front right-hand, partially shown, corresponds) and rear wheel suspension and retraction assembly 400 are also shown in FIG. 29. Spring and damper assemblies are provided for each of wheels 51, 53, 55. Retraction actuators 65 and 430 retract and extend these wheel suspensions from their lowered positions (as is shown in FIG. 29) to their raised positions, while spring and damper units 66 and 402, 404 cater for normal suspension movement. Where actuator rams 65 and 430 are hydraulic, hydraulic fluid may be provided by a pump (not shown) powered by the engine 80.

A fuller description of the rear assembly follows immediately below (with reference to FIG. 30) and, of the front assemblies, follows later (with reference to FIGS. 38 to 42B). However, it is to be noted that these are only examples of retractable suspensions which may be used.

Referring to FIG. 30, the retractable rear suspension 400 can be seen to comprise a coil spring 402 and a telescopic damper or shock absorber 404. First and second ends of damper 404 are pivoted to the amphibian 10 at pivots 406 and 408 respectively. Pivot 408 is mounted on a cross beam 410 which is part of a trailing arm assembly comprising two front angled arms 411 and two rear angled arms 412, one each provided on either side of rear wheel 55, and a forward trailing arm 414. In normal bump and rebound movement, the trailing arm assembly will pivot around the pivot 416 at the front of the trailing arm assembly, compressing and extending spring 402 and damper 404 to give conventional damped suspension movement.

Upper pivot mounting 406 is mounted to retraction arm 420, which is in turn mounted at pivot 422 to bracket 424, which is firmly mounted to the frame (not shown) of the amphibian 10. A retraction ram 430 is mounted to bracket 424 at pivot mount 426, and to retraction arm 420 at pivot point 428. When ram 430 is actuated to retract, arm 420 is rotated forwards, pulling damper 404 forward and up. This in turn lifts arms 412 and thus the rear wheel 55 and trailing arm assembly until the rear wheel 55 is fully retracted. This movement is reversed for protraction of the wheel 55 when the amphibian 10 returns to land.

This mechanism is essentially a simplified version of the retractable suspension disclosed in the applicant's co-pending application published as US 2006/0234,567A1, and shares its advantages in that off-the-shelf coil springs and telescopic damper valves may be used to tune and adjust the ride and handling of the amphibian 10 as required.

Although a hydraulic ram is shown as the actuator for the retractable suspension, other actuators powered by compressed air or electricity could be used instead, as required.

It will be appreciated that the above wheel suspension and retraction assembly mechanisms described above are given by way of example only, and any suitable alternative may be beneficially employed. Alternative mechanisms which may be used or adapted for suspension and retraction are described the applicant's patents and patent applications, such as U.S. Pat. No. Re. 36,901; U.S. Pat. No. 6,886,837B2; U.S. Pat. No. 6,945,832B2; U.S. Pat. No. 6,994,358B2; WO 04/039, 613A1; U.S. Pat. No. 7,234,982B2; and US 2006/0,234, 567A1, for example.

The powertrain components illustrated in FIGS. 29 to 32, i.e. the engine 80 and transmission are built up on a frame platform which is then connected to the hull 40. This gives considerable advantage for ease of manufacture. Indeed it is envisaged that a chassis could be constructed with a frame supporting all of the wheel suspension components, the wheel steering mechanism, the wheel retraction mechanism, the engine and the transmission. This would considerably aid construction and repair. This is illustrated in FIG. 29 where a rolling chassis of the amphibian can be seen stripped of the surrounding hull and deck sections. In FIG. 29 there can be seen the engine, the transmission as well as the suspension assemblies for the front and rear wheels, all mounted to a common supporting structure.

A radiator (not shown) located at the front of the amphibian will cool the amphibian's engine, at least in land use. The amphibian's engine can also be cooled by a water/water heat exchanger (not shown) in marine use, with water being drawn from beneath the amphibian to cool water used by the engine cooling system.

Referring next to FIGS. 33 to 36, there is shown an amphibian 310 according to a third embodiment of the present invention. The amphibian 310 may include any or all of the features described above, in any combination, with the following particular features.

The amphibian 310 comprises a body 312 joined to a hull 314 at joint line 313, hence being a buoyant vessel, having a pair of front wheels 320 and a single rear wheel 322. It can be seen from FIG. 36 in particular that hull 314 has a vee-shaped cross-section, to enable both planing and good handling on water.

The amphibian 310 includes a prime mover 316, which may be an internal combustion engine or a similar power source, to provide power through a transmission 318 to the rear wheel 322. Alternatively, the prime mover may power the front wheels 320 only, or may power the front wheels 320 and rear wheel 322.

The front wheels 320 are connected to the body 312 by suspension 324, and covered by mudguards 326. These guards may be fixed to the body or to the wheel suspensions by brackets (not shown). The rear wheel 322 is connected to the body 312 by a trailing arm 328, which provides suspension for the rear wheel. The trailing arm may be double-sided as shown, or single-sided.

The rear wheel 322 and front wheels 320 are retractable by means of retraction mechanisms. The retraction mechanisms for the front wheels may be as described in U.S. Pat. No. Re. 36,901, which is incorporated herein by reference. The front wheel retraction mechanisms acts on the suspension mechanisms to allow retraction and protraction of the wheels 320.

The front wheel retraction mechanisms are operable to raise the front wheels 320 by rotation about axes substantially parallel to a longitudinal axis of the body. Such axes are substantially horizontal when the amphibian is level. The front wheels 320 are retractable above the waterline when the amphibian is in a water mode.

The rear wheel retraction mechanism is operable to raise the rear wheel 322 substantially vertically upwardly into the body 312. The rear wheel 322 is retractable above the waterline when the amphibian is in a marine mode. One or more struts according to U.S. Pat. No. 6,886,837 B2 may be used to retract and protract arm 328.

The front wheels 320 can be steered to provide amphibian steering. Amphibian steering is controlled by handlebars 334 linked to the front wheels 320. Alternatively, the handlebars may be linked to the rear wheel 322, or to both the front wheels 320 and rear wheel 322. A seat 332 is located on the body 312 to support a rider of the amphibian 310, in a position facing forwardly and within reach of the handlebars 334. The seat 332 and body 312 allow the rider to sit along a central longitudinal axis of the amphibian 310, with the rider's legs on either side of the body 312. The driver is thus sitting astride the body. Preferably, the seat 332 is dimensioned to allow a passenger who can sit directly behind the driver on the seat 332. The passenger would also sit centrally on the amphibian 310, astride the body 312.

FIGS. 33 and 34 show that the body 330 is provided with a front fender 336 at a front end of the amphibian, and a rear fender 338 at a rear end of the amphibian. Headlights 340 for use on land and marine lights 342 for use on water are provided at the front end of the amphibian. A combination tail light unit 348 is provided at the rear end of the amphibian. This may incorporate a CHMSL (Centre High Mounted Stop Light), where this is required by legislation.

Rear view mirrors 346 and a windscreen 344 are provided on the body 312. Left and right footwells 350, 352 are provided on the body 312, for the rider and passenger to rest their feet. The footwells have drains 354.

With reference to FIGS. 33 and 35, a hull 314 is formed on the underside of the body 312. The prime mover provides power to a marine propulsion unit. The marine propulsion unit may be a water jet unit 360, or any other form of marine propulsion. The water jet unit 360 is preferably positioned on a central longitudinal axis of the amphibian 310. The water jet unit 360 is preferably positioned forward of the rear wheel. The water jet unit has a jet intake 362, for drawing water into the jet unit; a driveshaft 364 from transmission 318; an impeller section 366; and a jet nozzle 368, through which water is expelled to provide propulsion.

At least one deflector 370 may be provided in order to divert accelerated water from the jet nozzle 368 away from the rear wheel 322 when the rear wheel is in a protracted position. This will occur when the amphibian first enters the water, when the water jet unit will provide propulsion and the rear wheel 322 is yet to be retracted. The deflectors 370 form a chevron shape in plan view with the apex facing the jet nozzle 368, in order to divert water either side of the rear wheel 322.

The deflectors 370 are located directly behind the jet nozzle 368, and are attached to the trailing arm 328. Hence, when the rear wheel 322 is fully retracted, the deflectors 370 are clear of water expelled from the jet nozzle 368. Ducts 372 and 374 may be provided to deflect water rearwards. The exits from these ducts may be in the sides of the body, as shown, or more productively, in the transom. Alternatively, upstanding and substantially vertical walls (not shown) may be joined to the outer edges of trailing arm 328, to deflect water rearwards along both sides of rear wheel 322.

FIG. 34 shows the amphibian 310 in a marine mode. The front wheels 320 have been retracted by rotation above the waterline. The rear wheel 322 has also been retracted above the waterline. The wheels 320, 322 comprises tyres 376, 378 around their periphery. The front tyres 376 can act as fenders when the wheels are retracted, to absorb minor impacts to the amphibian on water.

The rear wheel 322 is not provided with any cover on an underside when retracted. The underside of the rear wheel 322 is therefore exposed to water in the retracted position. The front wheels 320 are similarly not provided with a cover, and so are exposed to water when the wheels 320 are retracted.

It may be found convenient for rear wheel 322 and tyre 378 to be exposed above the rear bodywork when retracted, as shown in FIG. 34. However, this requires a gap in the bodywork, which may give rise to excess spray on wet roads. FIG. 36 shows a lid 380 which may be connected to trailing arm 328 by a linkage (not shown) to lift it out of the way as the wheel is retracted. Unlike the linkages described above with reference to prior art, this linkage could be very simple—possibly just a straight prop—and would be well above the water line, and thus relatively immune to the hazards of a marine environment.

Alternatively, a "mud flap" type spray guard (not shown) could be mounted to hull 314 near to rear fender 338. This could be retracted automatically on water by a linkage to the trailing arm. In this case, however, the linkage may be partly located below the water line; and would therefore have to be designed carefully to ensure durability.

Area 382 behind seat 332 may be used to provide either an open, or a closed and waterproof storage area (not shown). It could also be used to provide a fuel filler neck and opening (not shown), depending on the location of the amphibian fuel tank (not shown).

A fourth embodiment of an amphibian 910 and powertrain according to the present invention will now described, with reference to FIG. 37. The amphibian 910 may include any or all of the features described above, in any combination, with the following particular features.

The amphibian 910 is a light weight version of the amphibian 310, and is intended to carry one person, being the rider. The amphibian 910 comprises a body 930 being a buoyant vessel, and has two front wheels 920 and a single rear wheel 922. The front wheels 920 and rear wheel 922 are retractable by means of retraction mechanisms (not shown).

The rider sits on a seat astride the body 930 of the amphibian 910, with the rider's legs on either side at least part of the body 930. The seat is aligned with a central longitudinal axis of the body 930. The seat and body 930 may be configured to support only one person, i.e. the seat is dimensioned only to support the rider and not a passenger.

The amphibian 910 in a land mode may be front wheel drive only. The rear wheel 922 is not driven in the embodiment shown in FIG. 37.

In a water mode, a water jet unit 960 can propel the amphibian 910. The water jet unit 960 has a jet intake for drawing water into the jet unit. The water is expelled from a jet nozzle to provide propulsion. The water jet unit 960 and/or nozzle may be spaced apart from a central longitudinal axis of the amphibian 910. Alternatively, the water jet unit 960 and/or nozzle may be located on a central longitudinal axis of the amphibian 910.

Alternatively, the water jet unit may have two nozzles located either side of the rear wheel. The two nozzles may be connected to a single water jet unit, or may be connected one each to two separate water jet units.

A prime mover 916 and transmission 918 are located between the front wheels and the rear wheel. Transmission 918 may be a continuously variable transmission (CVT). The prime mover 916 may be a transversely mounted internal combustion engine. Thus, the crankshaft axis extends sideways. The prime mover 916 is connected to the front wheels by a forwardly extending driveshaft 921 to a differential 923, the differential 923 being linked to the wheels in a known manner.

The transmission 918 is connected to the water jet unit 960 by a jet driveshaft 961. The jet driveshaft 961 extends rearwardly of the transmission 918. Since the driveshaft 921 and jet driveshaft 961 extend in opposite directions, there is no interference between the two driveshafts. The driveshaft 921 and jet driveshaft 961 extend substantially parallel to the longitudinal axis of the body. This drivetrain arrangement thus offers packaging advantages, as it places the land drive train at the opposite end of the amphibian to the marine drive train, so that they do not conflict with each other spatially.

Front wheel drive may result in difficulties in leaving water on muddy banks, due to rearward weight transfer. However, the amphibian 110 may leave water on prepared, hard surface slipways. The front wheel drive brings an unexpected advantage, in that it offers a familiar "feel" to riders who have become accustomed to driven front wheels in road cars.

Pontoons 973 extend either side of the rear wheel 922. The pontoons 973 are buoyant to improve the buoyancy of the amphibian. The water jet unit 960 may be located in one of the pontoons 973. An output nozzle of the water jet unit may extend from one of the pontoons. In the embodiment of two nozzles, one nozzle may extend from each pontoon. The two nozzles may be connected to a single water jet unit. Alternatively, each nozzle may be connected to a separate water jet unit. One water jet unit may be located in each pontoon.

The water jet unit(s) 960 and/or output nozzle(s) may be located adjacent to the pontoon(s).

The water jet unit 960 may be located substantially alongside the rear wheel 922. The water jet unit 960 extends substantially parallel to the plane of the rear wheel 922. Alternatively, the water jet unit 960 may be located substantially ahead of the rear wheel 922, or substantially rearward of the rear wheel 922.

The wheels 920, 922 are connected to the body 930 by means of suspension (not shown). The suspension may be arranged to allow the body 930 to lean from side-to-side, i.e. about a longitudinal axis of the body. The body 930 can lean inwardly into corners in a similar manner to a conventional motorcycle. The ability of the body 930 to lean improves the cornering ability of the amphibian 910 on land.

The amphibian 910 may be provided with lights, a registration plate and any other means necessary to allow it to be road legal.

Referring next to FIGS. 38 to 42B, there are shown amphibians 1001 according to fifth and sixth embodiments of the present invention. The amphibian 1001 may include any or all of the features described above, in any combination, with the following particular features.

Amphibians should be well-suited for transporting occupants on both land and water equally efficiently. However, it will be understood from the prior art that most amphibians are more suited for transporting occupants on either land or water, rather than both.

In order to provide good speed and manoeuvrability on land, suspension arms, drive shafts and wheels are often located at lower regions of the amphibian, often protruding directly from a hull section of the amphibian and/or parts of the amphibian that would be submerged during use on water. Further, even though retractable suspension has been described in the prior art, the suspension, drive shaft and/or wheel—in the retracted position—is often left exposed to water, when in use on water. Further, cut-out portions or other abnormalities to the shape of the hull may be provided in the hull section of the amphibian to accommodate the suspension apparatus, drive shaft or wheel, when the wheel is in either of the retracted or protracted, vehicle-supporting positions. The protracted position would be with the wheels in place for use of the amphibian on land. Whilst the prior art designs provide hulls that are buoyant and water-tight, a significant disadvantage is also found in that they often have cut-outs, abnormalities, and/or parts of the suspension apparatus, drive shaft or wheel that are submerged and/or simply contactable by water—even when retracted—in use of the amphibian on water. This clearly alters the hydrodynamics of the hull section of the amphibian, making the amphibian perform less-well on water—especially if the cut-outs, abnormalities, and/or parts of the suspension apparatus, drive shaft or wheel are located in the planing surface of the hull. In particular, large cut-outs for locating retracted wheels can have a great impact on the speed and manoeuvrability of the amphibian in use on water. For example, the amphibian may tend to "dig-in" at the back of an open wheel arch when turning on water.

The present invention addresses the above-mentioned disadvantages of the prior art.

The present invention provides, in a further aspect, an amphibian for use on land and water, comprising:

a hull having a planing surface which contacts water when the amphibian is planing on water;

at least one retractable suspension apparatus which is movable from a vehicle supporting position to a retracted position; wherein the retractable suspension apparatus comprises for each wheel upper and lower suspension arms that are pivotably connected at inboard ends to a support structure within the hull and are pivotably connected at outboard ends with a suspension upright, the upper suspension arm being pivotably connected to the suspension upright by a first, upper pivot connection and the lower suspension arm being pivotably connected to the suspension upright by a second, lower pivot connection;

the suspension upright extends from the second connection, in a direction away from the first connection to a wheel hub mount location at which the wheel hub is rotatably mounted on the suspension upright at a location remote from the first and second pivot connections;

the suspension upright when deployed in land use extends externally of the hull across an outer face and/or a side face of the planing surface; and the lower suspension arm remains above a top of the planing surface throughout use of the amphibian on land.

Preferably, the suspension arms extend from within the hull over an outer edge of the hull.

Most preferably, the wheel hub is located a distance from the second connection at least equivalent to the distance between first and second connections. Further, the hub may be located at least around 5 cm, 10 cm, 15 cm or 20 cm from the second connection.

Preferably, the wheel hub is rotatably mounted on the suspension upright at a distal end of the suspension upright.

The wheel hub is, preferably, driven to rotate by a transmission relaying drive from a prime mover of the amphibian. The transmission may have a step-down drive section in which drive is taken from a location at or above the lower pivot point and is relayed along or alongside the suspension upright to the driven wheel hub.

Alternatively, the wheel hub may be driven by a hub motor. Preferably, the hub motor is a hydraulic motor or an electric motor.

Most preferably, the hull is a vee hull.

The amphibian may comprise a spring and damper assembly connected between one of the suspension arms and the support structure.

Preferably, the amphibian comprises a retractable and extendable actuator operable to move the retractable suspension apparatus from the vehicle supporting position to the retracted position and vice versa. Further preferably, the actuator is also operable to vary ground clearance by varying the suspension height.

The support structure, preferably, comprises a rotatable support arm which is pivotally mounted at one end to a fixed part of the support structure and to which is pivotally connected the actuator, the actuator being pivotally connected at one end to the support arm and being pivotally connected at the other end to a fixed part of the support structure, a/the spring and damper assembly being pivotally connected at one end to the rotatable support arm and at the other end to the lower suspension arm.

According to a further aspect, the invention provides an amphibian for use on land and water, comprising:

a vehicle body comprising a hull section without cut-outs in a planing surface thereof, the planing surface for contacting water when in use on water; and at least one retractable suspension apparatus which is movable from a vehicle-supporting position to a retracted position;

wherein, the at least one retractable suspension apparatus is connected to the vehicle body to locate the at least one retractable suspension apparatus externally of the hull section, in a vehicle-supporting position, and has an elongate suspension upright which extends from above the planing surface to a wheel mount location, such that no cut-out is required in the planing surface to accommodate the at least one retractable suspension apparatus in retracted and vehicle supporting positions.

Preferably, the at least one retractable suspension apparatus is connected to the vehicle body above the hull section, or above the planing surface.

Preferably, the planing surface is directly contactable with water, when in use on water.

Advantageously, the amphibian of the present invention substantially reduces, or removes totally, the necessity to have cut-outs, abnormalities, and/or parts of the suspension apparatus, drive shaft or wheel in the planing surface or that are submerged and/or simply contactable by water—even when retracted—in use of the amphibian on water. Accordingly, the hydrodynamics of the hull are improved.

An embodiment of the invention is provided by an amphibian for use on land and water, comprising at least one retractable suspension apparatus which is movable from a vehicle supporting position to a retracted position, the retractable suspension apparatus comprising, in a vehicle supporting position, upper and lower suspension arms operably-connected to a suspension upright, the suspension upright for receiving one or more wheels, wherein the suspension upright comprises a step-down drive for receiving an input drive from a relative higher location and providing an output drive to a relative lower location. The step-down drive may be integral with the suspension upright or may be provided in addition to the suspension upright. When the step-down drive is provided in addition to the suspension upright, the step-down-drive may be located alongside the suspension upright and operably-connected thereto. The step-down drive may be a geared apparatus, or a chain, a belt or a shaft driven apparatus. The retractable suspension apparatus may comprise a wishbone-type suspension.

A simplified view of part of an amphibian is shown in FIG. 38, in which the amphibian is, generally, indicated by reference 1001. The amphibian 1001 includes a hull section 1002, a vehicle body 1003 and a suspension apparatus 1004, including a wheel 1005. In this particular embodiment, the demarcation between the hull section 1002 and the vehicle body 1003 is shown by the dotted line indicated by reference 1006. Most preferably, the hull 1002 provides a planing surface for contacting water when the amphibian 1001 is planing. The amphibian 1001 includes a regular hull 1002 having a 'V' (vee) shape, for aiding manoeuvrability. The vehicle body 1003 includes any feature of the amphibian which is not defined in relation to the hull section 1002 or the suspension apparatus 1004. Accordingly, a suspension support structure 1011 is provided as part of the vehicle body 1003, and is provided to receive parts of the suspension apparatus 1004. The support structure 1011 may be directly connected to an internal surface of the hull 1002. The support structure 1011 may also comprise part of a vehicle frame (not shown). Reference 1070 indicates a possible water level on the hull 1002, below which portions of the hull 1002 form a planing surface. However, it will be understood by those skilled in the art that the size and shape of the planing surface depends upon, at least, the size of hull and the speed at which the amphibian 1001 is travelling on water.

As shown in FIG. 38, the suspension apparatus 1004 includes a suspension upright 1007, also known as a king pin, and first and second lateral suspension arms 1008 and 1009. The suspension upright 1007 is approximately transverse to the suspension arms 1008, 1009, in a vertical plane. An upper lateral suspension arm 1008 is connected to the vehicle body 1003 at a first end, and to the suspension upright 1007 at a second end. Both connections are pivotal connections allowing the respective parts of the suspension apparatus 1004 to move. The lower suspension arm 1009 is also connected to the vehicle body 1003 and to the suspension upright 1007. Again, the connections are pivotal connections, allowing respective movement of the suspension apparatus 1004. By way of example, the suspension apparatus 1004 can move in a vertical plane to the ground and a horizontal plane to the ground, as shown by arrows indicated by references 1013 and 1014, respectively, when moving between vehicle supporting and retracted positions of the apparatus 1004. As can be seen from FIG. 1, the suspension upright 1007 includes an extended suspension upright 1007A which extends from the connection of the lower lateral suspension arm 1009 in an opposite direction to the upper lateral suspension arm 1008. A hub 1010 for receiving a wheel 1005 is located at or around a distal end of the extended suspension upright 1007A, in a location that is remote from the suspension arm connections. Advantageously, provision of an extended suspension upright 1007A allows the suspension apparatus 1004 to be connected to the amphibian 1001, such that, no cut-out is required in the submerged surface—or planing surface—to accommodate the at least one retractable suspension apparatus in retracted or in vehicle supporting positions.

As can be seen from FIG. 38, the suspension upright 1007, when deployed in land use, extends externally of the hull 1002 across an outer face 1002A and/or a side face 1002A of the planing surface.

FIGS. 39 and 40 show a sixth embodiment of amphibian according to the present invention. Like reference numerals have been used to identify common features with the fifth embodiment, which features will not be discussed further here in detail. In particular, the differences between these two embodiments will be described.

The amphibian 1001 includes a hull 1002, a vehicle body 1003, a suspension apparatus 1004 and a wheel 1005. Also provided are a suspension support structure 1011—which is connected directly with the vehicle body 1003—and a steering apparatus 1012.

The suspension apparatus 1004 comprises a suspension upright 1020, also known as a king pin, an upper lateral suspension arm 1021 and a lower lateral suspension arm 1022. In particular, the upper and lower lateral suspension arms 1021, 1022 are wishbone-type suspension arms. The upper suspension arm 1021 is operably-connected to the suspension upright 1020 at a relative upper region of the suspension upright, when compared to the relative lower connection of the lateral suspension arm 1022 and the suspension upright 1020. Accordingly, an upper pivotal connection 1023 is provided between the upper suspension arm 1021 and the suspension upright 1020. Further, a lower pivotal connection 1024 is provided between the lower suspension arm 1022 and the suspension upright 1020. At opposed ends of the suspension arms 1021, 1022, one or more pivotal connections 1025 is/are provided between the upper suspension arm 1021 and an upper part of the support structure 1011 and one or more pivotal connections 1026 (and/or 1033) is/are provided between the lower suspension arm 1022 and a lower part of the support structure 1011. An anti-roll bar 1027 is also provided to link the suspension apparatus 1004 to a second suspension apparatus (not shown) which would be located opposite the first apparatus 1004.

As shown in FIG. 40, in particular, the suspension apparatus 1004 includes a retraction ram 1028, for moving the suspension apparatus 1004—and wheel 1005—from the vehicle-supporting position to the retracted position. By way of example, FIG. 39 shows the suspension apparatus 1004 and wheel 1005 in a vehicle-supporting position. Further, FIG. 40 shows the suspension apparatus 1004 and wheel 1005 in a retracted position. A first, upper end of the retraction ram 1028 is connected to an arm 1030, which forms part of the support structure 1011. The second, lower end is connected to the vehicle body 1003.

Also, as shown in FIG. 40 in particular, a damper and spring assembly 1029 is provided to allow the upper and lower suspension arms 1021, 1022 and suspension upright 1020 to operate as a conventional suspension. A first end of the damper and spring assembly 1029 is connected to the arm 1030 and the second end of the damper and spring assembly 1029 is connected to the lower suspension arm 1022. The arm 1030 is pivoted at an opposite end to the connections with the retraction ram 1028 and the damper and spring assembly 1029, and provides a pivot point 1033, which is common with at least one of the pivotal connections 1026, around which the wheel 1005 and parts of the suspension apparatus 1004 can rotate between vehicle supporting and retracted positions.

In order to allow the suspension apparatus 1004 to move from a vehicle-supporting position to a retracted position, both the upper and lower suspension arms 1021, 1022 are provided with a pivot point along their length, to allow the suspension arms 1021, 1022 to be moved between retracted and protracted positions. The upper suspension arm is pivotal around the pivot point(s) 1025, provided at the junction of the suspension arm 1021 and the support structure 1011. The lower suspension arm 1022 is pivotal around pivot point(s) 1026, 1033, provided at the junction of the lower suspension arm 1022 and the support structure 1011. In particular, a part of the lower suspension arm 1022 is rigidly connected with the arm 1030 so that they are movable together. Further, a drop link 1031 is provided between the anti-roll bar 1027 and the lower suspension arm 1022, to provide increased rigidity and strength.

FIG. 40 shows, in particular, outer faces 1002A and/or side faces 1002A of the planing surface across which the suspension upright 1020 extends, when deployed for land use. The suspension apparatus of FIGS. 39 and 40 show a front-wheel only of an amphibian 1001. However, the suspension apparatus 1004 may be used on any of the wheels of an amphibian 1001. In particular, although the amphibian 1001 shown in FIGS. 39 and 40 has no drive going to the wheel 1005, the wheel 1005 may be a driven wheel. Further, in order to drive that wheel 1005, a step-down drive (not shown) may be provided as an integral structure with the suspension upright or in addition to the suspension upright. As known by those skilled in the art, a step-down drive is capable of receiving an input drive from a relative higher location and producing an output drive to a relative lower location. Alternatively, the wheel hub 1010 may include one or more hydraulic motors (not shown), or one or more electric motors or electric hubs (not shown).

By way of an alternative, the retraction ram 1028 or the damper and spring assembly 1029 may be manually adjusted for varying the ground clearance of the amphibian 1001.

Although the suspension apparatus 1004 shown in FIGS. 39 and 40 is drive-less, that suspension apparatus 1004 includes apparatus 1012 used for steering the amphibian 1001. The steering apparatus 1012 includes an arm 1036 which is operably connected, at connection 1032, to the suspension upright 1020 in a mid-region of the suspension upright 1020, preferably between the connections 1023 and 1024. The other end of the arm 1031 is connected to input steering means, for example, handle bars or a steering wheel (not shown).

FIGS. 38, 39 and 40 show only one suspension apparatus 1004 and wheel 1005 attached to the vehicle body 1003. However, it will be understood that any number of wheels could be used, in particular 3 wheels, and an appropriate number of suspension apparatuses 1004. Further, the wheels 1005 may be driven or drive-less.

FIG. 41A shows an embodiment of the present invention which is similar to that shown in FIG. 38. Accordingly, like references have been utilised for common features and only the differences will be discussed. In particular, the suspension upright 1007 and extended suspension upright 1007A include a step-down drive 1060. As shown in FIG. 41B in particular, the step-down drive includes an upper input end 1061 and a lower output end 1062, when the suspension apparatus 1004 is in its vehicle-supporting position. A cog 1063 is provided at each end 1061, 1062 and is linked by a chain 1064, so that when either cog 1064 is moved, corresponding rotation of the other cog 1063 is provided. The cog 1063 at the input end 1061 is driven by a shaft 1065, itself driven directly or indirectly by a prime mover, as exemplified by an engine 1066. One or more universal joints 1067 or equivalents are used to connect the engine 1066, shaft 1065 and cog 1063. The cog 1063 at the output end 1062 drives the wheel hub 1010 and the wheel 1005. Accordingly, an input drive from a prime mover is stepped-down to a lower height with respect to the ground the amphibian is standing on to drive one or more wheels.

FIG. 42A shows a hull of an amphibian according to the present invention. The hull is shaped to provide good hydrodynamics. Further, no cut-out or other abnormalities, and/or parts of the suspension apparatus, drive shaft or wheel would be submerged and/or contactable by water, when the amphibian has the suspension apparatus 1004 retracted, for use on water. By contrast, FIG. 42B shows a hull of an amphibian in which cut-outs 1050 are provided to locate the suspension apparatuses and/or wheels in a retracted position thereof. Accordingly, a hull shown in FIG. 42A has better hydrodynamics than a hull shown in FIG. 42B.

Referring next to FIG. 43, there is shown an amphibian 1110 according to a seventh embodiment of the present invention. The amphibian 1110 may include any or all of the features described above, in any combination, with the following particular features.

A number of suspension layouts for amphibians have been proposed. Such suspension layouts allow sprung and damped movement of the wheels when the amphibian is on land, and retraction of the wheels for use of the vehicle on water. The suspension is generally inboard of the wheel, for example as known from US 2005/0034646 to Royle. This has the disadvantage that the width of the hull between the wheels is restricted for a given width of the amphibian, as at least a lower suspension arm must project through the plane of the hull to support the wheel in protracted land mode. Space must also be allowed for suspension rebound travel. An example of this restriction may be seen from the applicant's co-pending application published as US 2007/0,006,788 A1.

The present invention provides an amphibian according to claim 149. Thus, the width of the hull is not restricted by the suspension.

FIG. 43 shows an amphibian 1110 according to the present invention. The amphibian 1110 comprises a hull 1112 being a buoyant vessel, and having a pair of rear wheels 1120 in close proximity (i.e. adjacent to each other) arranged as effectively one wheel. The closely spaced pair of wheels are located on the central longitudinal axis of the amphibian.

The hull 1112 is V-shaped in vertical cross-section. The amphibian 1110 also has two or more front wheels (not shown).

The amphibian 1110 includes a motor (not shown) or a similar power source to provide power through a transmission to the rear wheels 1120. Alternatively, the motor may power the front wheels only, or may power the front wheels and rear wheels.

The rear wheels 1120 are connected to the hull 1112 by a suspension assembly 1122. The suspension assembly 1122 comprises a pair of trailing arms 1124, extending rearwardly from the hull 1112. The trailing arms are rotatably connected to a chassis of the vehicle (within and supporting the hull 1112) at pivots (not shown).

The rear wheels 1120 are rotatably mounted to inboard sides of the trailing arms 1124, each wheel rotating about its own axis. The wheels 1120 are rotatably mounted to distal ends of the arms 1124, distal to the pivots, by mounts 1126. The mounts 1126 allow rotation of the wheels 1122 about their common rotational axis X-X. The mounts 1126 are compliantly secured on trailing arms 1124 and allow relative movement between the wheels 1120 and arms 1124 about a substantially horizontal axis, parallel to a longitudinal axis of the hull, in order to allow the hull 1112 to roll in use on land, but to maintain good tyre contact with the ground. Although tyres of a substantially square tread cross-section are shown in the figures, tyres of a more rounded cross-section as used on motorcycles, may be used instead. The mounts 1126 may each comprise a ball joint.

The two rear wheels 1120 are preferably connected by an axle (not shown). The axle assists in keeping the wheels 1120 parallel. Alternatively, the pair of wheels may not be connected by an axle.

Each trailing arm 1124 is spring-mounted to the vehicle, preferably by torsion bars (not shown) provided at or adjacent to the pivots. A separate torsion bar is preferably provided for each arm 1124. The torsion bars extend laterally towards the centre of the hull 1112.

The wheels 1120 may be driven via a shaft acting through a differential (not shown) in the axle. The differential may be in the centre of the axle, or may be offset to one side.

Alternatively, the wheels 1122 may each be driven by a belt or a chain. The belt or chain may be located partially or wholly inside one or each arm 1124. Alternatively, a driven toothed wheel or sprocket may be provided at the centre of axle.

The amphibian 1110 may be powered on water by one or more jet drives 1140. The or each jet drive has one or more jet nozzles through which water is expelled to provide propulsion. The jet nozzles may be located between the wheels 1120.

The suspension 1122 is provided with a retraction mechanism, in order to retract the wheels 1120 for use of the amphibian 1110 on water. The retraction mechanism may comprise cranked torsion bars (not shown). Each torsion bar comprises an aligned portion substantially aligned with the pivots, and defining a rotational axis of the torsion bar. Each torsion bar further comprises a cranked portion perpendicular to the axis of the torsion bar. The cranked portion is at or near an inboard end of each torsion bar.

An actuator may be attached to each cranked portion. Contraction or extension of the actuators can be used to control retraction or deployment of the wheels 1120. Alternatively, a single actuator may be connected to a cranked portion of the torsion bars of both of the pair of wheels 1120 (the single actuator could act on a bar connecting the cranked portions).

Preferably, each arm is connected to its own laterally outwardly extending bar, each outwardly extending bar having a cranked portion, the two cranked portions connected by a connecting strut extending laterally.

Alternatively, the retraction mechanism may be in the form of one or more hydraulic struts (not shown). The hydraulic struts may be connected between the arms 1124 or axle and the hull 1112. The hydraulic struts may act both as dampers and also as hydraulic actuators to retract and deploy the wheels. Suitable hydraulic struts are known from publication US 2003/0047899.

The hull 1112 has recesses 1136, for receiving the arms 1124. The recesses 1136 are shaped to allow retraction of the wheels.

In a retracted position, the wheels 1120 may be within the length of the hull 1112. The hull 1112 extends over and beyond the wheels 1120 in their retracted position. This location of the wheels improves spray control when the amphibian is planing on water, and the wheels are in the retracted position.

The above description relates to the use of the suspension assembly 1122 on rear wheels of an amphibian. Alternatively, the same or similar suspension assembly 1122 may be used for the front wheels of an amphibian. The arms 1124 may extend rearwardly and support front wheels as described above. Alternatively, the arms 1124 may extend forwardly, such that the supported front wheels are forward of the pivots. The rear wheels 1120 may be supported on forwardly extending arms. The features described above would be the same or reversed as would be clear to a person skilled in the art.

The amphibian may have a total of three wheels, in the form of a pair of front wheels and a single rear wheel. The amphibian may have four wheels, being a front pair of wheels and a rear pair of wheels provided adjacent one another in close proximity. One or both of the front and rear pair of wheels may have a suspension assembly as described. The amphibian may have more than four wheels, for example, the amphibian may have six wheels (e.g. three pairs of two wheels).

Referring next to FIGS. 44 and 45, there is shown an amphibian 1210 according to an eighth embodiment of the present invention. The amphibian 1210 may include any or all of the features described above, in any combination, with the following particular features.

Amphibians have been proposed and produced in various formats. Although amphibian bicycles have been proposed, the smallest engine driven amphibians have been motorcycles. Lehrberger (DE 19831324C2), Gong (U.S. Pat. No. 6,540,569), and Buchanan (GB 2,254,831) all disclose designs for amphibian motorcycles. But none of these designs have been manufactured or sold. There is clearly room for improvement over this prior art.

Amphibians are dual purpose vehicles, and must therefore be equally usable on land as they are on water. Different classes of vehicle generate different expectations in the potential buyer's mind. Motorcycles are generally sold on a sleek image, with an implicit promise of fast acceleration and fast, steeply leaning cornering. The three machines described above, however, are heavy, wide, and bulbous in shape.

The addition to a motorcycle of equipment needed for travel on water leads to a large increase in weight; particularly where twin marine jet drives are used. The casings of these jets are usually castings; which makes them very heavy. This weight will blunt performance on road, and reduce roadholding capability on corners. The width of the motorcycle must also be increased compared to the convention for a purely road machine, to provide both buoyancy and stability on water. But this increased width limits the angle through which the machine can be leaned on corners on road. The additional weight and width will make the motorcycle feel cumbersome on road. If the machine falls over, either due to a skid or through impact when parked, it will be very difficult to return it to the upright riding position. It is clearly preferable for a vehicle which is too heavy to be lifted by the rider to be self-stable. Finally, the bloated appearance of an amphibious motorcycle's bulbous bodywork will limit its market appeal.

It is necessary, therefore, is to address these problems with an amphibian which will provide adequate performance on water without unacceptable compromises in use on land. Implicit in this equation is the avoidance of a mismatch between expectation and delivery. If at the same time, the utility of the amphibian is increased, a still more attractive package may be developed.

The use of twin jet drives in amphibians is known, not least from the prior art cited above. The advantage of twin jets is that the amphibian can rise rapidly onto the plane on water—perhaps one or two seconds faster than an equivalent machine with a single jet drive. The drawbacks of twin jets are in the weight of the driveline, cost, and packaging; and a reduction in top speed on water due to the increased pumping losses through the additional jet drive. The top speed might, for example, be reduced by four knots for a compact amphibian.

So the choice of single or twin jets is not a matter of either doing the same job as well as the other; but a more conscious decision based on the market sector at which the amphibian is aimed. The ultimate high performance amphibian will use a single jet drive, but may be regarded as more difficult to ride; but a twin jet machine will be easier to ride, less ultimately fast but more relaxing. Although twin jets may be assumed to be heavier than a single jet drive, the applicant has established a surprising result occurs when comparing the two layouts. To provide equivalent performance from twin jets as from one jet, the twin jets will be specified as being of smaller diameter than the equivalent single jet. This reduces the tip speed of the jet blades compared to the single jet drive; which makes the twin jets less liable to cavitation at speed. It is also found that as forces at the tips of the blades go up as the square of the rotational speed, a smaller jet can be built more lightly than a single jet, because it is of smaller diameter. Hence, twin jets may in themselves be lighter than a single jet drive; and may still be lighter overall, even when a more complex transmission is necessarily specified than for a single jet drive.

Other options to consider in managing the customer's expectations would include performance available on land. One option here is to offer less power on land than on water, as described in the applicant's patent U.S. Pat. No. 7,207,851B1. Another option in managing expectations is to amend the layout of the vehicle; particularly in making it more stable than a motorcycle by providing more wheels. This in turn would also increase the carrying capacity of the vehicle, both in volume and in weight. So the overall package would move away from ultimate performance towards utility. It is considered that the market for ultimate performance amphibians is small—as for "supercars" on road; but greater market success can be obtained with a slightly slower, but much more usable, amphibian.

It is considered that a combination of three wheel stations 1220, 1222, 1224 with twin jet marine drives 1230, 1232 (each having an intake 1234 and outlet 1236) provides an ideal combination of accessible marine performance, failsafe road stability, and carrying capacity. Front and rear retractable wheel suspension assemblies 1260, 1280 are provided. These characteristics may be combined with ride on seating 1240, which provides best visibility in all directions; and being aligned with the longitudinal centre line X-X of the amphibian 1210, gives good lateral weight distribution, even when there is only the rider on the amphibian.

The increase in load carrying area brought about by the increase in the number of wheels is considered to be more than adequate compensation for the concomitant increase in amphibian weight. Where three wheels are used, the use of two front wheels offers good stability on road, while twin jet drives 1230, 1232 can be easily packaged either side of the single rear wheel. This is in contrast to U.S. Pat. No. 5,690,046 to Grzech, where the single front wheel requires complex retraction arrangements and the twin rear wheels only allow use of a single jet drive.

Referring now to FIGS. 1 to 4 and FIG. 6, amphibian 10 can be seen to comprise a longitudinal axis L-L running from a front bow end 12 to a rear stern end 14 of the amphibian 10, which longitudinal axis can be any longitudinal axis spaced laterally or vertically, as indicated by the arrows. Indeed the longitudinal axis may lie in or out of the horizontal plane of the amphibian, i.e. may be inclined to the horizontal. In addition, amphibian 10 can be seen to comprise a transverse axis T-T running from a left port side to a right starboard side of the amphibian 10, which transverse axis can be any transverse axis spaced laterally or vertically, as indicated by the arrows. Indeed the transverse axis may lie in or out of the horizontal plane of the amphibian, i.e. may be inclined to the horizontal.

The amphibian can be seen to comprise at least three retractable wheels 51, 53, 55, at least two of the retractable wheels 51, 53 being retractable about an axis substantially parallel to, or offset by an angle $\alpha$ of up to 40 degrees from, the longitudinal axis L-L of the amphibian 10. At least one of the retractable wheels, the third retractable wheel 55 is retractable about an axis substantially parallel to, or offset by an angle $\beta$ of up to 40 degrees from, a transverse axis T-T of the amphibian.

Preferably the angle $\alpha$ is any angle in the range of from 0 degrees to 40 degrees, more preferably from 0 degrees to 30 degrees, even more preferably from 0 degrees to 20 degrees, and preferably from 0 degrees to 15 degrees. Preferably the angle $\beta$ is any angle in the range of from 0 degrees to 40 degrees, more preferably from 0 degrees to 30 degrees, even more preferably from 0 degrees to 20 degrees, and preferably from 0 degrees to 15 degrees.

It will be appreciated that the axis of wheel retraction parallel to, or offset from, the longitudinal axis L-L of the amphibian may spaced laterally or vertically from the longitudinal axis L-L. Similarly, the axis of retraction parallel to, or offset from, the transverse axis T-T of the amphibian may be spaced laterally or vertically from the transverse axis T-T.

Although several embodiments of amphibian have been described above, any one or more or all of the features described (and/or claimed in the appended claims) may be provided in isolation or in various combinations in any of the embodiments. As such, any one or more these features may be removed, substituted and/or added to any of the feature combinations described and/or claimed. For the avoidance of doubt, any of the features of any embodiment may be combined with any other feature from any of the embodiments.

Whilst in certain of the above embodiments a single internal combustion engine is used to both drive a road wheel in land mode operation and also to power the jet drive(s) in marine mode, separate engines could be provided, one for the road wheel(s) and another for the jet drive(s). Indeed, the engines may not be internal combustion engines, but may instead take the form of any primer mover (electric, hydraulic, pneumatic, hybrid, or otherwise, as required). Also the jet drive(s) could be replaced by a propeller(s) or any other marine propulsion means.

It will be appreciated that the present invention is not limited to handlebar steering; a steering wheel may be beneficially employed. Amphibians according to the present invention may be rear wheel drive, front wheel drive or all wheel drive. Indeed, the amphibians may be one wheel drive, two wheel drive or three wheel drive. To supplement the three wheel configuration of the present invention, stabilising devices may be beneficially employed. One form of stabilising device may take the form of two wheels or skids provided in the rear half of the amphibian, preferably spaced laterally from the longitudinal centre line of the amphibian. These stabilising devices may be retractable and deployed only in certain operating conditions (e.g. when learning to operate the amphibian for the first time).

Whilst preferred embodiments of the present invention have been described above and illustrated in the drawings, these are by way of example only and non-limiting. It will be appreciated by those skilled in the art that many alternatives are possible within the ambit of the invention, as set out in the appended claims.

The invention claimed is:

1. An amphibian for use in land and marine modes comprising:
    a planing hull;
    three wheel stations, two of the three wheel stations being front wheel stations provided one on each side of and in the front half of the amphibian, and the third wheel station being a rear wheel station provided in a central region in the rear half of the amphibian;
    at least one wheel provided at each wheel station, each wheel being movable between a protracted land mode position and a retracted marine mode position;
    land propulsion means to propel the amphibian on land in the land mode, the land propulsion means comprising at least one of the wheels; and
    marine propulsion means to propel the amphibian on water in the marine mode, the marine propulsion means comprising at least two impellers or propellers provided one on each side of the rear wheel station.

2. An amphibian as claimed in claim 1 wherein the marine propulsion means is longitudinally aligned with at least part of the at least one wheel provided at the rear wheel station.

3. An amphibian as claimed in claim 1 wherein at least one deflector is provided in order to divert the output from the marine propulsion means away from the at least one wheel provided at the rear wheel station.

4. An amphibian as claimed in claim 1 wherein the wheels provided at the front wheel stations are rotatable during retraction about axes substantially parallel to a longitudinal axis of the amphibian.

5. An amphibian for use in land and marine modes comprising:
    a planing hull;
    three wheel stations, two of the three wheel stations being front wheel stations provided one on each side of and in the front half of the amphibian, and the third wheel station being a rear wheel station provided in a central region in the rear half of the amphibian;
    at least one wheel provided at each wheel station, each wheel being movable between a protracted land mode position and a retracted marine mode position;
    land propulsion means to propel the amphibian on land in the land mode, the land propulsion means comprising at least one of the wheels; and
    marine propulsion means to propel the amphibian on water in the marine mode, the marine propulsion means comprising at least one impeller or propeller, wherein:
    the land propulsion means is independent of the marine propulsion means.

6. An amphibian as claimed in claim 5 wherein the at least one impeller or propeller is provided in a central region ahead of the rear wheel station.

7. An amphibian as claimed in claim 5 wherein the at least one impeller or propeller is provided in a non-central region, either ahead of the rear wheel station or on one side or other of the rear wheel station.

8. An amphibian as claimed in any one of claim 5 further comprising two or more output ducts appended to the at least one impeller or propeller, wherein the two or more output ducts are provided at least one on either side of the fear wheel station.

9. An amphibian as claimed in claim 5, wherein the marine propulsion means is longitudinally aligned with at least part of the at least one wheel provided at the rear wheel station.

10. An amphibian as claimed in claim 5, wherein at least one deflector is provided in order to divert the output from the marine propulsion means away from the at least one wheel provided at the rear wheel station.

11. An amphibian as claimed in claim 5, wherein the third wheel station houses two or more wheels.

* * * * *

UNITED STATES PATENT AND TRADEMARK OFFICE
CERTIFICATE OF CORRECTION

| | | |
|---|---|---|
| PATENT NO. | : 8,025,540 B2 | Page 1 of 1 |
| APPLICATION NO. | : 11/895604 | |
| DATED | : September 27, 2011 | |
| INVENTOR(S) | : Alan Timothy Gibbs | |

It is certified that error appears in the above-identified patent and that said Letters Patent is hereby corrected as shown below:

Column 26, line 30, between "the" and "wheel" delete "fear" and insert instead --rear--.

Signed and Sealed this
Twenty-eighth Day of August, 2012

David J. Kappos
*Director of the United States Patent and Trademark Office*